Figure 1:
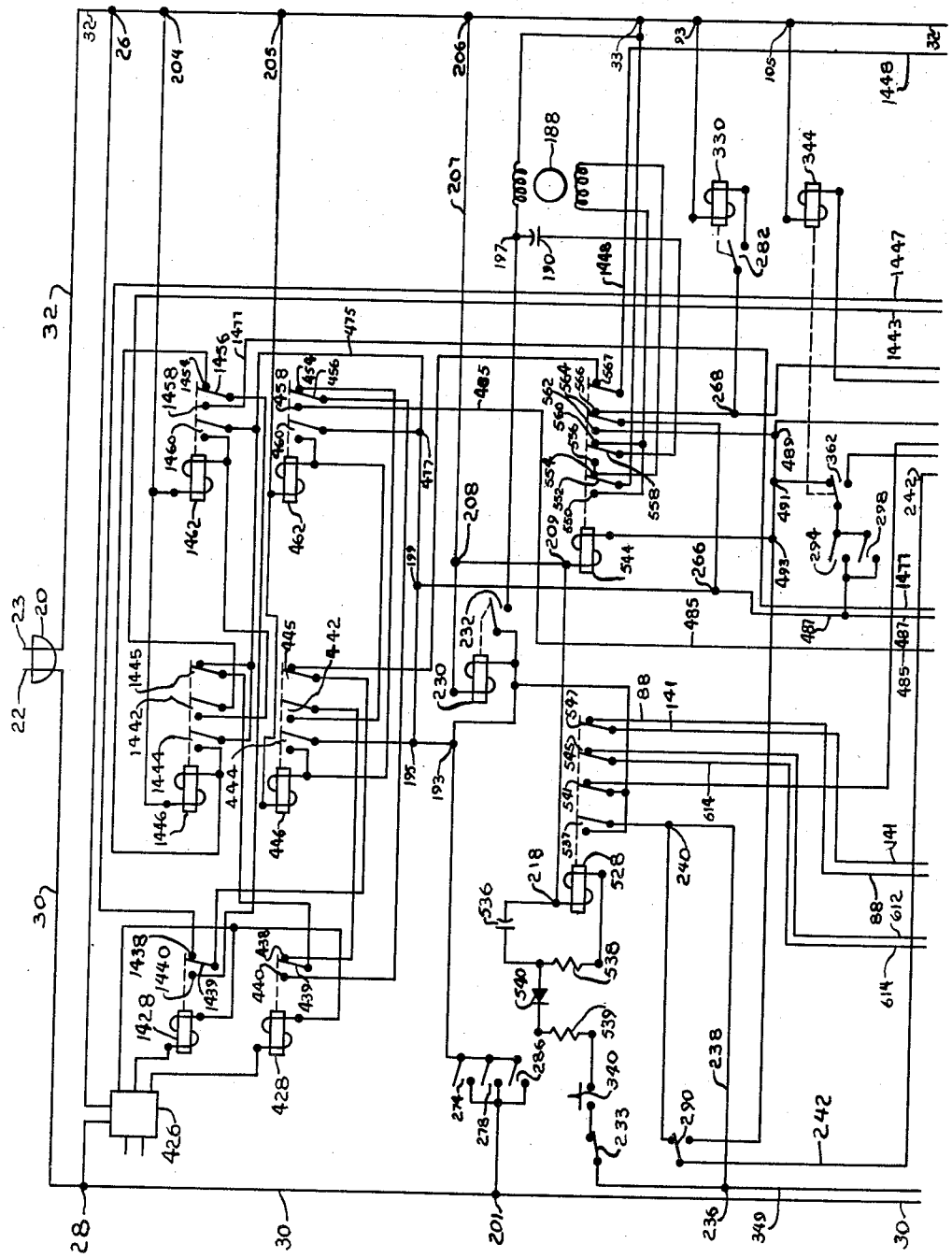

Aug. 25, 1964    C. B. ADAMS    3,145,820
MONEY-ACTUATED DEVICES
Filed June 5, 1961    11 Sheets-Sheet 1

INVENTOR.
CLIFFORD B. ADAMS
BY
ATTORNEY

INVENTOR.
CLIFFORD B. ADAMS
BY
ATTORNEY

INVENTOR.
CLIFFORD B. ADAMS
BY
ATTORNEY

INVENTOR.
CLIFFORD B. ADAMS

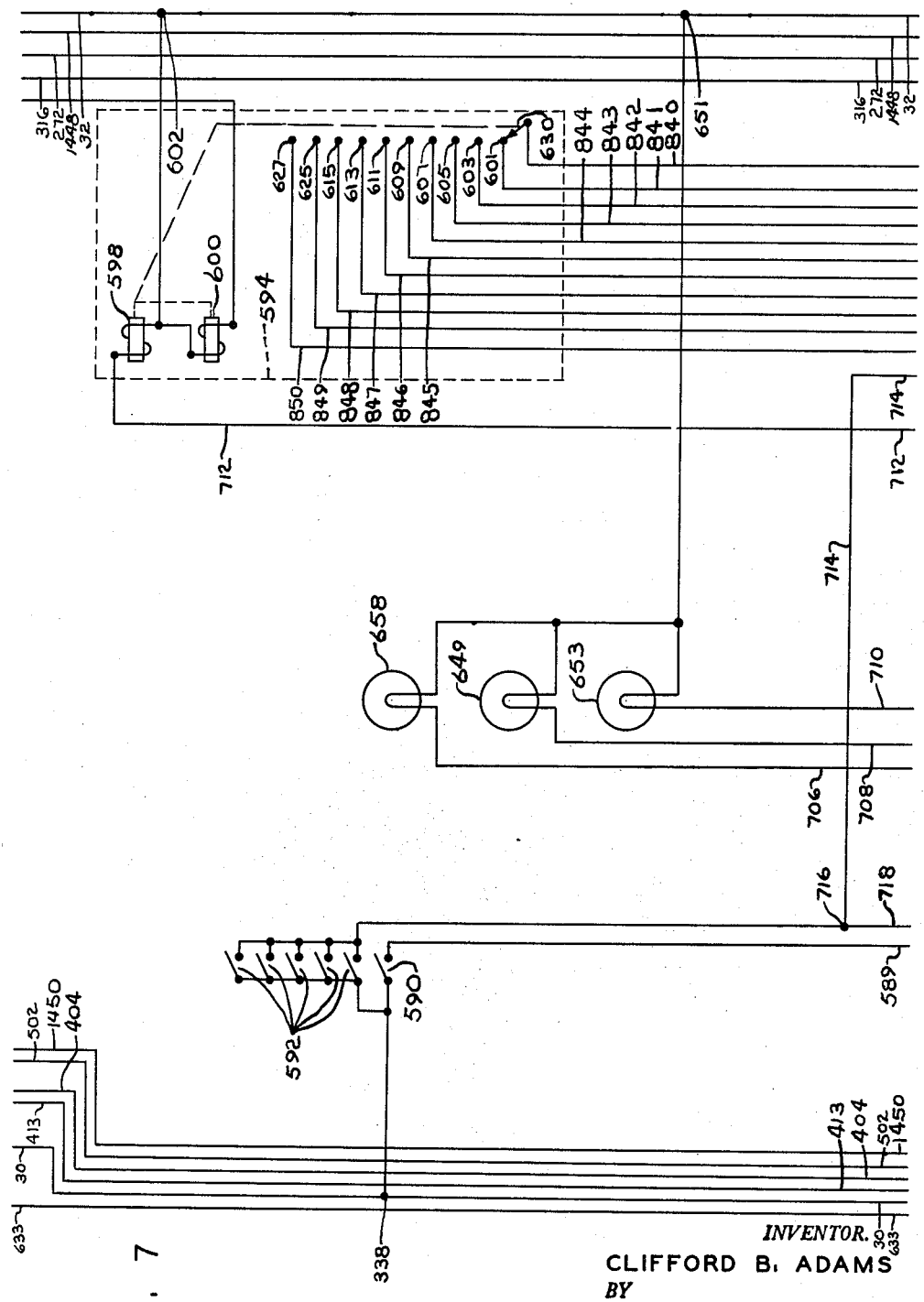
FIG. 7
INVENTOR.
CLIFFORD B. ADAMS
BY
ATTORNEY

INVENTOR.
CLIFFORD B. ADAMS

INVENTOR.
CLIFFORD B. ADAMS
BY
ATTORNEY

Aug. 25, 1964

C. B. ADAMS 3,145,820

MONEY-ACTUATED DEVICES

Filed June 5, 1961

11 Sheets-Sheet 10

FIG. 10

INVENTOR.
CLIFFORD B. ADAMS
BY
ATTORNEY

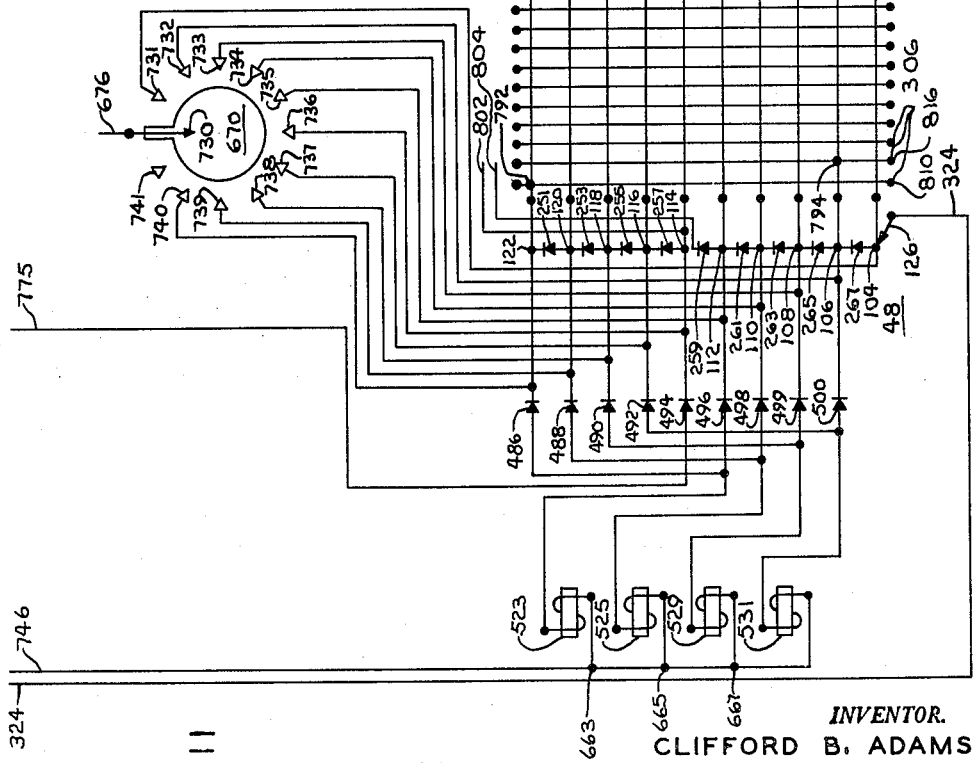

United States Patent Office 3,145,820
Patented Aug. 25, 1964

3,145,820
MONEY-ACTUATED DEVICES
Clifford B. Adams, Bellefontaine Neighbors, Mo., assignor to National Rejectors, Inc., St. Louis, Mo., a corporation of Missouri
Filed June 5, 1961, Ser. No. 114,966
60 Claims. (Cl. 194—4)

This invention relates to improvements in money-actuated devices. More particularly, this invention relates to improvements in money-actuated devices which can dispense products and which can dispense change.

It is, therefore, an object of the present invention to provide an improved money-actuated device which can dispense products and which can dispense change.

This invention is, in part, a continuation of, and is, in part, an improvement upon, the invention shown and described in my co-pending application Serial No. 65,030 for Money-Actuated Devices which was filed on October 26, 1960.

The money-actuated device provided by the present invention has selection switches that can be actuated by patrons to energize electrically-operated, mechanically-latched, selection relays. Those relays will cause the money-actuated device to determine whether the amounts of money inserted by the patrons fall short of or equal or exceed the selling prices of the desired products, cause that money-actuated device to determine whether there are enough bills available for change-making purposes where the amounts of money inserted by the patrons exceed the selling prices of the desired products, cause that money-actuated device to determine whether there are enough coins available for change-making purposes where the amounts of money inserted by the patrons exceed the selling prices of the desired products, cause that money-actuated device to determine whether the desired products are available, cause that money-actuated device to deduct the selling prices of the desired products from the amounts of money inserted by the patrons, and cause that money-actuated device to vend the desired products where the amounts of money inserted by the patrons equal or exceed the selling prices of the desired products and where the desired products are available and where the required change is available. The mechanical latching of those relays is important because it enables those relays to make certain that the money-actuated device performs all of the foregoing functions even though power failures may occur. For example, if power failures were to occur during electrical storms, the selection relays would respond to subsequent re-establishment of the electric power to cause the money-actuated device to complete its performance of the foregoing functions; and, in doing so, those relays would make certain that the patrons obtained the products which they had selected and would also make certain that those patrons received full credit for the amounts of money which they had inserted. It is, therefore, an object of the present invention to provide a money-actuated device which utilizes electrically-operated, mechanically-latched selection relays.

The electrically-operated, mechanically-latched relays in the money-actuated device provided by the present invention have setting coils and have restoring coils; and those relays automatically de-energize the setting coils thereof almost immediately after those setting coils have been energized. This is desirable because it keeps the setting coils of those relays from being energized for prolonged periods of time by patrons who might hold the selection switches in actuated position for prolonged periods of time. As a result, the money-actuated device provided by the present invention is able to respond to actuation of the selection switches thereof, and yet is able to protect the setting coils of the electrically-operated, mechanically-latched relays thereof against prolonged energization. It is, therefore, an object of the present invention to provide a money-actuated device with electrically-operated, mechanically-latched selection relays which respond to the actuation of selection switches but which protect the setting coils thereof against prolonged energization.

The selection switches of the money-actuated device provided by the present invention must be actuated to energize the setting coils of the electrically-operated, mechanically-latched selection relays, and those selection switches must return to their normal conditions before the re-setting coils of those selection relays can be energized. This is desirable because it keeps the sticking of a selection switch from providing recurrent energizations of a setting coil of a selection relay. Further, this is desirable because it keeps a patron from obtaining two or more products at the same time by rapidly actuating a number of selection switches. It is, therefore, an object of the present invention to provide a money-actuated device wherein a selection switch must be actuated to energize the setting coil of a selection relay and wherein that selection switch must return to its normal condition before the re-setting coil of that relay can be energized.

The re-setting coils of the electrically-operated, mechanically-latched selection relays in the money-actuated device of the present invention can not be energized between the time a selection has been made and the time the desired product has actually been vended. This is desirable because it makes certain that the patron will actually receive the desired product even though he or someone else inadvertently actuates a further selection switch. It is, therefore, an object of the present invention to provide a money-actuated device wherein the re-setting coils of the electrically-operated, mechanically-latched selection relays can not be energized between the time a selection has been made and the time the desired product has actually been vended.

The money-actuated device provided by the present invention can be set to pay out any change, that may be due the patron, as soon as the desired product has been dispensed, or it can be set to pay out any change, that may be due the patron, only after the patron has actuated a change payout switch. Where that money-actuated device is set to pay out change after the dispensing of the desired product, the insertion of an amount of money which exceeds the selling price of the desired product will be followed by the prompt dispensing of the required amount of change. However, where that money-actuated device is set so change will not be dispensed until the patron actuates the change payout switch, successive selections of the same or different products can be made; and thereafter the patron can actuate the change payout switch to effect the dispensing of the required change. This arrangement enables that money-actuated device to be set to meet the desires of patrons and operators in different trade areas. It is, therefore, an object of the present invention to provide a money-actuated device which can be set to automatically dispense change whenever it dispenses the desired product or which will dispense change only after the patron actuates the change payout switch.

The money-actuated device of the present invention uses stepping switches in registering credits when money is inserted, uses those same switches in sensing for the presence or absence of registered credits which equal or exceed the selling prices of the desired products, uses those same switches in deducting the selling prices of the desired products from the registered credits, and uses those same switches in determining the number and denomination of the units of money to be dispensed as change. Relays and diodes are associated with those stepping switches; and those relays and diodes coact with those stepping switches to precisely and positively determine whether the registered credits fall short of or equal or exceed the selling prices of the desired products. It is, therefore, an object of the present invention to provide stepping switches that help register credits, that help sense for the presence of credits, that help deduct the selling prices of the desired products, and that help determine the dispensing of change, and that coact with relays and diodes to precisely and positively determine whether the registered credits fall short of or equal or exceed the selling prices of the desired products.

Some of the diodes are associated with the stepping switches in such a way that they will block the flow of current whenever the wipers of those switches are in positions corresponding to registered credits which fall short of the selling prices of the desired products, that they will permit alternating current to flow whenever the wipers of those switches are in positions corresponding to registered credits which equal the selling prices of the desired products, and that they will permit direct current to flow whenever the wipers of those switches are in positions corresponding to registered credits which exceed the selling prices of the desired products. Those diodes coact with those stepping switches to provide responses which are so mutually distinct as to elimnate all likelihood of inaccurate sensing of registered credits. It is, therefore, an object of the present invention to provide a money-actuated device with stepping switches and diodes that will block the flow of current whenever the wipers of those switches are in positions corresponding to registered credits which fall short of the selling prices of the desired products, that will permit alternating current to flow whenever the wipers of those switches are in positions corresponding to registered credits which equal the selling prices of the desired products, and that will permit direct current to flow whenever the wipers of those switches are in positions corresponding to registered credits which exceed the selling prices of the desired products.

Deductor switches can coact with the stepping switches and with the diodes and with further diodes to block the flow of current as long as the wipers of those deductor switches are directly connected to stepping switch contacts intermediate the price-setting pins and the "zero" contacts of those stepping switches, to permit alternating current to flow when the wipers of those deductor switches are directly connected to stepping switch contacts at the levels of the price-setting pins, and to permit direct current to flow when the wipers of those deductor switches are directly connected to stepping switch contacts above the levels of the price-setting pins. As a result, those deductor switches can coact with the stepping switches and with the diodes and with further diodes to provide responses which are so mutually distinct as to eliminate all likelihood of inaccurate deducting of credits. It is, therefore, an object of the present invention to provide deductor switches that can coact with the stepping switches and with the diodes and with further diodes to block the flow of current as long as the wipers of those deductor switches are directly connected to stepping switch contacts intermediate the price-setting pins and the "zero" contacts of those stepping switches to permit alternating current to flow when the wipers of those deductor switches are directly connected to stepping switch contacts at the levels of the price-setting pins, and to permit direct current to flow when the wipers of those deductor switches are directly connected to stepping switch contacts above the levels of the price-setting pins.

The money-actuated device of the present invention permits patrons to actuate selection switches corresponding to the desired products but will not dispense those products in the event the registered credits exceed the selling prices of the desired products and the supply of bills or coins available for change-making purposes is insufficient to make certain that the patron will receive correct change. In this way, the money-actuated device of the present invention avoids "short changing" of patrons. Further, that money-actuated device will not dispense those products in the event the registered credits fall short of the selling prices of those products. Yet, that money-actuated device will promptly dispense those products in the event the registered credits equal the selling prices of those products or in the event the registered credits exceed the selling prices of those products and there is a sufficient supply of bills and coins to make change. In this way, the coin-actuated device of the present invention fully protects its patrons, fully protects its operator, and makes the desired products readily available. It is, therefore, an object of the present invention to provide a money-actuated device which can permit patrons to actuate selection switches corresponding to desired products but which will not dispense those products in the event the registered credits exceed the selling prices of the desired products and there is an insufficient supply of change, but will promptly dispense those products in the event the registered credits equal the selling prices of those products or in the event the registered credits exceed the selling prices of those products and there is a sufficient supply of bills and coins to make change.

The money-actuated device provided by the present invention can dispense bills and can dispense coins as change. In the event the supply of bills for change-making purposes becomes insufficient, the money-actuated device will not dispense any products requiring the dispensing of bills as change, but can continue to dispense products which require only the dispensing of coins as change. In this way, patrons will not be disappointed, and the operator of the money-actuated device will not needlessly lose sales. It is, therefore, an object of the present invention to provide a money-actuated device which can pay out bills as change and which can pay out coins as change, and which will continue to dispense products requiring only the dispensing of coins as change even though the supply of bills for change-making purpose is insufficient.

The money-actuated device of the present invention has a lamp which can illuminate lens or a sign that is visible from the exterior of that device to advise patrons that they must insert amounts of money which just equal the selling prices of the desired products. That lamp will be controlled by circuits which will permit that lamp to remain dark as long as the combinations of registered credits and selling prices do not render the money-actuated device incapable of making change but that will illuminate that lamp as soon as any combination of registered credit and selling price renders the money-actuated device incapable of making change. That lamp and those circuits will fully protect the patrons of the money-actuated device without causing the operator of that device to needlessly lose sales. It is, therefore, an object of the present invention to provide a lamp adjacent a lens or sign that is visible from the exterior of a money-actuated device and that is controlled by circuits which will permit that lamp to remain dark as long as the combinations of registered credits and selling prices do not render the money-actuated device incapable of making change but that will illuminate that lamp as soon as any combination of registered credit and selling price renders the money-actuated device incapable of making change.

The money-actuated device of the present invention holds bills and coins available for change-making purposes, and it also temporarily holds all inserted bills and coins in "escrow." If the patron decides she wants her money back, she can actuate a change payout switch and thereby retrieve the exact same bills and coins which she inserted. In doing so, she will not, in any way, diminish the supply of bills and coins that are available for change-making purposes. Further, she will be able to change her mind and retrieve the money she inserted even if the supply of bills and coins that are available for change-making purposes has become exhausted. It is, therefore, an object of the present invention to provide a money-actuated device that holds bills and coins available for change-making purposes and that also temporarily holds all inserted bills and coins in "escrow."

The money-actuated device of the present invention has a bill escrow which can receive bills and which can hold those bills available for movement to a bill cash box or back to the patron. That money-actuated device will respond to the validation of an inserted bill to energize the bill escrow and thereby cause that bill escrow to accept the bill from the bill transport and to store that bill. That bill escrow can subsequently respond to the actuation of the change payout switch to return that bill to the patron or can subsequently respond to the vending of the desired product to move that bill to the bill cash box. It is, therefore, an object of the present invention to provide a money-actuated device with a bill escrow that will become energized whenever a bill is validated and that will store that bill until the change payout switch is actuated or until the desired product is vended.

The bill escrow of the money-actuated device provided by the present invention includes bill-gripping members that receive validated bills from the bill transport; and that money-actuated device will control those bill-gripping members in such a way as to cause those members to move those bills short distances and then come to rest. When the desired product has been dispensed or when the change payout switch has been actuated, the money-actuated device will cause those bill-gripping members to move distances equal to the total space occupied by the maximum number of bills which could be accepted and accredited by the money-actuated device. In this way, the money-actuated device makes certain that all of the bills held by the bill escrow will be delivered to the bill cash box or to the patron.

The money-actuated device of the present invention has a lamp which is adjacent a lens or a sign that is visible from the exterior of that device and which is in the line of sight of patrons. That money-actuated device has a second lamp which is out of the line of sight of patrons but which can be readily seen by employees of the operator of the money-actuated device. Whenever the supply of a product desired by a patron becomes exhausted, both lamps will become illuminated; and the first lamp will indicate to the patron that he must make another selection, while the second lamp will indicate to employees of the operator of the money-actuated device that the supply of at least one product within the vending machine controlled by the money-actuated device has become exhausted. The lamp which indicates the need of making another selection will remain illuminated only as long as the selection switch corresponding to the exhausted product is held closed, but the second lamp will remain illuminated until the vending machine is opened and the supply of the desired product is replenished. In this way, the money-actuated device will provide a temporary signal in the line of sight of patrons which will advise the patrons that the supply of the desired product is exhausted and that another selection must be made, and will also provide a continuing signal to the employees of the operator of the money-actuated device that the supply of at least one product has become exhausted. It is, therefore, an object of the present invention to provide a money-actuated device that will provide a temporary signal in the line of sight of patrons which will advise the patrons that the supply of the desired product is exhausted and that another selection must be made, and will also provide a continuing signal to the employees of the operator of the money-actuated device that the supply of at least one product has become exhausted.

The money-actuated device of the present invention utilizes four electromagnets, utilizes the stepping switch that registers unit credits, and utilizes diodes to determine how many pennies are to be paid out as change. One combination of the diodes will block the flow of current from that wiper to those electromagnets whenever that wiper is in engagement with the zero contact of that switch. Another combination of the diodes will permit current to flow from that wiper to one of the electromagnets but will block the flow of current from that wiper to the rest of those electromagnets whenever that wiper is in engagement with the first or the sixth contact of that switch. Still another combination of the diodes will permit current to flow from that wiper to two of the electromagnets but will block the flow of current from that wiper to the rest of those electromagnets whenever that wiper is in engagement with the second or seventh contact of that switch. A further combination of the diodes will permit current to flow from that wiper to three of the electromagnets but will block the flow of current from that wiper to the last of those electromagnets whenever that wiper is in engagement with the third or eighth contact of that switch. Yet another combination of the diodes will permit current to flow from that wiper to all four of those electromagnets whenever that wiper is in engagement with the fourth or the ninth contact of that switch. The various combinations of the diodes provide such precise and definite control of the various electromagnets that there is no likelihood of paying out the wrong number of pennies. It is, therefore, an object of the present invention to provide a money-actuated device which utilizes electromagnets, utilizes the stepping switch that registers unit credits, and utilizes diodes to determine how many pennies are to be paid out as change.

Other and further objects and advantages of the present invention should become apparent from an examination of the drawing and accompanying description.

In the drawing and accompanying description, a preferred embodiment of the present invention is shown and described but it is to be understood that the drawing and accompanying description are for the purpose of illustration only and do not limit the invention and that the invention will be defined by the appended claims.

Figure 2:
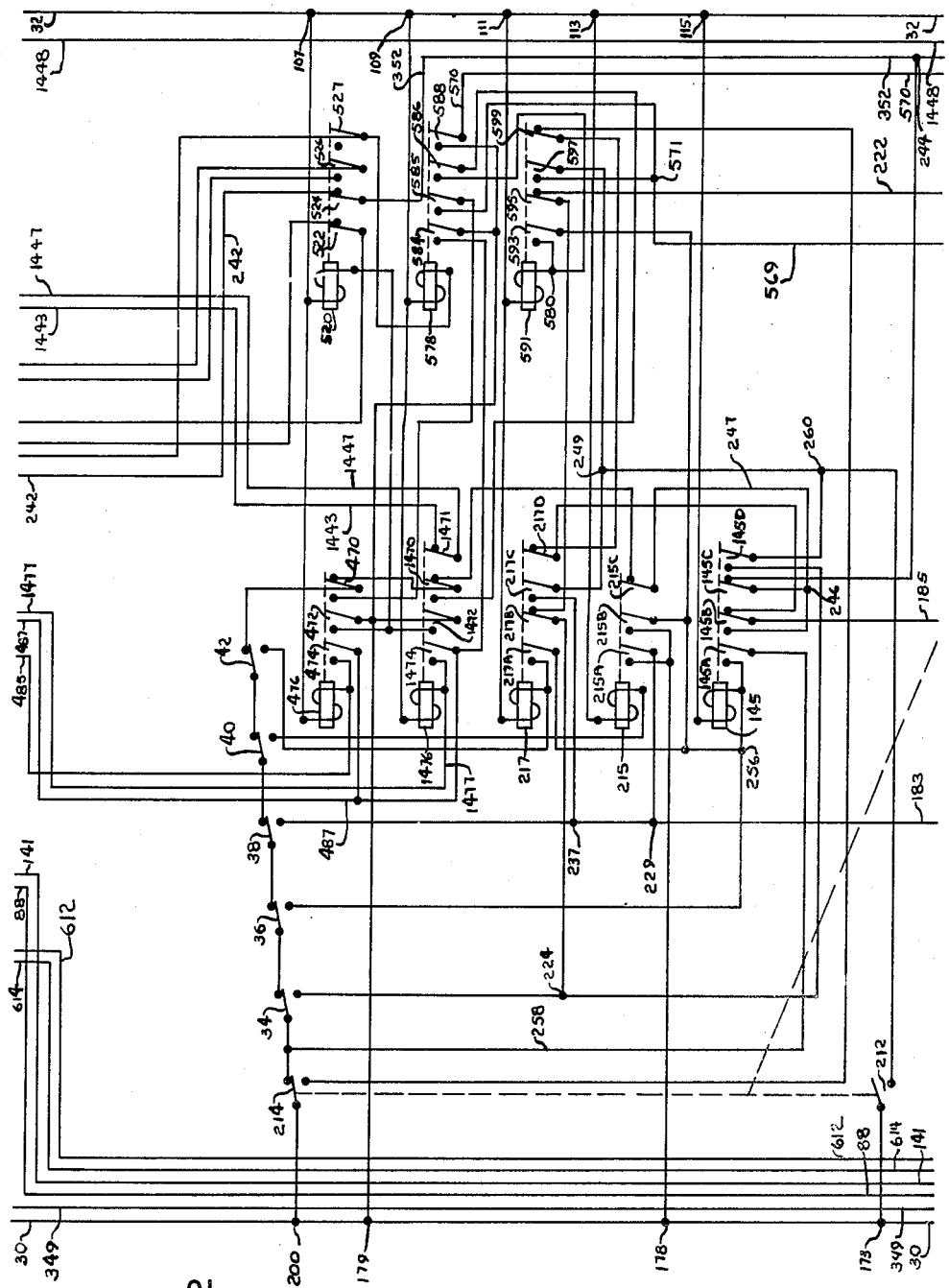
Figure 3:
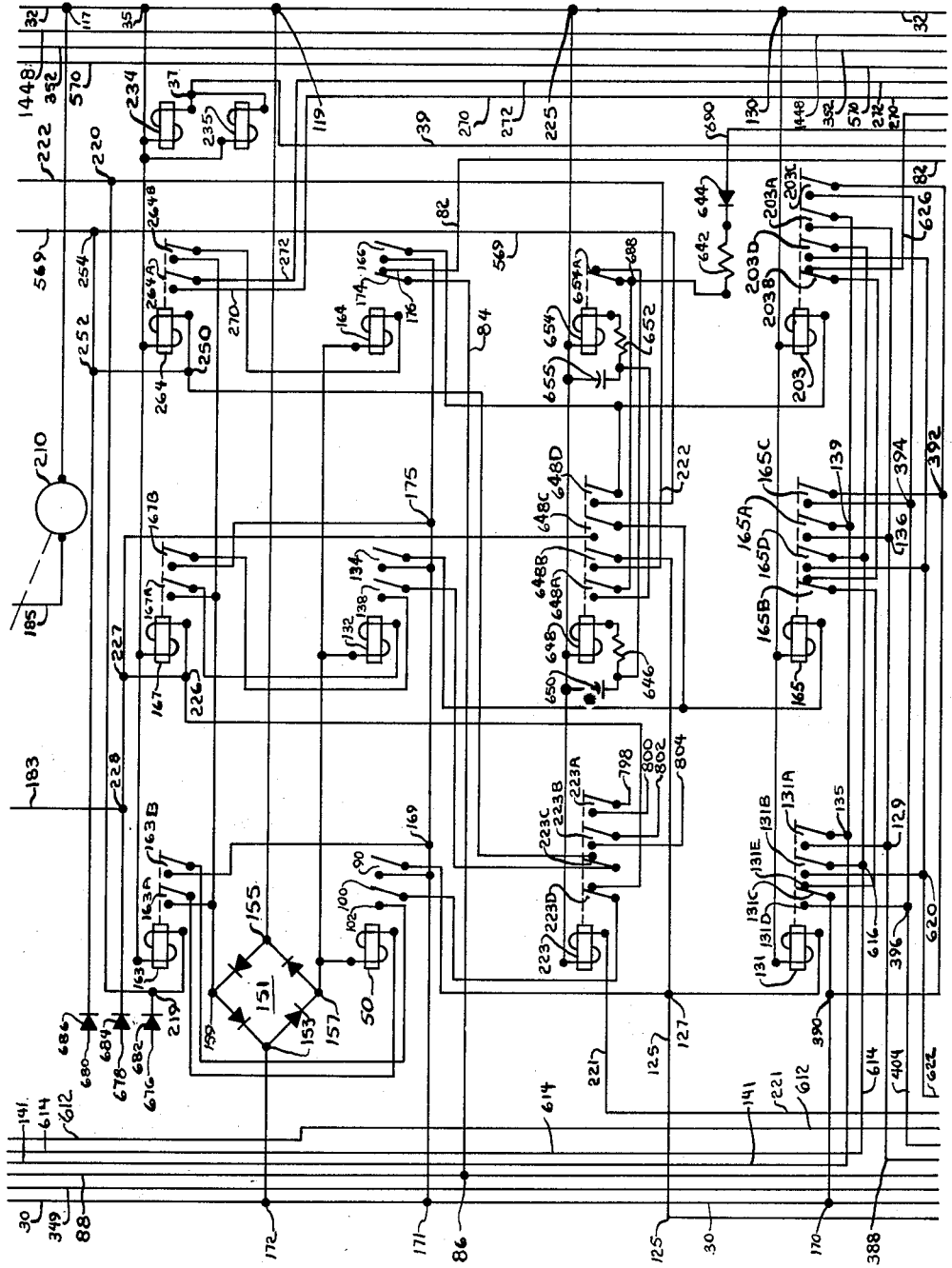
Figure 4:
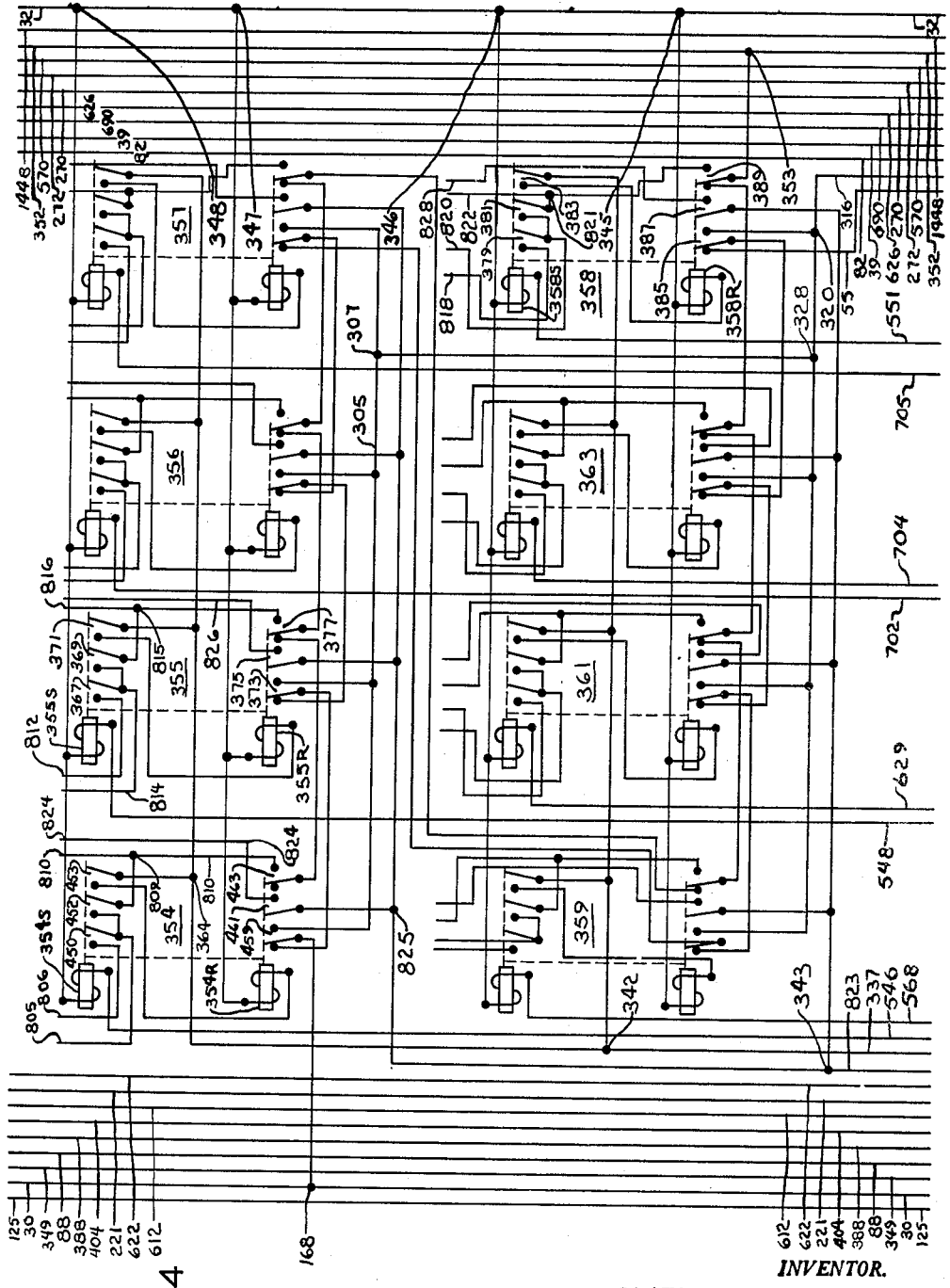
Figure 5:
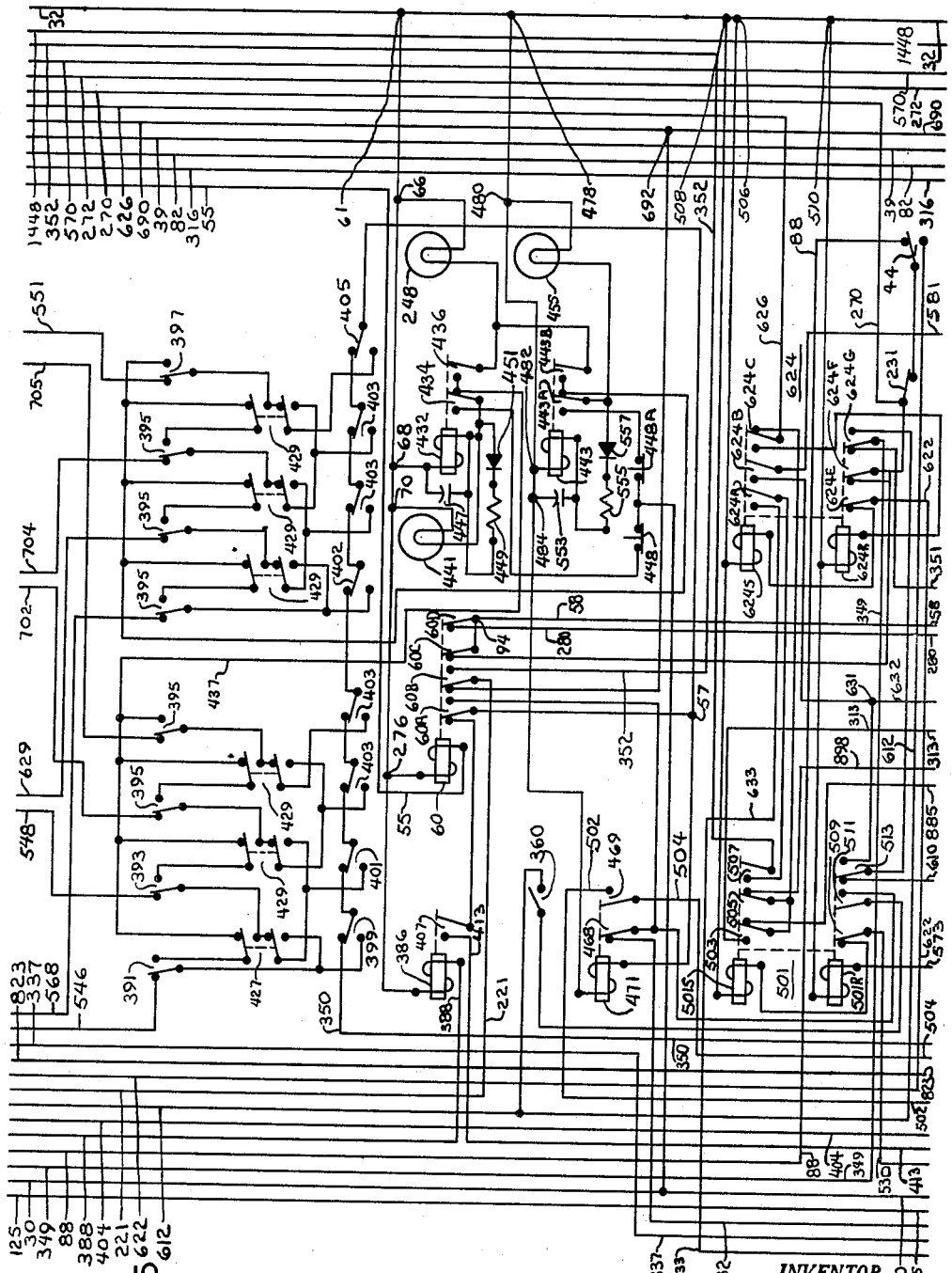
Figure 6:
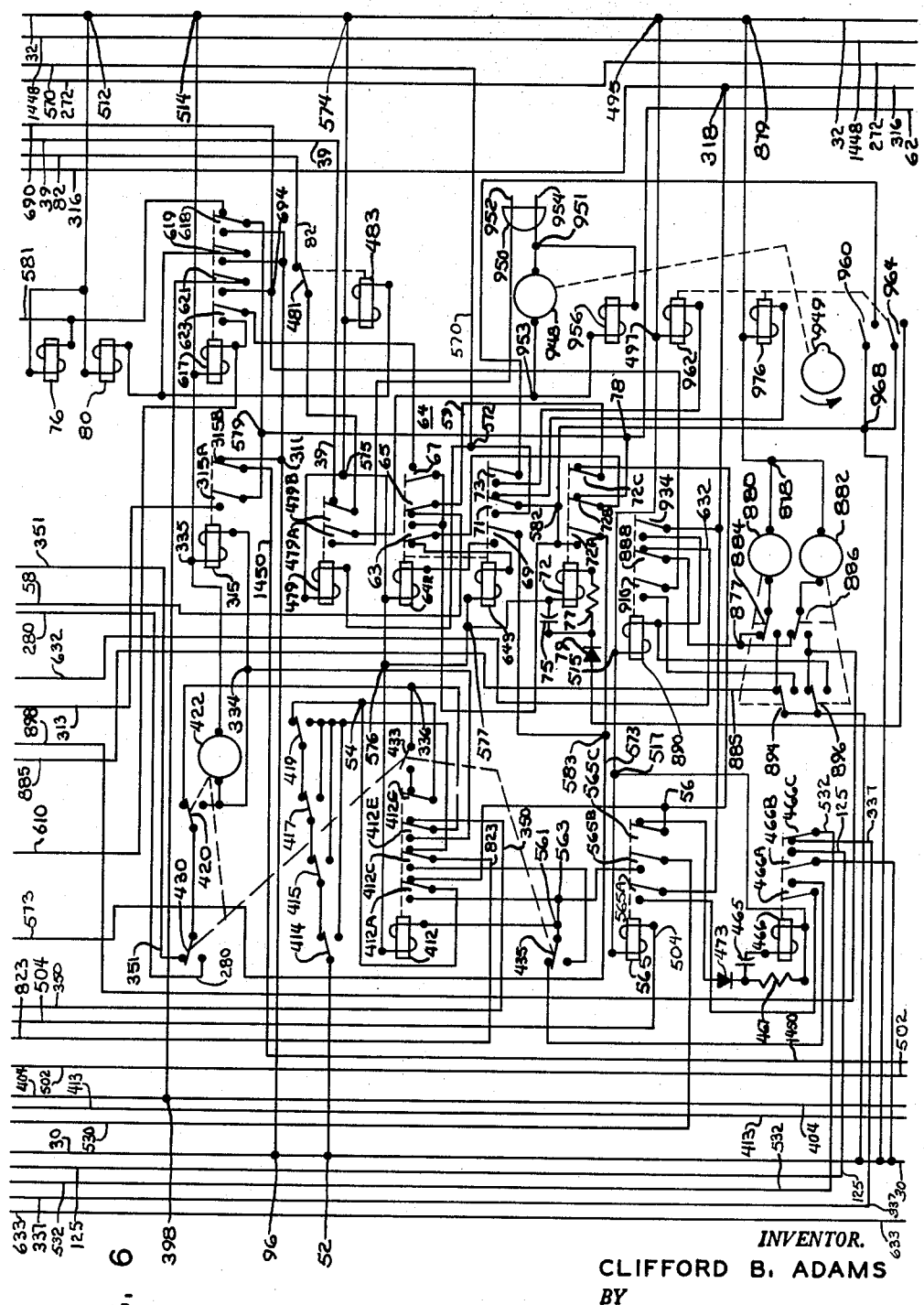
Figure 8:
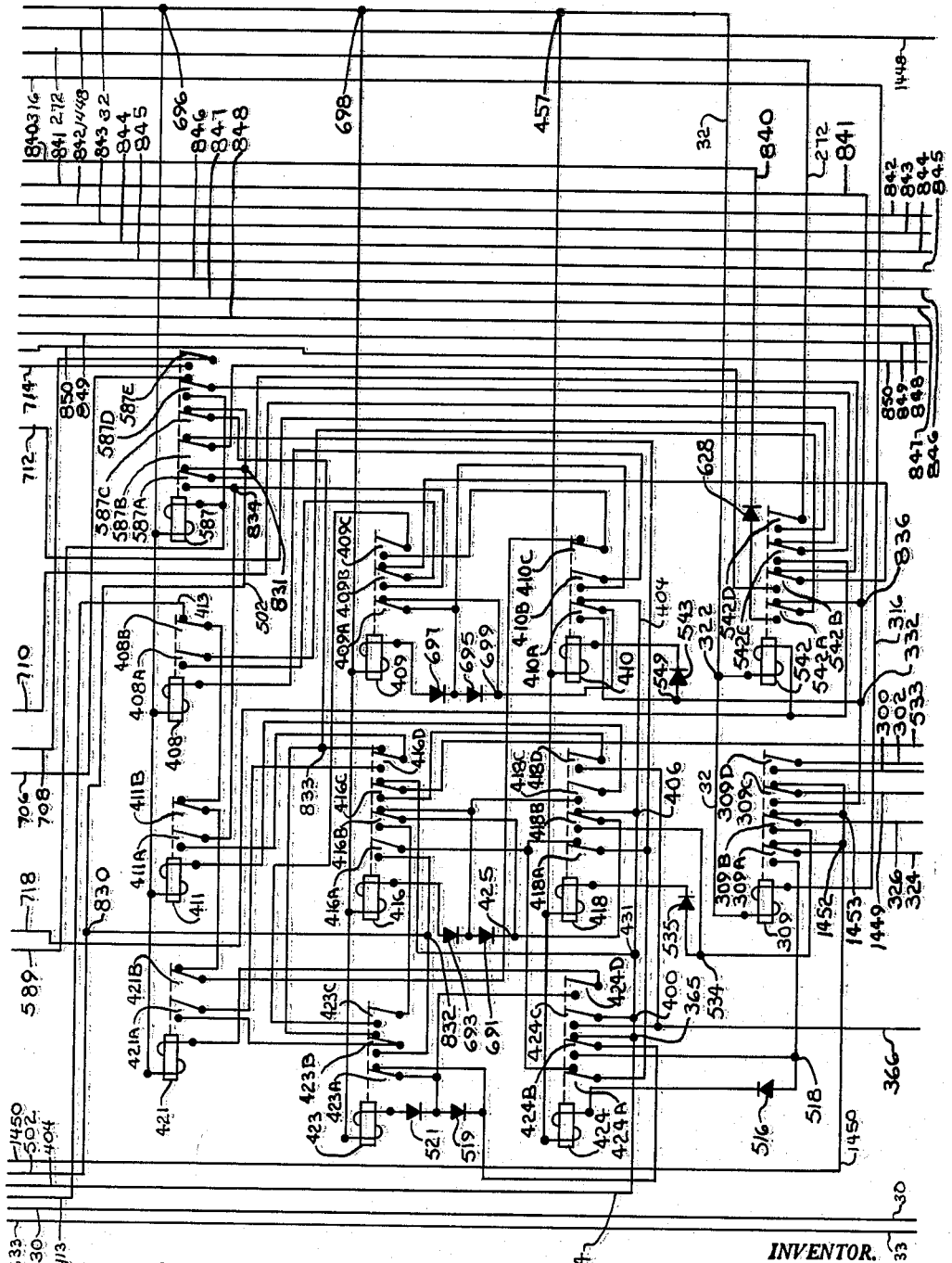
Figure 9:
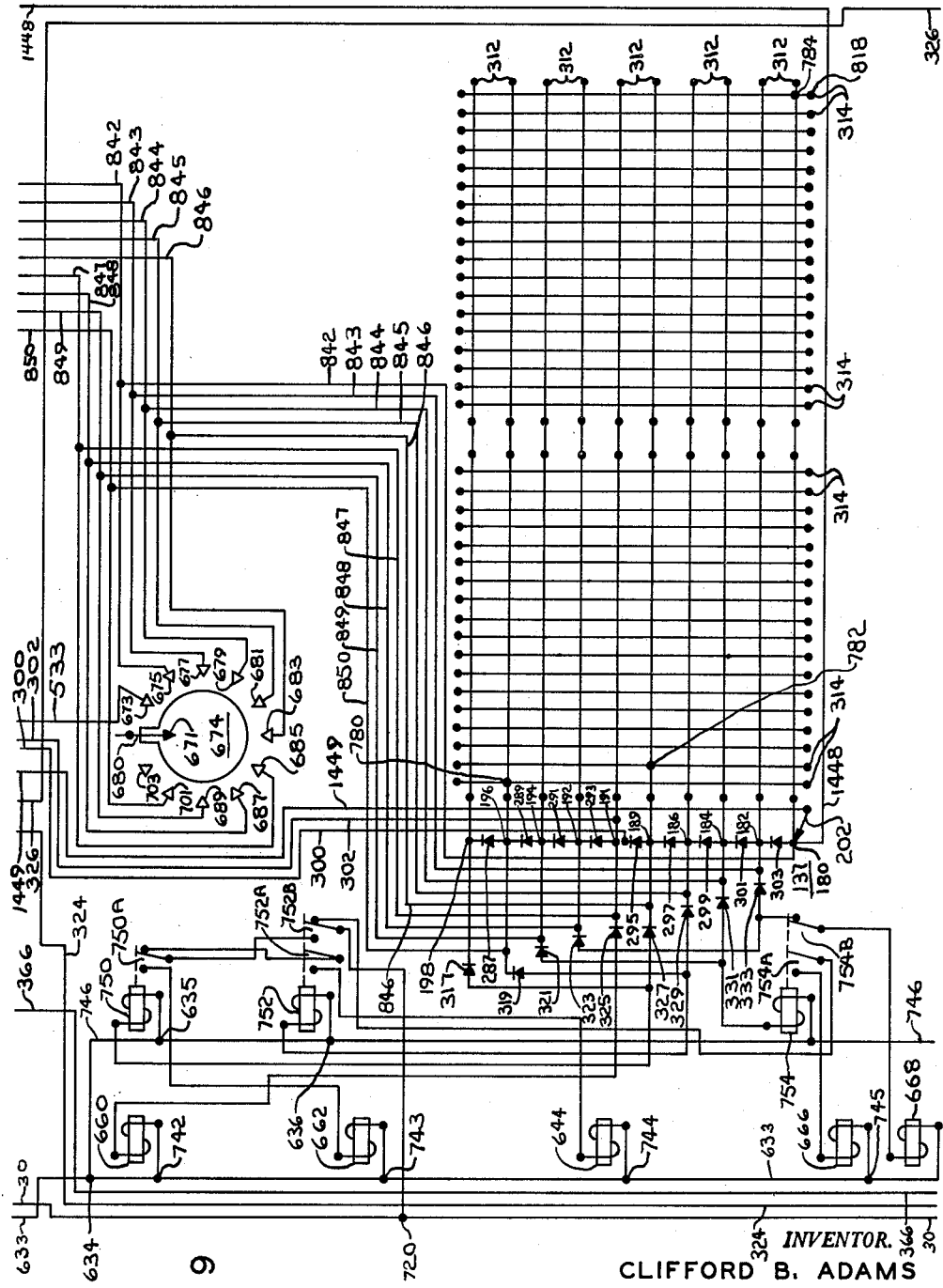

In the drawing, FIG. 1 is a schematic diagram of part of the circuit of the bill transport used in one embodiment of money-actuated device that is made in accordance with the principles and teachings of the present invention, FIG. 2 is a schematic diagram of part of the money registering circuit used in the money-actuated device of the present invention, FIG. 3 is a schematic diagram showing the coils of the stepping switches and showing some of the relays used in the money-actuated device of the present invention, FIG. 4 is a schematic diagram showing the selection relays used in the money-actuated device of the present invention, FIG. 5 is a schematic diagram showing the empty switches, the empty lamps, and some of the relays used in the money-actuated device of the present invention, FIG. 6 is a schematic diagram showing the escrow relay, the deduct motor, the delivery switches, the bill escrow motor, the bill payout motor, the coin payout motor and various relays used in the money-actuated device of the present invention, FIG. 7 is a schematic diagram showing empty lamps, bill empty switches, the coin empty switch, and a stepper switch used in the money-actuated device of the present invention, FIG. 8 is a schematic diagram showing credit-sensing relays used in the money-actuated device of the present invention, FIG. 9 is a schematic diagram showing electromagnets that effect the paying out of bills and showing the stepping switch and price setter corresponding to hundreds registration, FIG. 10 is a schematic diagram showing electromagnets that effect the paying out of nickels, dimes, quarters and fifty cent pieces and showing the stepping switch and price setter corresponding to tens registration, FIG. 11 is a schematic diagram showing electromagnets that effect the paying out of pennies and showing the stepping switch and price setter corresponding to units registration, and FIG. 12 is a view which shows how FIGS. 1–11 should be disposed in contiguous relation to make the circuit of the money-actuated device of the present invention complete.

Referring to the drawing in detail, the numeral 20 denotes a male plug which can be inserted in a suitable socket that is connected to a source of alternating current. That plug has prongs 22 and 23; and the prong 22 will be connected to a conductor 30 while the prong 23 will be connected to a conductor 32. A junction 28 connects the conductor 30 with one terminal of a unit 426, and a junction 26 connects the conductor 32 with another terminal of that unit. The unit 426 includes a tuned amplifier and a control element; and that unit can be identical to the similarly-numbered unit disclosed in co-pending Smith et al. application Serial No. 849,066 for Currency Detectors which was filed on October 27, 1959, now abandoned. The numeral 428 denotes the coil of a relay that has contacts 438, 439 and 440, and the contact 439 normally engages the contact 438 but can respond to energization of the coil 428 to shift into engagement with the contact 440. The numeral 446 denotes the coil of a relay that has contacts 442, 444 and 445, and the contacts 442 and 444 are normally open but can respond to energization of the coil 446 to close while the contacts 445 are normally closed but can respond to such energization to open. The numeral 462 denotes the coil of a relay that has contacts 454, 456, 458 and 460, and the contacts 460 are normally open and the contacts 456 is normally in engagement with the contact 454; but the contacts 460 will close and the contact 456 will shift into engagement with the contact 458 upon energization of the coil 462. The numeral 476 in FIG. 2 denotes the coil of a relay which has contacts 470, 472 and 474, and the contacts 472 and 474 are normally open while the movable contact 470 is normally in engagement with the right-hand fixed contact 470; but the contacts 472 and 474 will close and the movable contact 470 will shift into engagement with the left-hand fixed contact 470 upon energization of that coil. The relays which include the coils 446, 462 and 476 are part of a relay chain which is similar to a relay chain, in the said Smith et al. application, which has similarly-numbered relays and which also responds to the insertion of one dollar bills.

The numeral 1428 in FIG. 1 denotes the coil of a relay that has contacts 1438, 1439 and 1440, and the contact 1439 normally engages the contact 1438 but can respond to energization of the coil 1428 to shift into engagement with the contact 1440. The numeral 1446 denotes the coil of a relay which has contacts 1442, 1444 and 1445, and the contacts 1442 and 1444 are normally open but can respond to energization of the coil 1446 to close while the contacts 1445 are normally closed but can respond to such energization to open. The numeral 1462 denotes the coil of a relay which has contacts 1454, 1456, 1458 and 1460, and the contacts 1460 are normally open and the contact 1456 is normally in engagement with the contact 1454; but the contacts 1460 will close and the contact 1456 will shift into engagement with the contact 1458 upon energization of the coil 1462. The numeral 1476 in FIG. 2 denotes the coil of a relay which has contacts 1470, 1471, 1472 and 1474, and the contacts 1471 are normally closed and the contacts 1472 and 1474 are normally open while the movable contact 1470 is normally in engagement with the right-hand fixed contact 1470; but the contacts 1471 will open and the contacts 1472 and 1474 will close and the movable contact 1470 will shift into engagement with the left-hand fixed contact 1470 upon energization of that coil. The relays which include the coils 1446, 1462 and 1476 are part of a relay chain which is similar to a relay chain, in the said Smith et al. application; but, in the particular embodiment shown and described herein, this second relay chain responds to the insertion of five dollar bills rather than to the insertion of one dollar bills.

The numeral 230 in FIG. 1 denotes a solenoid that is similar to the similarly-numbered solenoid in Daniel J. Schepflin application Serial No. 73,016 for Currency Detectors which was filed on December 1, 1960. The plunger of that solenoid is normally in extended position, and will normally hold the leading edges of the bill-gripping belts of the bill transport spaced apart, will normally hold the switch 232 in FIG. 1 open, and will normally hold the switch 231 in FIG. 5 closed. The solenoid 230 is part of the bill transport used in the money-actuated device of the present invention.

The numerals 274, 278 and 286 in FIG. 1 denote switches which are part of the bill transport; and the actuators of those switches extend into the path of movement of bills moved by that bill transport. Those switches are normally open but will close when the leading edge of a bill strikes the actuators thereof. The switches 274 and 278 are located adjacent the front of the bill transport while the switch 286 is spaced rearwardly of those switches.

The numeral 188 in FIG. 1 denotes an electric motor which is used in the bill transport. That motor is a reversible motor, and it has a capacitor 190 connected in series with the phase winding thereof.

The numeral 233 in FIG. 1 denotes a switch which is operated by a coin-return electromagnet 234 in FIG. 3. That electromagnet responds to the energization thereof to close the switch 233 and to withdraw coin-intercepting stops, not shown, from the passageways for nickels, dimes, quarters and fifty cent pieces. Whenever that electromagnet is de-energized, those stops will extend into those passageways and will reject coins introduced into those passageways, thereby preventing the acceptance of such coins. Also when that electromagnet is de-energized, the switch 233 will be open.

The numeral 235 in FIG. 3 denotes an electromagnet which is connected in parallel with the electromagnet 234. The electromagnet 235 has a coin-intercepting stop, not shown, associated with it; and whenever that electromagnet is de-energized that stop will extend into the passageway for pennies and will reject all pennies that are inserted. However, whenever that electromagnet is energized, that stop will be withdrawn from the passageway for pennies and hence pennies can be accepted.

The numeral 340 in FIG. 1 denotes a normally-open push button; and one of the terminals of that push button is connected to the fixed contact of the switch 233. The other terminal of the push button 340 is connected to the coil 528 of a relay by a resistor 539, a diode 540, and a resistor 538. A capacitor 536 is connected in parallel with the serially-connected resistor 538 and coil 528. The coil 528, the diode 540, the capacitor 536 and the resistor 538 are similar to the similarly-numbered components in the said Schepflin application. Relay contacts 537, 541, 545 and 547 are disposed adjacent the coil 528, and contacts 537 are normally open while contacts 541, 545 and 547 are normally closed. However, energization of the coil 528 will open the contacts 541, 545 and 547 and will close the contacts 537.

The numeral 544 in FIG. 1 denotes the coil of a relay that has contacts 550, 552, 554, 556, 558, 560, 562, 564, 566 and 567. The contacts 567 are normally closed, the contact 552 normally engages the contact 554, the contact 558 normally engages the contact 560, and the contact 564 normally engages the contact 566. Upon energization of the coil 544, the contacts 567 will open and contact 552 will engage contact 550, contact 558 will engage contact 556, and contact 564 will engage contact 562. The contacts 550, 552, 554, 556, 558, 560, 562, 564 and 566 are similar to the similarly-numbered contacts in the said Schepflin application.

The numeral 290 in FIG. 1 denotes a switch that is part of the bill transport and that has the actuator thereof disposed in the path of bills moved by that bill transport. The movable contact of that switch is normally in engagement with the upper fixed contact of that switch but will respond to the engagement of the leading edge of a bill with the actuator of that switch to move downwardly into engagement with the lower contact of that switch. The switch 290 is similar to the similarly-numbered switch in the said Schepflin application.

The numeral 282 denotes a switch which is part of the bill transport; and it has the actuator thereof disposed in the path of bills moved by that bill transport. The fixed contact of that switch is connected to a solenoid 330 which is part of the bill transport; and the armature of that solenoid is connected to a roller that is mounted adjacent the air gap of the magnetic head of that bill transport. Whenever the switch 282 is closed by the leading edge of a bill, the solenoid 330 will be energized and will cause that roller to force that bill upwardly into engagement with the air gap of that magnetic head, all as explained in the said Schepflin application.

The numerals 294 and 298 in FIG. 1 denote switches which are mounted adjacent the rear of the bill transport and which have the actuators thereof disposed in the path of bills moved by that bill transport. Those switches are normally open but will close whenever a bill engages the actuators thereof. The switches 294 and 298 are connected in parallel.

The numeral 344 denotes a solenoid which is part of the bill transport; and as long as that solenoid is de-energized it will cause the gate, not shown, of that bill transport to remain in raised position. However, whenever that solenoid is energized, it will permit that gate to move downwardly; and if that gate does not encounter a sturdy thread, tape or other attachment secured to the bill, that gate will move downwardly far enough to cause the movable contact of the switch 362 to shift out of engagement with its upper fixed contact and into engagement with its lower fixed contact. The solenoid 344, the gate switch 362, and the gate associated therewith are similar to the corresponding solenoid, gate switch and gate in the said Schepflin application.

Referring to FIG. 2, the numeral 34 denotes a switch that is actuated by pennies that are introduced into the money-actuated device, the numeral 36 denotes a switch that is actuated by nickels introduced into that money-actuated device, the numeral 38 denotes a switch that is actuated by dimes introduced into that money-actuated device, the numeral 40 denotes a switch that is actuated by quarters introduced into that money-actuated device, and the numeral 42 denotes a switch that is actuated by fifty cent pieces introduced into that money-actuated device. The switches 34, 36, 38, 40 and 42 are single pole, double throw switches, and the movable contacts of those switches are normally in engagement with the upper fixed contacts of those switches. The coins will preferably pass through one or more slug rejectors before they engage the actuators of those switches.

A single pole, double throw switch 214 in FIG. 2 has the movable and upper contacts thereof connected intermediate the conductor 30 and the movable contact of the switch 34 by junction 200. The movable contact of the switch 214 normally engages the upper contact of that switch, but it can respond to rotation of a cam on the output shaft by a motor 210 in FIG. 3 to move down into engagement with the lower contact of that switch. A multi-lobe cam on the output shaft of the motor 210 can close and re-open a single pole, single throw normally-open switch 212 in FIG. 2 five times during each revolution of that shaft.

The numeral 520 in FIG. 2 denotes the coil of a relay that has contacts 522, 524, 526 and 527, and the contacts 522 and 524 are normally closed while the contacts 526 and 527 are normally open. The coil 520 and the contacts 522, 524 and 526 are similar to similarly-numbered components in the said Schepflin application.

The numeral 578 in FIG. 2 denotes the coil of a relay that has contacts 584, 585, 586 and 588. All of those contacts are normally open, but they will respond to energization of the coil 578 to close.

The numeral 591 in FIG. 2 denotes the coil of a relay that has contacts 593, 595, 597 and 599. The contacts 593 and 597 are normally open and the contacts 595 and 599 are normally closed. Energization of the coil 591 will cause the contacts 593 and 597 to close and will cause the contacts 595 and 599 to open.

The numeral 217 in FIG. 2 denotes the coil of a relay which has contacts 217A, 217B, 217C and 217D. The contacts 217A and 217C are normally open and the contacts 217B and 217D are normally closed; but when the coil 217 is energized, the contacts 217A and 217C will close and the contacts 217B and 217D will open.

The numeral 215 in FIG. 2 denotes the coil of a relay which has contacts 215A, 215B and 215C. The contacts 215A and 215B are normally open and the contacts 215C are normally closed; but when the coil 215 is energized the contacts 215A and 215B will close and the contacts 215C will open.

The numeral 145 in FIG. 2 denotes the coil of a relay which has contacts 145A, 145B, 145C and 145D. The contacts 145A and 145D are normally open and the contacts 145C are normally closed. The movable contact 145B is normally in engagement with the right-hand fixed contact 145B; but that movable contact can respond to energization of the coil 145 to move into engagement with the left-hand fixed contact 145B. The contacts 145C will respond to such energization to close and the contacts 145A and 145D will respond to such energization to close.

The numeral 676 denotes a conductor which has one end thereof connected to the anode of a diode 682 in FIG. 3, and which has the other end thereof connected to a contact 730 of a deductor switch 670 in FIG. 11. The numeral 678 denotes a conductor which is connected to the anode of a diode 684 in FIG. 3, and which has the other end thereof connected to a contact 707 of a deductor switch 672 in FIG. 10. The numeral 680 denotes a conductor which is connected to the anode of a diode 686 in FIG. 3, and which has the other end thereof connected to a contact 671 of a deductor switch 674 in FIG. 9.

The numeral 163 in FIG. 3 denotes the coil of a relay which has contacts 163A and 163B. Those contacts are normally open, but they will respond to energization of of the coil 163 to close.

The numeral 167 in FIG. 3 denotes the coil of a relay which has contacts 167A and 167B. Those contacts are normally open, but they will respond to energization of the coil 167 to close.

The numeral 264 in FIG. 4 denotes the coil of a relay which has contacts 264A and 264B. Those contacts are normally open, but they will respond to energization of the coil 264 to close.

The numeral 151 in FIG. 3 denotes a full-wave bridge rectifier which has the input terminal 153 thereof connected to the conductor 30 by a junction 172. The input terminal 155 of that bridge rectifier is connected to the conductor 32 by a junction 119. The output terminals of the bridge rectifier 151 are denoted by the numerals 157 and 159.

The numeral 50 in FIG. 3 denotes the coil of a stepping switch 48 in FIG. 11; and that coil and switch are similar to the similarly-numbered components in my said co-pending application. The numeral 90 in FIG. 3 denotes contacts on the stepping switch 48, and those contacts are normally open; but whenever the wiper 126 of that stepping switch 48 is displaced from its zero contact 104, the contacts 90 will be closed. The numerals 100 and 102 in FIG. 3 denote further contacts on the stepping switch 48, and those contacts are normally open. The contacts 100–102 will close only when the wiper 126 of the stepping switch 48 engages its ninth contact 122.

The numeral 132 in FIG. 3 denotes the coil of a stepping switch 133 in FIG. 10 and that coil and switch are similar to the similarly-numbered components in my said co-pending application. The numeral 134 in FIG. 3 denotes contacts on the stepping switch 133, and those contacts are normally open; but whenever the wiper 143 of that stepping switch is displaced from its zero contact 144, the contacts 134 will be closed. The numeral 138 in FIG. 3 denotes further contacts on the stepping switch 133, and those contacts are normally open. The contacts 138 will close only when the wiper 143 of the stepping switch 133 engages its ninth contact 162.

The numeral 164 in FIG. 3 denotes the coil of a stepping switch 137 in FIG. 9; and that coil and switch are similar to the similarly-numbered components in my said co-pending application. The numeral 166 in FIG. 3 denotes contacts on the stepping switch 137, and those contacts are normally open; but whenever the wiper 202 of that stepping switch is displaced from its zero contact 180, the contacts 166 will be closed. The numerals 174 and 176 in FIG. 3 denote further contacts on the stepping switch 137, and those contacts are normally open. The contacts 174–176 will close only when the wiper 202 of the stepping switch 137 engages its ninth contact 198.

The numeral 223 in FIG. 3 denotes the coil of a relay that has contacts 223A, 223B, 223C and 223D. The contacts 223A and 223B are normally open and the contacts 223C and 223D are normally closed. Energization of the coil 223 will open the contacts 223C and 223D and will close the contacts 223A and 223B.

The numeral 648 in FIG. 3 denotes the coil of a relay that has contacts 648A, 648B, 648C and 648D. Those contacts are normally open but will respond to energization of the coil 648 to close. A resistor 646 is connected in series with the coil 648, and a capacitor 650 is connected in parallel with the serially-connected resistor 646 and coil 648. The resistor 646, the capacitor 650 and the coil 648 will coact to hold that coil energized for a finite period of time after that coil has been disconnected from the conductor 30.

The numeral 654 in FIG. 3 denotes the coil of a relay which has normally closed contacts 654A. A resistor 652 is connected in series with the coil 654, and a capacitor 655 is connected in parallel with the serially-connected coil 654 and resistor 652. The resistor 652 and the capacitor 655 will coact with the coil 654 to keep that coil energized for a finite period of time after that coil has been disconnected from the conductor 30.

The numeral 644 in FIG. 3 denotes a diode which can provide half-wave rectified current for the coils 648 and 654. A resistor 642 is connected to the cathode of the diode 644 and to a junction 688 adjacent the contacts 654A, and that resistor serves as a current-limiting resistor for that diode.

The numeral 131 in FIG. 3 denotes the coil of a relay that has contacts 131A, 131B, 131C, 131D and 131E. The contact 131C is normally in engagement with the contact 131E and the contacts 131A and 131B are normally open. The contacts 131A and 131B will respond to the energization of coil 131 to close, and the contact 131C will respond to such energization to shift into engagement with the contact 131D.

The numeral 165 in FIG. 3 denotes the coil of a relay that has contacts 165A, 165B, 165C and 165D. The contacts 165A, 165C and 165D are normally open and the contacts 165B are normally closed. Energization of the coil 165 will cause the contacts 165B to open and will cause the contacts 165A, 165C and 165D to close.

The numeral 203 in FIG. 3 denotes the coil of a relay that has contacts 203A, 203B, 203C and 203D. The contacts 203A, 203C and 203D are normally open and the contacts 203B are normally closed. Energization of the coil 203 will open the contacts 203B and will close the contacts 203A, 203C and 203D.

The numeral 354 in FIG. 4 generally denotes a two coil electrically-operated, mechanically-latched relay of standard and usual construction. That relay includes a setting coil 354S which controls contacts 450, 452 and 453, and also includes a re-setting coil 354R which controls contacts 459, 461 and 463. One such relay that has been found to be usable is the Type KB latching relay made by Potter and Brumfield of Princeton, Indiana.

The contacts 450, 452 and 453 are normally open and the contacts 461 also are normally open. The movable contacts 459 and 463 are, respectively, normally in engagement with the left-hand fixed contacts 459 and 463. Whenever the coil 354S is energized, the contacts 450, 452 and 453 will close, and the armature of the coil 354R will shift the movable contacts 459 and 463 into engagement with the right-hand contacts 459 and 463 and will also close the contacts 461. The various contacts 450, 452, 453, 459, 461 and 463 will then remain in their shifted positions, even though the coil 354S is energized only momentarily. However, when the coil 354R is subsequently energized, the contacts 450, 452, 453, 459, 461 and 463 will then return to their normal positions.

The numeral 355 in FIG. 4 denotes another two coil electrically-operated, mechanically-latched relay which is identical to the relay 354. That relay has a setting coil 355S which controls normally-open contacts 367, 369 and 371, and it has a re-setting coil 355R which controls contacts 373, 375 and 377. In their normal positions the contacts 367, 369, 371 and 375 are open and the movable contacts 373 and 377 are in engagement with the left-hand contacts 373 and 377. Whenever the coil 355S is energized, the contacts 367, 369 and 371 will close, and the armature of the coil 355R will shift and close the contacts 375 and cause the movable contacts 373 and 377 to shift into engagement with the right-hand contacts 373 and 377. The various contacts 367, 369, 371, 373, 375 and 377 will then remain in shifted position until such time as the coil 355R is energized; and thereupon all of those contacts will return to their normal positions.

The numerals 356, 357, 359, 361 and 363 denote two coil electrically-operated, mechanically-latched relays which are identical to the relay 354. Fewer or more relays, identical to the relay 354, could be used; and the number shown is merely representative. The numeral 358 in FIG. 4 denotes yet another two coil electrically-operated, mechanically-latched relay which is identical to the relay 354. That relay has a setting coil 358S which controls normally-open contacts 379, 381 and 383, and has a re-setting coil 358R which controls contacts 385, 387 and 389. The contacts 387 are normally open and the movable contacts 385 and 389 normally engage the left-hand contacts 385 and 389. Whenever the coil 358S is energized, the contacts 379, 381 and 383 will close, and the armature of the coil 358R will cause the contacts 387 to close and will cause the movable contacts 385 and 389 to shift into engagement with the right-hand contacts 385 and 389. The various contacts of relay 358 will then remain in shifted position until the coil 358R is energized; and thereupon all of those contacts will then return to their normal positions.

The numeral 391 in FIG. 5 denotes a single pole, double throw switch; and that switch serves as an empty switch for the product which is selected whenever the coil 354S is energized. The numeral 393 denotes a single pole, double throw switch; and that switch serves as an empty switch for the product which is selected whenever the coil 355S is energized. The numeral 395 generally denotes single pole, double throw switches; and those switches serve as empty switches for the products which are selected whenever the setting coils of the relays 356, 357, 359, 361 and 363 are energized. The numeral 397 in FIG. 5 denotes a single pole, double throw switch; and that switch serves as an empty switch for the product which is selected whenever the coil 358S is energized. The movable contacts of the switches 391, 393, 395 and 397 will be in engagement with the left-hand contacts of those switches whenever an adequate supply of the corresponding product is available. However, those movable contacts will shift into engagement with the right-hand contacts of those switches whenever the supply of the corresponding products is exhausted.

The numeral 427 in FIG. 5 denotes a double pole, double throw switch that is mounted in the vending machine controlled by the money-actuated device of the present invention. That switch normally has its movable contacts in engagement with its upper fixed contacts, but the operator of the money-actuated device can shift those movable contacts down into engagement with the lower fixed contacts of that switch. The numeral 429 denotes similar double pole, double throw switches which are mounted within the said vending machine. Each of those switches normally has the movable contacts thereof disposed in engagement with the upper fixed contacts thereof but can have those movable contacts moved downwardly into engagement with the lower fixed contacts thereof.

The numeral 399 in FIG. 5 denotes a single pole, double throw switch which will be mounted so the actuator thereof is accessible from the exterior of the said vending machine. That actuator will be pressed by a patron whenever that patron desires the product corresponding to that switch. The numeral 401 denotes a further single pole, double throw switch that will move its actuator mounted so it is accessible from the exterior of the said vending machine. The numeral 403 denotes four additional single pole, double throw switches which have the actuators thereof accessible from the exterior of the said vending machine. The numerals 402 and 405 denote still further single pole, double throw switches which have the actuators thereof accessible from the exterior of the said vending machine. The actuators of each of the switches 399, 401, 402, 403 and 405 will have a suitable indicia associated with it to enable patrons to select the particular products which they desire.

The numeral 386 in FIG. 5 denotes the coil of a relay which has contacts 407. Those contacts are normally open, but will respond to energization of the coil 386 to close.

The numeral 60 in FIG. 5 denotes the normally-energized coil of a relay which has contacts 60A, 60B, 60C and 60D. The contacts 60C and 60D are normally closed and the movable contacts 60A and 60B are normally in engagement with the left-hand contacts 60A and 60B. De-energization of the coil 60 will open the contacts 60C and 60D and will permit the movable contacts 60A and 60B to shift into engagement with the right-hand contacts 60A and 60B.

The numeral 360 in FIG. 5 denotes a single pole, single throw switch that is mounted within the vending machine controlled by the money-actuated device of the present invention. That switch is normally open but can be set in closed position by the operator of the money-actuated device. As long as that switch is open, any change due a patron will be dispensed upon the actuation of the change payout switch 44 at the bottom of FIG. 5. The switch 44 is a single pole, double throw switch, and the movable contact thereof is normally in engagement with the upper fixed contact thereof. The actuator of that switch will be accessible from the exterior of the vending machine, and that actuator can be actuated by a patron to cause the movable contact of that switch to move downwardly into engagement with the lower fixed contact of that switch and thereby effect the paying out of any change that is due the patron. If the switch 360 is set in closed position by the operator of the vending machine, the patron will not have to actuate the switch 44 to effect a dispensing of the change due him.

The numeral 471 in FIG. 5 denotes the normally-energized coil of a relay which has contacts 468 and 469. The contacts 468 are normally closed and the contacts 469 are normally open; but de-energization of the coil 471 will open the contacts 468 and will close the contacts 469.

The numeral 432 in FIG. 5 denotes the coil of a relay which has contacts 434 and 436. The contacts 436 are normally open and the movable contact 434 normally engages the right-hand fixed contact 434. However, energization of the coil 434 will close the contacts 436 and will shift the movable contact 434 into engagement with the left-hand contact 434. The numeral 447 denotes a capacitor which is connected in parallel with the coil 432, the numeral 449 denotes a resistor, and the numeral 451 denotes a diode. The capacitor 447 and the resistor 449 will coact with the coil 432 to provide a finite period of time before the coil 432 can become energized sufficiently to shift the contacts 434 and 436. The diode 451 provides half-wave direct current for the capacitor 447 and the coil 432.

The numeral 441 denotes a lamp which will illuminate a lens or sign which will be visible from the exterior of the vending machine controlled by the money-actuated device of the present invention. That lamp and the lens or sign will perferably be located at a point which is not directly in line of sight of patrons; but, instead, will be located adjacent the top of the vending machine. Employees of the operator of the money-actuated device will be instructed to note the illumination of that lamp, because that lamp will become illuminated whenever the supply of one or more of the products in the left-hand half of the vending machine is exhausted.

To make the money-actuated device of the present invention most conveniently accessible to patrons, the vending machine controlled by that money-actuated device has been made in two parts; and those parts have been located at the opposite sides of that money-actuated device. The lamp 441 is associated with the left-hand half of that vending machine, as are the selection relays 354, 355, 356 and 357, the empty switches 391 and 393 and the two left-handmost empty switches 395, the selection switches 399 and 401 and the two left-handmost selection switches 403, and the delivery switches 414 and 415 in FIG. 6.

The numeral 248 in FIG. 5 denotes a lamp which will illuminate a lens or sign that is visible from the exterior of the vending machine; and that lens or sign will preferably be in the line of sight of patrons. That lens or sign will indicate to a patron that the supply of the product which he desires has become exhausted, and it will suggest to that patron that he make another selection.

The numeral 443 in FIG. 5 denotes the coil of a relay which has contacts 443A and 443B. The coil 443 is identical to the coil 432, and the contacts 443A and 443B are, respectively, identical to the contacts 434 and 436. A capacitor 553 is connected in parallel with the coil 443 and a resistor 555 and a diode 557 are connected in series with the coil 443. That capacitor and that resistor will coact with the coil 443 to provide a finite period of time before the coil 443 can become energized sufficiently to close the contacts 443B and to shift the movable contact 443A into engagement with the left-hand contact 443A.

The numeral 455 in FIG. 5 denotes a lamp which will illuminate a lens or sign which will be visible from the exterior of the vending machine controlled by the money-actuated device of the present invention. That lamp and that lens or sign will preferably be located at a point which is not directly in the line of sight of patrons; but, instead, will be located adjacent the top of the vending machine. Employees of the operator of the money-actuated device will be instructed to note the illumination of that lamp, because that lamp will become illuminated whenever the supply of one or more of the products in the right-hand half of the vending machine is exhausted.

The numeral 448 in FIG. 5 denotes a push button which is located within the left-hand half of the vending machine. The numeral 448A denotes a push button which is located within the right-hand half of the vending machine. Those push buttons can be pressed by an employee of the operator of the vending machine to effect de-energization of the coils 432 and 443 with subsequent darkening of the lamps 441 and 455. Those push buttons will be pressed by that employee whenever he replenishes the supply of product that had become exhausted.

The numeral 501 in FIG. 5 generally denotes a two coil electrically-operated, mechanically-latched relay; and that relay will be identical to the relay 354 in FIG. 4. The relay 501 has a setting coil 501S which controls contacts 503, 505 and 507 and has a re-setting coil 501R which controls contacts 509, 511 and 513. The contacts 507 and 511 are normally open, the contacts 505 and 509 are normally closed, the movable contact 503 is normally in engagement with the right-hand contact 503, and the movable contact 513 is normally in engagement with the left-hand contact 513. Energization of the coil 501S will close the contacts 507, open the contacts 505, and shift the movable contact 503 into engagement with the left-hand contact 503, and will also cause the armature of coil 501R to open the contacts 509, to close the contacts 511, and to shift the movable contact 513 into engagement with the righthand contact 513. Once the coil 501S has been energized, the various contacts will remain in their energized positions until the coil 501R is energized. Thereupon all of the various contacts will return to their normal positions.

The numeral 624 in FIG. 5 generally denotes a two coil electrically-operated, mechanically-latched relay which is identical to the relay 354 in FIG. 4. The relay 624 has a setting coil 624S which controls contacts 624A, 624B and 624C, has a re-setting coil 624R which controls contacts 624E, 624F and 624G. The contacts 624A and 624B are normally open, the contacts 624E and 624F are normally closed, the movable contact 624C is normally in engagement with the right-hand contact 624C, and the movable contact 624G is normally in engagement with the left-hand contact 624G. Energization of the coil 624S will close the normally open contacts 624A and 624B and will shift the movable contact 624C into engagement with the left-hand contact 624C, and will also cause the armature of coil 624R to open the normally-closed contacts 624E and 624F and to shift the movable contact 624G into engagement with the right-hand contact 624G. Once the coil 624S has been energized, the various contacts will move to their shifted positions and will remain in those positions until the coil 624R is energized.

The numeral 76 in FIG. 6 denotes the solenoid which is mounted adjacent a hopper that will receive the various coins introduced into the money-actuated device of the present invention, after those coins have actuated and then passed by the switches 34, 36, 38, 40 and 42 in FIG. 2. A second solenoid 80 is mouned adjacent that hopper; and that hopper and those solenoids will preferably be identical to the hopper and the similarly-numbered solenoids in co-pending Gustav F. Erickson application Serial No. 16,514 for Coin Separators which was filed March 21, 1960.

When the solenoid 76 is energized, the floor of the hopper will move and will direct the coins within the hopper to the coin cash box within the money-actuated device of the present invention. When the solenoid 80 is energized, the floor of the hopper will move in the opposite direction to direct the coins within the hopper to a returned coin chute. As a result, selective operation of the solenoids 76 and 80 can either direct the coins within the hopper to the cash box or to a cup-like receptacle which is accessible from the exterior of the money actuated device. The hopper and its solenoids 76 and 80 thus act as an escrow for the coins inserted by patrons.

The numeral 422 in FIG. 6 denotes a motor which is used in the deducting of credits after the selection of a desired product has been made. The numeral 420 denotes a switch which is operated by a cam on the output shaft of the motor 422, and the numeral 430 denotes another switch that is operated by a cam on the output shaft of the motor 422. A switch 433 and a switch 435 also are operated by cams on the output shaft of the motor 422; and the switch 433 is shown below the motor 422 while the switch 435 is shown below the switch 430. The switch 433 is normally open, and the movable contacts of the switches 420, 430 and 435 are normally in engagement with the upper contacts of those switches.

The numeral 315 in FIG. 6 denotes the coil of a relay which has contacts 315A and 315B; and that coil is connected in parallel with the motor 422. The contacts 315B are normally closed and the contacts 315A are normally open; but energization of the coil 315 will open the contacts 315B and will close the contacts 315A.

The numeral 617 in FIG. 6 denotes the coil of a relay which has contacts 618, 619, 621 and 623. The contacts 619, 621 and 623 are normally open, and the movable contact 618 is normally in engagement with the right-hand contact 618. Energization of the coil 617 will close the contacts 619, 621 and 623 and will shift the movable contact 618 into engagement with the left-hand contact 618.

The numeral 414 in FIG. 6 denotes a delivery switch, and that switch is shown as a single pole, double throw switch. That switch will be mounted within the left-hand half of the vending machine, and the movable contact of that switch will be shifted from its upper position to its lower position during the vending cycle of the vending machine to signify the dispensing of the product that was sought by the patron when he actuated the selection switch 399 to actuate the selection relay 354. The numeral 415 denotes a similar delivery switch; and the movable contact of that switch will be moved from its upper position to its lower position during the vending cycle of the vending machine to signify the dispensing of the product or service that was sought by the patron when he actuated the selection switch 401 to actuate the selection relay 355. The delivery switch 415 will be mounted in the right-hand half of the vending machine, and the movable contact of that switch will be shifted from its upper position to its lower position during the vending cycle of the vending machine to signify the dispensing of the product that was sought by the patron when he actuated the selection switch 402 to actuate the selection relay 359. The numeral 414 denotes a delivery switch that is similar to the delivery switch 415, and the movable contact of that switch will be shifted from its upper position to its lower position during the vending cycle of the vending machine to signify the dispensing of the product that was sought by the patrol when he actuated the selection switch 405 to actuate the selection relay 358. Other delivery switches will be provided in the two halves of the vending machine to signify the dispensing of the product that was sought by the patron when he actuated the various selection switches 403 to actuate the selection relays 356, 357, 361 and 363.

Actually, the selection switches 401, 402, 403 and 405, the selection relays 354, 355, 356, 357, 358, 359, 361 and 363, and the delivery switches 414, 415, 417 and 419 are only representative of a much larger number of selection switches, selection relays and delivery switches.

The numeral 412 in FIG. 6 denotes the coil of the vend relay, and that relay has contacts 412A, 412C, 412E and 412G. Whenever the coil 412 is de-energized, the contacts 412G will be closed and the movable contacts 412A, 412C and 412E will be in engagement with the right-hand contacts 412A, 412C and 412E. Upon energization of the coil 412, the contacts 412G will open, and the contacts 412A, 412C and 412E will shift into engagement with the left-hand contacts 412A, 412C and 412E.

The numeral 565 in FIG. 6 denotes the coil of a relay which has contacts 565A, 565B and 565C. The contacts 565A and 565B are normally open and the contacts 565C are normally closed; but energization of the coil 565 will close the contacts 565A and 565B and will open the contacts 565C.

The numeral 466 in FIG. 6 denotes the coil of a relay that has contacts 466A, 466B and 466C. The coil 466 is energized whenever the plug 20 is inserted within an appropriate socket; and as long as that coil is energized, the contacts 466A and 466B will be open and the contacts 466C will be closed. Upon de-energization of the coil 466, the contacts 466A and 466B will close and the contacts 466C will open. One terminal of a capacitor 465 is connected to one terminal of the coil 466 and one terminal of a resistor 467 is connected to the other terminal of that coil; and the other terminals of that capacitor and resistor are connected together. That capacitor and that resistor will coact with the coil 466 to keep that coil energized for a finite period of time after that coil has been disconnected from conductor 30. A diode 473 is connected to the capacitor 465 to provide half-wave direct current for that capacitor and for the coil 466.

The numeral 479 in FIG. 6 denotes the coil of a relay that has contacts 479A and 479B. The contacts 479A are normally open and the contacts 479B are normally closed; but upon energization of the coil 479, the contacts 479A will close and the contacts 479B will open.

The numeral 481 in FIG. 6 denotes a single pole, single throw switch that has the movable contact thereof connected to the movable contact 479B. That switch will normally be closed but will respond to energization of the solenoid 483 to open. That solenoid also operates the gate of the escrow for the bills inserted by patrons.

The numeral 64 in FIG. 6 denotes a two coil electrically-operated mechanically-latched relay that is similar to the relay 354 in FIG. 4. That relay has a setting coil 64S which controls contacts 69, 71 and 73, and it has a re-setting coil 64R which controls contacts 63, 65 and 67. When the coil 64S is energized, the normally-open contacts 69 and 73 will close and the movable contact 71 will shift into engagement with the left-hand contact 71, and then the armature of the coil 64R will shift to the right to close the contacts 67, to open the contacts 65, and to shift the movable contact 63 into engagement with the right-hand contact 63. Once the coil 64S has been energized, the various contacts will remain in their shifted positions until the coil 64R is energized; but upon energization of the coil 64R, all of the contacts will return to their initial positions.

The numeral 72 in FIG. 6 denotes the coil of a relay which has contacts 72A, 72B and 72C. The contacts 72A are normally open and the contacts 72B and 72C are normally closed; but upon energization of the coil 72 the contacts 72A will close and the contacts 72B and 72C will open. One terminal of a capacitor 75 is connected to one terminal of the coil 72 and one terminal of a resistor 77 is connected to the other terminal of that resistor; and the other terminals of that capacitor and resistor are connected together. That capacitor and that resistor will coact with the coil 72 to keep that coil energized for a finite period of time after that coil has been disconnected from the conductor 30. A diode 79 is connected to the capacitor 75 to provide half-wave direct current for that capacitor and for the coil 72.

The numeral 890 in FIG. 6 denotes the coil of a relay that has contacts 910, 888 and 934. The contacts 910 and 934 are normally open and the contacts 888 are normally closed; but energization of the coil 890 will close the contacts 910 and 934 and will open the contacts 888.

The numeral 948 in FIG. 6 denotes a motor which has one terminal thereof connected to the prong 954 of a plug 950 by a junction 951. That plug has an upper prong 952 which is connected to the fixed contact 479A of the coil 479. The motor 948 has a cam 949 mounted on the output shaft thereof, and that cam is disposed adjacent a switch 960. That switch is normally open but will be closed by the lobe on the cam 949 during each revolution of that output shaft. A brake is provided for the motor 948, and a solenoid 956 can be energized to hold that brake in released position. Upon de-energization of the solenoid 956, a spring will cause the brake to move into braking position and halt rotation of the output shaft of the motor 948. The motor 948 will operate an escrow for the bills which are inserted by patrons; and one such escrow is shown and described in co-pending Ellis et al. application Serial No. 35,623 for Currency Detectors which was filed June 13, 1960.

The numeral 962 in FIG. 6 denotes the stepping coil of a stepper that controls a switch 964. That switch is normally open, but it can respond to a predetermined number of energizations of the stepping coil 962 to close. The numeral 976 denotes the re-setting coil of the stepper, and energization of that coil will restore that stepper to its normal condition and permit the switch 964 to re-open.

The numeral 880 in FIG. 6 denotes a motor which can be operated to dispense bills whenever bills are to be dispensed as change. The numeral 882 denotes a motor which can be operated to dispense coins whenever coins are to be dispensed as change. The movable contact of a single pole, double throw switch 884 is connected to one terminal of the motor 880, and the movable contact of a single pole, double throw switch 886 is connected to one terminal of the motor 882. The upper fixed contact of a single pole, double throw switch 894 is connected to the lower fixed contact of the switch 884, and the upper fixed contact of a single pole, double throw switch 896 is connected to the lower fixed contact of the switch 886. Cams on the output shaft of the motor 880 are mounted adjacent the switches 884 and 894; and those cams will shift the movable contacts of those switches down into engagement with the lower contacts of those switches during each revolution of that output shaft. Cams on the output shaft of the motor 882 are mounted adjacent the switches 886 and 896; and those cams will shift the movable contacts of those switches down into engagement with the lower contacts of those switches during each revolution of that output shaft. The output shaft of the motor 880 extends adjacent currency storage tubes in the manner shown in my said co-pending application, and cranks on that shaft will normally hold currency ejectors in retracted position. The output shaft of the motor 882 extends adjacent coin storage tubes in the manner shown in my said co-pending application, and cams on that shaft will normally hold coin-ejecting slides in retracted position.

The numeral 590 in FIG. 7 denotes a switch that is mounted adjacent the coin storage tubes within the money-actuated device of the present invention. That switch will be open whenever all of the coin storage tubes contain sufficient coins to permit proper change-making operation; but that switch will be closed whenever any of the coin storage tubes contains insufficient coins to permit proper change-making operation. The numeral 592 denotes five switches that are mounted adjacent the currency storage tubes within the money-actuated device of the present invention. Those switches will be open whenever all of the currency storage tubes contain sufficient bills to permit proper change-making operation; but each of those switches will close whenever the corresponding currency storage tube contains insufficient bills to permit proper change-making operation.

The numeral 658 in FIG. 7 denotes a lamp; and that lamp will be associated with a lens or a sign that is visible from the exterior of the money-actuated device. That lens or that sign will respond to illumination of the lamp 658 to indicate to patrons when the supply of bills available for change-making purposes is insufficient to assure proper change-making operation.

The numeral 649 in FIG. 7 denotes a lamp; and that lamp will be associated with another lens or sign that is visible from the exterior of the money-actuated device. That lens or sign will respond to illumination of the lamp 649 to indicate to the patron that the money which he inserts must just equal the selling price of the desired product.

The numeral 653 in FIG. 7 denotes a lamp; and that lamp will be associated with still another lens or sign that is visible from the exterior of the money-actuated device. That lens or sign will respond to illumination of the lamp 653 to indicate to patrons when the supply of coins available for change-making purposes is insufficient to assure proper change-making operation.

The numeral 594 in FIG. 7 generally denotes a stepping switch wherein the wiper can move in either direction. The wiper of that stepping switch is denoted by the numeral 630, and that wiper can move relative to ten stationary contacts 601, 603, 605, 607, 609, 611, 613, 615, 625 and 627. The wiper 630 will advance a distance equal to the space between two of those contacts whenever the advancing coil 598 is energized, and that wiper will return to its initial position in engagement with the contact 601 whenever the re-setting coil 600 is energized.

The numeral 421 in FIG. 8 denotes the coil of a relay which has contacts 421A and 421B. The contacts 421A are normally open and the contacts 421B are normally closed; but energization of the coil 421 will close the contacts 421A and open the contacts 421B.

The numeral 423 in FIG. 8 denotes the coil of a relay which has contacts 423A, 423B and 423C. The contacts 423A are normally closed, the contacts 423C are normally open, the movable contact 423B is normally in engagement with the right-hand contact 423B. Upon energization of the coil 423, the contacts 423A will open, the contacts 423C will close, and the movable contact 423B will shift into engagement with the left-hand contact 423B. A diode 521 has the anode thereof connected to one terminal of the coil 423 and has the cathode thereof connected to the anode of a diode 519. The cathode of the diode 519 is connected to the fixed contact 423A.

The numeral 424 in FIG. 8 denotes the coil of a relay which has contacts 424A, 424B, 424C and 424D. The contacts 424A are normally closed, the contacts 424C and 424D are normally open, and the movable contact 424B is normally in engagement with the right-hand contact 424B. Upon energization of the coil 424, the contacts 424A will open, the contacts 424C and 424D will close, and the movable contact 424B will shift into engagement with the left-hand contact 424B. A diode 516 has the cathode thereof connected to one terminal of the coil 424 and has the anode thereof connected to the left-hand contact 424B.

The numeral 411 in FIG. 8 denotes the coil of a relay which has contacts 411A and 411B. The contacts 411A are normally open and the contacts 411B are normally closed; but upon energization of the coil 411 the contacts 411A will close and the contacts 411B will open.

The numeral 416 in FIG. 8 denotes the coil of a relay which has contacts 416A, 416B, 416C and 416D. The contacts 416A are normally open, and the movable contacts 416B, 416C and 416D are normally in engagement with the right-hand contacts 416B, 416C and 416D. Upon energization of the coil 416, the contacts 416A will close and the movable contacts 416B, 416C and 416D will shift into engagement with the left-hand contacts 416B, 416C and 416D. A diode 693 has the anode thereof connected to one terminal of the coil 416 and has the cathode thereof connected to the anode of a diode 691. The cathode of the diode 691 is connected to the movable contact 416B.

The numeral 418 in FIG. 8 denotes the coil of a relay which has contacts 418A, 418B, 418C and 418D. The contacts 418A are normally closed, the contacts 418C and 418D are normally open, and the movable contact 418B is normally in engagement with the right-hand contact 418B. Upon energization of the coil 418, the contacts 418A will open, the contacts 418C and 418D will close, and the movable contact 418B will shift into engagement with the left-hand contact 418B. A diode 535 has the cathode thereof connected to one terminal of the coil 418 and has the anode thereof connected to the left-hand contact 418B.

The numeral 309 in FIG. 8 denotes the coil of a relay which has contacts 309A, 309B, 309C and 309D. The contacts 309D are normally open and the movable contacts 309A, 309B and 309C are normally in engagement with the right-hand contacts 309A, 309B and 309C. Upon energization of the coil 309, the contacts 309D will close and the movable contacts 309A, 309B and 309C will shift into engagement with the left-hand contacts 309A, 309B and 309C.

The numeral 408 in FIG. 8 denotes the coil of a relay which has contacts 408A and 408B. The contacts 408A are normally open and the contacts 408B are normally closed; but upon energization of the coil 408 the contacts 408A will close and the contacts 408B will open.

The numeral 409 in FIG. 8 denotes the coil of a relay which has contacts 409A, 409B and 409C. The contacts 409A are normally closed, the contacts 409C are normally open, and the movable contact 409B is normally in engagement with the right-hand contact 409B. Upon energization of the coil 409 the contacts 409A will open, the contacts 409C will close, and the movable contact 409B will shift into engagement with the left-hand contact 409C. A diode 697 has the anode thereof connected to one terminal of the coil 409 and has the cathode thereof connected to the anode of a diode 695. The cathode of the diode 695 is connected to the fixed contact 409A.

The numeral 410 in FIG. 8 denotes the coil of a relay which has contacts 410A, 410B and 410C. The contacts 410B are normally open, the contacts 410C are normally closed, and the movable contact 410A is normally in engagement with the right-hand contact 410A. Upon energization of the coil 410, the contacts 410B will close, the contacts 410C will open, and the movable contact 410A will shift into engagement with the left-hand contact 410A. A diode 543 has the cathode thereof connected to one terminal of the coil 410 and has the anode thereof connected to the left-hand contact 410A.

The numeral 542 in FIG. 8 denotes the coil of a relay which has contacts 542A, 542B, 542C and 542D. The contacts 542D are normally open, and the movable contacts 542A, 542B and 542C are normally in engagement with the right-hand contacts 542A, 542B and 542C. Upon energization of the coil 542, the contacts 542D will close and the movable contacts 542A, 542B and 542C will shift into engagement with the left-hand contacts 542A, 542B and 542C.

The numeral 587 in FIG. 8 denotes the coil of a relay which has contacts 587A, 587B, 587C, 587D and 587E. The contacts 587B and 587C are normally closed, the contacts 587E are normally open, and the movable contacts 587A and 587D are normally in engagement with the right-hand contacts 587A and 587D. Upon energization of the coil 587, the contacts 587B and 587C will open, the contacts 587E will close, and the movable contacts 587A and 587D will shift into engagement with the left-hand contacts 587A and 587D.

The numeral 660 in FIG. 9 denotes an electromagnet which is identical to the similarly-numbered electromagnet in my said co-pending application. The numerals 662, 664, 666 and 668 in FIG. 9 denote electromagnets which are identical to the similarly-numbered electromagnets in my said co-pending application. The electromagnet 660 is mounted adjacent a currency-ejector that can dispense five dollars in bills, the electromagnet 662 is mounted adjacent a currency-ejector that can dispense four dollars in bills, the electromagnet 664 is mounted adjacent a currency-ejector that can dispense three dollars in bills, the electromagnet 666 is mounted adjacent a currency-ejector that can dispense two dollars in bills, and the electromagnet 668 is mounted adjacent a currency-ejector which can dispense a one dollar bill. Those currency-ejectors are of the type shown in my said co-pending application, and they are described in detail in co-pending Erickson et al. application Serial No. 35,504 for Coin Separators which was filed June 13, 1960.

The numeral 750 in FIG. 9 denotes the coil of a relay which has contacts 750A. The movable contact 750A is normally in engagement with the right-hand contact 750A; but it will respond to energization of the coil 750 to shift into engagement with the left-hand contact 750A.

The numeral 752 in FIG. 9 denotes the coil of a relay which has contacts 752A and 752B. The contacts 752A are normally open and the movable contacts 752B is normally in engagement with the right-hand contact 752B. Energization of the coil 752 will cause the contacts 752A to close and will cause the movable contacts 752B to shift into engagement with the left-hand contact 752B.

The numeral 754 in FIG. 9 denotes the coil of a relay which has contacts 754A and 754B. The contacts 754A are normally open and the contacts 754B are normally closed, but energization of the coil 754 will close the contacts 754A and will open the contacts 754B.

The numeral 674 in FIG. 9 generally denotes the deductor switch that has the fixed contact 671 to which the conductor 680 is connected. That fixed contact always bears against the wiper of that switch and thus always connects the conductor 680 to that wiper. The switch 674 also has eleven circumferentially-spaced contacts 673, 675, 677, 679, 681, 683, 685, 687, 689, 701 and 703. The projecting portion of the wiper of the switch 674 is shown in its normal position intermediate the contacts 703 and 673; and that projecting portion will respond to each revolution of that wiper to successively engage all of the contacts 673, 675, 677, 679, 681, 683, 685, 687, 689, 701 and 703. The wiper of the switch 674 is mounted on, and will rotate with, the output shaft of the deductor motor 422 in FIG. 6.

The stepping switch 137 in FIG. 9 has ten circumferentially-spaced contacts 180, 182, 184, 186, 189, 191, 192, 194, 196 and 198. The wiper 202 of that switch is normally in engagement with the contact 180 but will respond to energization of the stepping coil 164 thereof in FIG. 3 to successively engage each of those contacts. A diode 303 is connected between the contacts 180 and 182, a diode 301 is connected between the contacts 182 and 184, a diode 299 is connected between the contacts 184 and 186, a diode 297 is connected between the contacts 186 and 189, a diode 295 is connected between the contacts 189 and 191 by means of conductors 300 and 302 and contacts 309D, a diode 293 is connected between the contacts 191 and 192, a diode 291 is connected between the contacts 192 and 194, a diode 289 is connected between the contacts 194 and 196, and a diode 287 is connected between the contacts 196 and 198. Horizontal bars 312 are connected to the contacts 180, 182, 184, 186, 189, 191, 192, 194, 196 and 198, and those bars are the horizontal conductors of two price setters which are shown adjacent each other in FIG. 9. One of those price setters can be used to set one digit of the prices of the products to be dispensed by the left-hand half of the vending machine; and the other of those price setters can be used to set one digit of the prices of the products to be dispensed by the right-hand half of the vending machine. The vertical bars of the two price setters are denoted by the numeral 314; and those bars overlie but are insulated from the bars 312.

The numerals 317, 319, 321, 323, 325, 327, 329, 331 and 333 denote diodes which have the cathodes thereof connected, respectively, to the contacts 198, 196, 194, 192, 191, 189, 186, 184, and 182 of the stepping switch 137. The anodes of the diodes 317 and 327 are connected to one terminal of the coil 750, the anodes of the diodes 319 and 329 are connected to one terminal of the coil 752, the anodes of the diodes 321 and 331 are connected to one terminal of the coil 754, the anodes of the diodes 323 and 333 are connected to one terminal of the electromagnet 668 by the contacts 754B, and the anode of the diode 325 are connected to one terminal of the electromagnet 660.

The numeral 756 in FIG. 10 denotes an electromagnet which is identical to the similarly-numbered electromagnet in my said copending application. The numbers 758, 760, 762 and 764 in FIG. 10 denote electromagnets which are identical to the similarly-numbered electromagnets in my said co-pending application. The electromagnet 756 is mounted adjacent a coin storage tube for fifty cent pieces, the numeral 758 denotes an electromagnet which is mounted adjacent the coin storage tube for quarters, the numerals 760 and 762 denote electromagnets which are mounted adjacent coin storage tubes that contain dimes, and the numeral 764 denotes an electromagnet which is mounted adjacent a coin storage tube that contains nickels. The coin storage tubes for the fifty cent pieces, the quarters, the dimes and the nickels are identical to corresponding coin storage tubes in my said co-pending application.

The numeral 766 in FIG. 10 denotes the coil of a relay which has contacts 766A. The contacts 766A are normally open but will respond to energization of the coil 766 to close.

The numeral 768 in FIG. 10 denotes the coil of a relay which has contacts 768A, 768B, 768C and 768D. The contacts 768A and the contacts 768D are normally open, the contacts 768B are normally closed, and the movable contact 768C is normally in engagement with the right-hand contact 768C. However, energization of the coil 678A will close the contacts 768A and 768D, will open the contacts 768B, and will shift the movable contact 768C into engagement with the left-hand contact 768C.

The numeral 770 in FIG. 10 denotes the coil of a relay which has contacts 770A, 770B and 770C. The contacts 770A are normally open, the contacts 770C are normally closed, and the movable contact 770B is normally in engagement with the right-hand contact 770B. Upon energization of the coil 770, the contacts 770A will close, the contacts 770C will open, and the movable contact 770B will shift into engagement with the left-hand contact 770B.

The numeral 772 in FIG. 10 denotes the coil of a relay which has contacts 772A. The contacts 772A are normally open but will respond to energization of the coil 772 to close.

The numeral 774 in FIG. 10 denotes the coil of a relay which has contacts 774A, 774B and 774C. The contacts 774B are normally open and the movable contacts 774A and 774C are normally in engagement with the right-hand contacts 774A and 774C. Upon energization of the coil 774, the contacts 774B will close and the movable contacts 774A and 774C will shift into engagement with the left-hand contacts 774A and 774C.

The numeral 672 in FIG. 10 generally denotes the deductor switch that has the fixed contact 707 to which the conductor 678 is connected. That fixed contact always bears against the wiper of that switch and thus always connects the conductor 678 to that wiper. The switch 672 also has eleven circumferentially-spaced contacts 709, 711, 713, 715, 717, 719, 721, 723, 725, 727 and 729. The projecting portion of the wiper of the switch 672 is shown in its normal position intermediate the contacts 729 and 709; and that projecting portion will respond to each revolution of that wiper to successively engage all of the fixed contacts 709, 711, 713, 715, 717, 719, 721, 723, 725, 727 and 729. The wiper of the switch 672 is mounted on, and will rotate with, the output shaft of the deductor motor 422 in FIG. 6.

The stepping switch 133 in FIG. 10 has ten circumferentially spaced contacts 144, 146, 148, 150, 152, 154, 156, 158, 160 and 162. The wiper 143 of that switch is normally in engagement with the contact 144 but will respond to energization of the stepping coil 132 in FIG. 3 to successively engage each of those contacts. A diode 285 is connected between the contacts 144 and 146, a diode 283 is connected between the contacts 146 and 148, a diode 281 is connected between the contacts 148 and 150, a diode 279 is conected between the contacts 150 and 152, a diode 277 is connected between the contacts 152 and 154 by means of conductors 798 and 800 and contacts 223A, a diode 275 is connected between the contacts 154 and 156, a diode 273 is connected between the contacts 156 and 158, a diode 271 is connected between the contacts 158 and 160, and a diode 269 is connected between the contacts 160 and 162. Horizontal bars 308 are connected to the contacts 144, 146, 148, 150, 152, 154, 156, 158, 160 and 162, and those bars are the horizontal conductors of two price setters which are shown adjacent each other in FIG. 10. One of those price setters can be used to set one digit of the prices of the products to be dispensed by the left-hand half of the vending machine; and the other of those price setters can be used to set one digit of the prices of the products to be dispensed by the right-hand half of the vending machine. The vertical bars of the two price setters are denoted by the numeral 310; and those bars overlie but are insulated from the bars 308.

Diodes 368, 370, 372, 374, 376, 378, 380, 382 and 384 in FIG. 10 have the cathodes thereof connected, respectively, to the contacts 162, 160, 158, 156, 154, 152, 150, 148 and 146. The anodes of the diodes 368 and 378 are connected to one terminal of the coil 766, the anodes of the diodes 370 and 380 are connected to one terminal of the coil 770, the anodes of the diodes 374 and 384 are connected to one terminal of the coil 772, and the anode of the diode 376 is connected to one terminal of the electromagnet 756.

The numerals 523, 525, 527 and 531 in FIG. 11 denote electromagnets that are mounted adjacent coin storage tubes for pennies. Those coin storage tubes are identical to the coin storage tubes for pennies in my said co-pending application; and the electromagnets 523, 525, 529 and 531 are identical to the corresponding electromagnets in that application.

The numeral 670 in FIG. 11 generally denotes the deductor switch that has the fixed contact 730 to which the conductor 676 is connected. That fixed contact always bears against the wiper of that switch and thus always connects the conductor 676 to that wiper. The switch 670 also has eleven circumferentially-spaced contacts 731, 732, 733, 734, 735, 736, 737, 738, 739, 740 and 741. The projecting portion of the wiper of the switch 670 is shown in its normal position intermediate the contacts 741 and 731; and that projecting portion will respond to each revolution of that wiper to successively engage all of the contacts 731, 732, 733, 734, 735, 736, 737, 738, 739, 740 and 741. The wiper of the switch 670 is mounted on, and will rotate with, the output shaft of the deductor motor 422 in FIG. 6. The wipers of the switches 674, 672 and 670 will rotate in the clockwise direction as those wipers are viewed in FIGS. 9, 10 and 11.

The stepping switch 48 in FIG. 11 has ten circumferentially-spaced contacts 104, 106, 108, 110, 112, 114, 116, 118, 120 and 122. The wiper 126 of that switch is normally in engagement with the contact 104 but will respond to energization of the stepping coil 50 thereof in FIG. 3 to successively engage each of those contacts. A diode 267 is connected between the contacts 104 and 106, a diode 265 is connected between the contacts 106 and 108, a diode 263 is connected between the contacts 108 and 110, a diode 261 is connected between the contacts 110 and 112, a diode 259 is connected between the contacts 112 and 114 by means of conductors 802 and 804 and contacts 223B, a diode 257 is connected between the contacts 114 and 116, a diode 255 is connected between the contacts 116 and 118, a diode 253 is connected between the contacts 118 and 120, and a diode 251 is connected between the contacts 120 and 122. Horizontal bars 304 are connected to the contacts 104, 106, 108, 110, 112, 114, 116, 118, 120 and 122, and those bars are the horizontal conductors of two price setters which are shown adjacent each other in FIG. 11. One of those price setters can be used to set one digit of the prices of the products to be dispensed by the left-hand half of the vending machine; and the other of those price setters can be used to be set one digit of the prices of the products to be dispensed by the right-hand half of the vending machine. The vertical bars of the two price setters are denoted by the numeral 306; and those bars overlie but are insulated from the bars 304.

Diodes 486, 488, 490, 492, 494, 496, 498, 499 and 500 in FIG. 11 have the cathodes thereof connected, respectively, to the fixed contacts 122, 120, 118, 116, 114, 112, 110, 108 and 106. The anodes of the diodes 486 and 496 are connected to one terminal of the electromagnet 523, the anodes of the diodes 488 and 498 are connected to one terminal of the electromagnet 525, the anodes of the diodes 490 and 499 are connected to one terminal of the electromagnet 529, the anodes of the diodes 492 and 500 are connected to one terminal of the electromagnet 531, and the anode of the diode 494 is connected to one terminal of the coil 774 in FIG. 10 by the conductor 775.

Price setting pins 780, 782 and 784 are used with the price setters in FIG. 9, price setting pins 786, 788 and 790 are used with the price setters in FIG. 10, and price setting pins 792, 794 and 796 are used with the price setters in FIG. 11.

*Circuits of Money-Actuated Device*

The money-actuated device provided by the present invention has a number of overall circuits; and those overall circuits may have a number of components and sub-circuits. Those overall circuits are described hereinafter in appropriately identified sections; and the components and sub-circuits of each overall circuit are described in the section wherein that overall circuit is described. Those overall circuits are:

Coin Return Electromagnet Circuits, Normally-Energized Relay Circuits, Bill Transport Starting Circuit, Coin Registering Circuits, Bill Registering Circuits, Credit Registering Tens Transfer Circuits, Selection Switches Circuit, Selection Relays Circuits, Credit Sensing Circuits, Exact Credit Sensing Circuits, Excess Credit Sensing Circuits, Credit Deducting And Product Vending Circuits, Exact Credit Deducting And Product Vending Circuits, Excess Credit Deducting And Product Vending Circuits, Selection Relays Re-setting Circuits, Change Dispensing Circuits, Money Returning Circuits, Coin Empty Circuits, Bill Empty Circuits, Coin Empty And Bill Empty Circuits, and Automatic Change Payout Circuits.

The various overall circuits have a number of components and sub-circuits in common; and, as a result, some of those overall circuits have the components thereof shown in several different views of the drawing. For convenience and clarity, a chart has been provided at the end of this description which indicates where each electrical component appears in the various views of the drawing.

*Coin Return Electromagnet Circuit*

The coin return electromagnet circuit includes electromagnets 234 and 235 which are shown in FIG. 3 and which are connected in parallel. Those electromagnets are normally energized by a circuit which extends from prong 23 of plug 20 via conductor 32, junction 35 in FIG. 3, through both of those electromagnets to junction 37, conductor 39 which extends through FIGS. 4 and 5 into FIG. 6, contacts 479B, switch 481, conductor 82 which extends through FIGS. 5 and 4 into FIG. 3, contacts 176–174, conductor 84, junction 86, conductor 88 which extends through FIG. 4 into FIG. 5, the upper and movable contacts of switch 44, switch 231, junction 92, contacts 624F, contacts 60C, junction 94, conductor 58 which extends into FIG. 6, contacts 65, conductor 59, contacts 72C, junction 56, the right-hand and movable contacts 412A, junction 54, the upper and movable contacts of delivery switches 419, 417, 415 and 414, junction 52, and conductor 30 to prong 22 of plug 20. The resulting energization of the electromagnets 234 and 235 will normally enable the electromagnet 234 to hold stops out of the passageways for nickels, dimes, quarters and fifty cent pieces and will normally enable the electromagnet 235 to hold a stop out of the passageway for pennies. That energization also will normally enable the electromagnet 234 to hold the switch 233 in FIG. 1 closed.

Normally-Energized Relay Circuits

In addition to the coin return electromagnet circuit, four relay circuits of the money-actuated device will be energized whenever the plug 20 is inserted in an appropriate socket. One of those circuits includes the relay coil 60 in FIG. 5, and that circuit extends from conductor 32 via junctions 61, 66, 68, 70 and 276 in FIG. 5, coil 60, conductor 55 which extends into FIG. 4, the left-hand and movable contacts 385, the left-handmost left-hand and movable contacts adjacent the re-setting coils of the selection relays 363, 361, 359, 357 and 356, the left-hand and movable contacts 373, the left-hand and movable contacts 459, and junction 168 to conductor 30. This circuit will keep the coil 60 energized until one of the selection relays is actuated; but once that selection relay has been actuated, it will keep the coil 60 de-energized until that selection relay is re-set. A second of the normally-energized relay circuits includes the coil 471 in FIG. 5, and that circuit extends from conductor 32 via junctions 478, 480, 482 and 484 in FIG. 5, coil 471, junction 57, the movable and upper contacts of the selection switches 405, 403, 402, 403, 401 and 399, conductor 350 which extends into FIG. 6, the right-hand and movable contacts 412E, junction 336, the upper and movable contacts of the switch 420, the movable and upper contacts of the switch 430, conductor 351 which extends into FIG. 5, the left-hand and movable contacts 624G, conductor 349 which extends through FIGS. 4, 3 and 2 and into FIG. 1, junction 236, conductor 238, junction 240, the upper and movable contacts of switch 290, conductor 242 which extends into FIG. 2, contacts 524, conductor 352, junction 244, contacts 145C, junction 246, conductor 247, contacts 215C, the right-hand and movable contacts 1470, the right-hand and movable contacts 470 the upper and movable contacts of the switches 42, 40, 38, 36, 34 and 214, and junction 200 to conductor 30. This circuit will cause the coil 471 to become de-energized prior to the initiation of vending cycles and will then keep that coil de-energized, and thus prevent re-setting of the selection relays, until after the conclusion of those vending cycles. A third normally-energized relay circuit includes the coil 466 in FIG. 6, and that circuit extends from conductor 32 via junctions 495, 497, 515 and 517 in FIG. 6, coil 466, capacitor 465, diode 473, contacts 565C, junction 56, the right-hand and movable contacts 412A, junction 54, the upper and movable contacts of the delivery switches 419, 417, 415 and 414 and junction 52 to conductor 30. This circuit is intended to keep the vend relay 412 from becoming energized in response to transient pulses which a patron might possibly generate by actuating a number of the selection switches in rapid succession. A fourth normally-energized relay circuit includes the coil 976 in FIG. 6, which normally holds the switch 964 open; and that circuit extends from conductor 32 via junction 879 in FIG. 6, coil 976, the right-hand and movable contacts 71, junctions 582, 968 and 966 to conductor 30. That circuit normally keeps the stepper in FIG. 6 in position to keep the switch 964 open.

Bill Transporting Starting Circuit

The bill transport of the currency detector used in the money-actuated device of the present invention can be started by pressing the push button 340 in FIG. 1. Pressing of that push button completes a circuit from conductor 32 via junction 206, conductor 207, junctions 208, 209 and 218, coil 528, resistor 538, diode 540, resistor 539, push button 340, switch 233, junction 236, conductor 238, junction 240, the upper end movable contacts of switch 290, conductor 242 which extends into FIG. 2, contacts 524, conductor 352, junction 244, contacts 145C, junction 246, conductor 247, contacts 215C, the right-hand and movable contacts 1470, the right-hand and movable contacts 470, the upper and movable contacts of the switches 42, 40, 38, 36, 34, and 214, and junction 200 to conductor 30. It will be noted that the bill transport starting circuit includes the penny-actuated switch 34, the nickel-actuated switch 36, the dime-actuated switch 38, the quarter-actuated switch 40, and the fifty-cent-actuated switch 42. As a result, the bill transport starting switch can not be closed whenever any of the coin-actuated switches has the movable contact thereof displaced from its upper position.

Coin Registering Circuits

The coin registering circuits include the full-wave, bridge rectifier 151 in FIG. 3; and input terminal 153 of that bridge rectifier is connected to the conductor 30 by junction 172, while the input terminal 155 of that bridge rectifier is connected to conductor 32 by junction 119. The output terminals 157 and 159 of the bridge rectifier 151 are connected to the stepping coil 50 of the stepping switch 48 by the normally-open contacts 163A, are connected to the stepping coil 132 of the stepping switch 133 by the normally-open contacts 167A, and are connected to the stepping coil 164 of the stepping switch 137 by the normally-open contacts 264B. This means that the stepping coils 50, 132 and 164, respectively, will be energized whenever the coils 163, 167 and 264 are energized.

The coil 163 and the penny-actuated switch 34 are part of a circuit which extends from conductor 32 via junction 35 in FIG. 3, coil 163, junction 219 and 220, conductor 222 which extends into FIG. 2, contacts 595, contacts 217B, junction 224, the lower and movable contacts of switch 34, the upper and movable contacts of switch 214, and junction 200 to conductor 30. As a result, whenever an inserted penny shifts the movable contact of switch 34 downwardly, the coil 163 will become energized and will close the contacts 163A to energize stepping coil 50 and thereby advance the wiper 126 of stepping switch 48 to register a unit credit on that stepping switch.

The coil 167 and the dime-actuated switch 38 are part of a circuit which extends from conductor 32 via junction 35 in FIG. 3, coil 167, junctions 226, 227 and 228, conductor 183 which extends into FIG. 2, junctions 229 and 237, the lower and movable contacts of switch 38, the upper and movable contacts of switches 36, 34 and 214, and junction 200 to conductor 30. As a result, whenever an inserted dime shifts the movable contact of switch 38 downwardly, the coil 167 will become energized and will close the contacts 167A to energize stepping coil 132 and thereby advance the wiper 143 of stepping switch 133 to register a tens credit on the stepping switch.

When a nickel is inserted, a circuit will be completed from conductor 30 via junction 200 in FIG. 2, the movable and upper contacts of switches 214 and 34, the movable and lower contacts of switch 36, junction 256, coil 145, and junction 115 to conductor 32. The resulting energization of coil 145 will close contacts 145A, will shift movable contact 145B into engagement with the left-hand contact 145B, will open contacts 145C, and will close contacts 145D. Contacts 145A will then complete a holding circuit for the coil 145 from conductor 30 via junction 200, the movable and upper contacts of switch 214, conductor 258, contacts 145A, coil 145, and junction 115 to conductor 32. The shifting of movable contact 145B into engagement with the left-hand contact 145B will pre-set a circuit for the motor 210 in FIG. 2 from conductor 32 via junction 117, motor 210, conductor 185 which extends into FIG. 2, the movable and left-hand contacts 145B, junction 246, conductor 247, contacts 215C, the right-hand and movable contacts 147Q, the right-hand and movable contacts 470, the upper and movable contacts of switches 42, 40, 38, 36, 34 and 214, and junction 200 to conductor 30; and that circuit will be completed and the motor 210 will become energized as soon as the movable contact of the switch 36 is freed by the nickel and can return to its upper position. The closing of contacts 145D will pre-set a circuit for the coil 163 from conductor 32 via junction 35, coil 163, junctions 219 and 220, conductor 222 which extends into FIG. 2, contacts 595, contacts 217B, junction 224, contacts 145D, junction 260, cam-operated switch 212, and junction 173 to conductor 30. The overall result is that when the movable contact of the nickel-operated switch 36 moves back up to its normal position, the motor 210 will become energized and will cause the switch 212 to close and re-open five times; and that closing and re-opening will energize and de-energize the coil 163 five times. That energization and de-energization will energize and de-energize the stepping coil 50 five times, and will thus advance the wiper 126 a distance equal to the spacing between five of the contacts on the switch 48—and such advancement will register five unit credits on that stepping switch.

After the switch 212 has closed and re-opened for the fifth time, the movable contact of the switch 214 in FIG. 2 will be moved downwardly into engagement with the lower contact of that switch by a cam on the output shaft of the motor 210. Thereupon, the motor 210 and the relay coil 145 will become de-energized; and the de-energization of the coil 145 will permit the movable contact 145B to move back to its right-hand position. At such time, the motor 210 will be re-energized from conductor 32 via junction 117 in FIG. 3, motor 210, conductor 184 which extends into FIG. 2, the movable and right-hand contacts 145B, contacts 217D, contacts 599, the lower and movable contacts of switch 214, and junction 200 to conductor 30. The re-energization of the motor 210 will cause the cam adjacent the switch 214 to return the movable contact of that switch to its upper position, thereby causing the motor 210 to stop; and at this time, the output shaft of that motor will have made one complete revolution and will be back in its initial position. In this way, the insertion of a nickel will cause the motor 210 to rotate its output shaft through one complete revolution, and will enable the switch 212 to cause the wiper 126 of the stepping switch 48 to advance a distance equal to the spacing between five of the contacts on that switch.

When a quarter is inserted, that quarter will cause the movable contact of the dime-actuated switch 38 to shift down into engagement with the lower fixed contact of that switch, and will subsequently cause the movable contact of the quarter-actuated switch 40 to shift down into engagement with the lower contact of that switch. As the quarter shifts the movable contact of the switch 38 downwardly, that switch will energize the coil 167 in the manner described hereinbefore; and the quarter will thus effect prompt registration of a tens credit on the stepping switch 133. As that quarter subsequently shifts the movable contact of the switch 40 downwardly, that switch will energize the coil 215 for a short time by completing a circuit via conductor 32, junction 113 in FIG. 2, coil 215, the lower and movable contacts of switch 40, the upper and movable contacts of switches 38, 36, 34 and 214, and junction 200 to the conductor 30. The actuators for the switches 38 and 40 are spaced far enough apart to enable the movable contact of the switch 38 to return to its upper position before the quarter reaches the actuator for the switch 40; and, as a result, by the time the quarter shifts the movable contact of the switch 40 downwardly, the circuit through the coil 215 can be completed. The resulting energization of the coil 215 will close the contacts 215A and 215B for a short time and will open the contacts 215C for a short time. The closing and re-opening of contacts 215A will complete and then interrupt a circuit from conductor 30 via junction 178 in FIG. 2, contacts 215A, junctions 229, 228, 227, and 226, coil 167 and junction 35 to conductor 32. The resulting energization and de-energization of coil 167 will effect the energization and de-energization of the stepping coil 132 of stepping switch 133 to advance the wiper 143 a distance equal to the spacing between two of the contacts on that switch. As a result, the quarter will promptly effect a second registration of a tens credit on the stepping switch 133.

The closing of the contacts 215B completes a circuit from conductor 32 via junction 115 in FIG. 2, relay coil 145, junction 256, contacts 215B, and junction 178 to conductor 30. The contacts 145A will close and complete the holding circuit previously described herein; and the shifting of the movable contact 145B to its left-hand position will coact with the return of the movable contact of switch 40 to its upper position and with the consequent re-closing of contacts 215C to complete a circuit through motor 210 from conductor 32 via junction 117 in FIG. 3, motor 210, conductor 185 which extends into FIG. 2, the movable and left-hand contacts 145B, junction 246, conductor 247, contacts 215C, the right-hand and movable contacts 147Q, the right-hand and movable contacts 470, the upper and movable contacts of switches 42, 40, 38, 36, 34 and 214 and junction 200 to conductor 30. That circuit will cause the motor 210 to rotate its output shaft through one complete revolution; and during that revolution the switch 212 will be closed and re-opened five times to energize and de-energize the stepping coil 50 of the stepping switch 48, all as described hereinbefore in connection with the insertion of a nickel.

The overall result of inserting a quarter is to advance the wiper 143 of stepping switch 133 two times and to advance the wiper 126 of the stepping switch 48 five times. This means that two tens credits and five units credits are registered on the stepping switches 133 and 48, respectively.

The insertion of a fifty-cent piece will shift the movable contact of the switch 42 down into its lower position; and that shifting will complete a circuit from conductor 32 via junction 111 in FIG. 2, coil 217, the lower and movable contacts of switch 42, the upper and movable contacts of switches 40, 38, 36, 34 and 214, and junction 200 to conductor 30. The resulting energization of the coil 217 will close the contacts 217A and 217C and will open the contacts 217B and 217D. The closing of contacts 217C pre-sets a circuit from conductor 32 via junction 35 in FIG. 3, coil 167, junctions 226, 227 and 228, conductor 183 which extends into FIG. 2, junctions 229 and 237, contacts 217C, junctions 249 and 260, switch 212 and junction 173 to conductor 30. The closing of the contacts 217A completes a circuit from conductor 32 via junction 115 in FIG. 2, coil 145, junction 256, contacts 217A, the lower and movable contacts of switch 42, the upper and movable contacts of switches 40, 38, 36, 34 and 214, and junction 200 to conductor 30. The resulting energization of coil 145 completes a holding circuit for that coil and also causes the motor 210 to rotate its output shaft through one complete revolution, all as explained hereinbefore; and in addition that energization of coil 145 will complete a holding circuit for the coil 217 from conductor 32 via junction 111 in FIG. 2, coil 217, contacts 217A, junction 256, contacts 145A, the upper and movable contacts of switch 214, and junction 200 to conductor 30. However, the resulting five closings and openings of the switch 212 will not effect five energizations and de-energizations of the coil 163 but, instead, will effect five energizations and de-energizations of the coil 167—that coil being energized by a circuit which extends from conductor 32 via junction 35 in FIG. 3, coil 167, junctions 226, 227 and 228, conductor 183 which extends into FIG. 2, junctions 229 and 237, now-closed contacts 217C, junctions 249 and 260, switch 212, and junction 173 to conductor 30. As the output shaft of the motor 210 approaches the end of its revolution, it will shift the movable contact of switch 214 downwardly into engagement with the lower contact of that switch and momentarily de-energize that motor and coil 145. The consequent re-opening of the contacts 145A will not only break the holding circuit of the coil 145 but will also break the holding circuit for the coil 217; and thereupon the contacts 217D will reclose. The reclosing of those contacts will complete a re-energizing circuit for the motor 210 from conductor 32 via junction 117 in FIG. 3, motor 210, conductor 185 which extends into FIG. 2, the movable and right-hand contacts 145B, contacts 217D, contacts 599, the lower and movable contacts of switch 214, and junction 200 to conductor 30. The re-energization of the motor 210 will cause that motor to rotate its output shaft to the end of its one complete revolution and thus shift the movable contact of the switch 214 back up to its initial position.

The overall result is that whenever a fifty-cent piece is inserted, the motor 210 will be energized and will be caused to rotate its output shaft through one complete revolution. That revolution will cause five energizations and de-energizations of the stepping coil 132 of the stepping switch 133 and will thus advance the wiper 143 a distance equal to five times the spacing between two contacts on that stepping switch. In this way, the fifty-cent piece will register five tens credit on the stepping switch 133.

It should be noted that as soon as an inserted coin causes a credit of any value to be registered, the coil 386 will be energized by a circuit which extends from conductor 32 via junctions 61, 66, 68, 70 and 276 in FIG. 5, coil 386, conductor 388 which extends through FIG. 4 and into FIG. 3, junction 129, and then either through contacts 131A or through junction 136 and contacts 165A and junction 139, and then past junction 135, through conductor 141 which extends through FIG. 2 into FIG. 1, contacts 547, conductor 88, junction 86 in FIG. 3 and then extends through FIG. 4 into FIG. 5, the upper and movable contacts of the switch 44, switch 231, junction 92, contacts 624F, contacts 60C, junction 94, conductor 58 which extends into FIG. 6, contacts 65, conductor 59, contacts 72C, junction 56, the right-hand and movable contacts 412A, junction 54, the upper and movable contacts of the delivery switches 419, 417, 415 and 414, and junction 52 to conductor 30. The energization of the coil 386 is desirable because it will enable the contacts 407 to connect the selection switches 399, 401, 403, 402, 403 and 405 to the conductor 30.

*Bill Registering Circuits*

To enable the money-actuated device of the present invention to register credits corresponding to the value of a bill, a patron need only insert the leading edge of that bill between the leading edges of the belts of the bill transport and then press the push button 340. Thereupon, a circuit will be completed from conductor 32 via junction 206 in FIG. 1, conductor 207, junctions 208, 209 and 218, coil 528, resistor 538, diode 540, resistor 539, push button 340, switch 233, junction 236, conductor 238, junction 240, the upper and movable contacts of the switch 290, conductor 242 which extends into FIG. 2, contacts 524, conductor 352, junction 244, contacts 145C, junction 246, conductor 247, contacts 215C, the right-hand and movable contacts 1470, the right-hand and movable contacts 470, the upper and movable contacts of the switches 42, 40, 38, 36, 34 and 214, and junction 200 to conductor 30. That circuit will energize the coil 528; and as that coil becomes energized, the capacitor 536 will become charged. That capacitor will serve, after the push button 340 has been released, to keep the coil 528 energized, as by discharging through that coil and the serially-connected resistor 538. The length of time during which the discharging of the capacitor 536 can keep the coil 528 energized will be determined by the values of the resistor 538 and of the capacitor 536; and that length of time will preferably be less than one second. The use of the capacitor 536 makes certain that the coil 528 will be kept energized for a short, but adequate, period of time.

The energization of the relay coil 528 will open the contacts 541 and thereby prevent the energization of the coil 544 when the contacts 537 close. The closing of the latter contacts will complete a circuit from conductor 30 via junction 200 in FIG. 2, the movable and upper contacts of the switches 214, 34, 36, 38, 40 and 42, the movable and right-hand contacts 470, the movable and right-hand contacts 1470, contacts 215C, junction 246, contacts 145C, junction 244, conductor 352, contacts 524, conductor 242 which extends into FIG. 1, the movable and upper contacts of switch 290, junction 240, contacts 537, solenoid 230, junction 208, conductor 207, and junction 206 to conductor 32. The resulting energization of the solenoid 230 will cause the belts of the bill transport to grip the inserted bill between the confronting faces of those belts. The energization of the solenoid 230 also will close the switch 232 in FIG. 1 and will open the switch 231 in FIG. 5. The opening of the contacts 231 will de-energize the coin return electromagnets 234 and 235 in FIG. 3 and will thus enable the stops controlled by those electromagnets to reject all inserted coins. The closing of the switch 232 will complete a circuit from conductor 30 via junction 200 in FIG. 2, the movable and upper contacts of the switches 214, 34, 36, 38, 40 and 42, the movable and right-hand contacts 470, the movable and right-hand contacts 1470, contacts 215C, junction 246, contacts 145C, junction 244, conductor 352, contacts 524, conductor 242 which extends into FIG. 1, the movable and upper contacts of switch 290, junction 240, contacts 537, switch 232, junction 197, and then either through the main winding of motor 188 and the junction 33 to conductor 32 or through capacitor 190, contacts 558–560, the phase winding of the motor 188, contacts 554–552, and the junction 33 to conductor 32. As a result, the motor 188 will start rotating in such a direction as to cause the belts to start moving the inserted bill toward the rear of the bill transport.

Because the initial energizations of the solenoid 230 and of the motor 188 are effected by closing of the relay contacts 537, and because the discharging of the capacitor 536 can not hold the contacts 537 closed indefinitely, a further connection must be provided between conductor 30 and solenoid 230 and motor 188. The bill-actuated switches 274 and 278 in FIG. 1 will provide that further connection as soon as the belts of the bill transport move the leading edge of the inserted bill into engagement with the actuators of those switches.

As the switches 274 and 278 close, a circuit will be completed from conductor 30 via junction 201 in FIG. 1, switches 274 and 278, junction 193, solenoid 230, junction 208, conductor 207, and junction 206 to conductor 32. A second circuit will be completed from conductor 30 via junction 201, switches 274 and 278, junction 193, switch 232, junction 197, and then either through the main winding of the motor 188 and the junction 33 to conductor 32 or through capacitor 190, contacts 558–560, the phase winding of the motor 188, contacts 554–552, and junction 33 to conductor 32. The overall result is the bill-actuated switches 274 and 278 will keep the solenoid 230 and the motor 188 energized.

The belts of the bill transport will continue to move the inserted bill toward the rear of that transport; and the leading edge of that bill will soon engage and move the actuator of the switch 282 in FIG. 1 and thereby close that switch. Thereupon a circuit will be completed from conductor 30 via junction 201 in FIG. 1, switches 274 and 278, junctions 193, 195, 199 and 266, contacts 564–566, junction 268, switch 282, solenoid 330, and junction 93 to conductor 32. The resulting energization of the solenoid 330 will cause a soft-faced roller to engage the lower face of the inserted bill and press the upper face of that bill against the convex face of the magnetic head of the bill transport. The actuator for the switch 282 is set far enough rearwardly of the bill transport to enable the leading edge of the bill to pass between the magnetic head and the soft-faced roller before that leading edge moves the actuator of that switch. As a result, the magnetic head and the roller will not cause the leading edge of that bill to crumble or roll up. However, the actuator of the switch 282 is set close enough to the front of the bill transport to enable the leading edge of the bill to move that actuator before the portrait background of that bill reaches the magnetic head. This means that the magnetic head will engage and sense the portrait background of the bill. The bill will move rearwardly past the magnetic head, and that movement will cause voltage variations to be generated in the coil of that magnetic head, all as disclosed in the said Smith et al. application. Those voltage variations will be suitably amplified by a tuned amplifier in the unit 426 of FIG. 1, and will cause the control element in that unit to produce two validating signals, all as disclosed in the said co-pending Smith et al. application.

The first of those two validating signals will energize the coil 428 in FIG. 1; and thereupon contact 439 will engage contact 440 to complete a circuit from conductor 32 via junction 205 in FIG. 1, coil 446, contacts 454–456, contacts 440–439, contacts 1445, conductor 475, junctions 477, 199, 195 and 193, switches 274 and 278, and junction 201 to conductor 32. The resulting energization of the coil 446 will close the contacts 442 and 444 and will open the contacts 445. Closing of the contacts 444 will establish a holding circuit for the coil 446 from conductor 30 via junction 201 in FIG. 1, switches 274 and 278, junctions 193 and 195, contacts 444, coil 446, and junction 205 to conductor 32.

As the first validating signal passes, the coil 428 will become de-energized and the contact 439 will move back into engagement with the contact 438; and that engagement will complete a circuit from conductor 30 via junction 201 in FIG. 1, switches 274 and 278, junctions 193, 195, 199 and 477, conductor 475, contacts 1445, contacts 439–438, contacts 442, coil 462, and junction 205 to conductor 32. The resulting energization of the coil 462 will close the contacts 460 and will shift the movable contact 456 into engagement with the contact 458. The closing of the contacts 460 will complete a holding circuit for the coil 462 from conductor 30 via junction 201 in FIG. 1, switches 274 and 278, junctions 193, 195, 199 and 477, contacts 460, coil 462 and junction 205 to conductor 32.

The second validating signal from the unit 426 will again energize the coil 428; and the resulting movement of contact 439 into engagement with contact 440 will complete a circuit from conductor 32 via junction 107 in FIG. 2, coil 476, conductor 485 which extends into FIG. 1, contacts 458–456, contacts 440–439, contacts 1445, conductor 475, junctions 477, 199, 195 and 193, switches 274 and 278, and junction 201 to conductor 30. The resulting energization of the coil 476 will close the contacts 472 and 474 and will shift the movable contact 470 into engagement with the left-hand contact 470. The closing of the contacts 474 will establish a holding circuit for the coil 476 from conductor 32 via junction 107 in FIG. 2, coil 476, contacts 474, conductor 487 which extends into FIG. 1, junctions 266, 199, 195 and 193, switches 274 and 278, and junction 201 to conductor 30. The shifting of the movable contact 470 to the left will isolate the movable contact of the switch 290 from the conductor 30, and will thereby avoid reversing of the motor 188 when the leading edge of the inserted bill subsequently causes the movable contact of the bill 290 to shift down into engagement with the lower contact of that switch. The closing of the contacts 472 completes a circuit from conductor 30 via junction 179 in FIG. 2, contacts 472, coil 520, and junction 107 to conductor 32; and the resulting energization of the coil 520 will open the contacts 522 and 524 and will close the contacts 526 and 527.

The passing of the second validating signal from the unit 426 will again de-energize the coil 428 and will thus disconnect the contact 439 from the coil 476. However, that coil will be kept energized by the holding circuit established through the contacts 474. The opening of the contacts 522, when the coil 520 is energized, will prevent the energization of the coil 544 in FIG. 1 when the contacts 541 subsequently re-close upon the de-energization of the coil 528. The opening of the contacts 524 will additionally isolate the movable contact of the switch 290 from the conductor 30. The closing of the contacts 526 will complete a circuit from conductor 32 via junction 105 in FIG. 1, solenoid 344, contacts 526, junction 268, contacts 566–564, junctions 266, 199, 195 and 193, switches 274 and 278, and junction 201 to conductor 30. The resulting energization of the solenoid 344 will permit a gate at the front of the bill transport to move downwardly; and if a sturdy thread, tape or other attachment is not affixed to the inserted bill, that gate will move down far enough to enable the movable contact of the switch 362 in FIG. 1 to move down into engagement with the lower contact of that switch.

The bill will continue to move rearwardly of the bill transport; and its leading edge will soon engage and move the actuator of the switch 286 in FIG. 1. That switch is connected in parallel with the switches 274 and 278; and the closing of that switch will help maintain the circuits which were being maintained by the switches 274 and 278.

Further rearward movement of the bill will cause the leading edge of that bill to engage the actuator of the switch 290, and thereby shift the movable contact of that switch down into engagement with the lower fixed contact of that switch. Because the coils 470 and 520 were energized previously and are still energized, the shifting of that movable contact will not produce any immediate change in the position of any other electrical component of the bill transport.

Continued rearward movement of the bill will cause that bill to release the actuators of the switches 274 and 278, but the switch 286 will keep the resulting opening of those switches from having any immediate effect. Further rearward movement of that bill will cause that bill to engage the actuators of the switches 294 and 298 and to close those switches. Thereupon a circuit will be completed from conductor 32 via junction 109 in FIG. 2, coil 578, contacts 527, the lower and movable contacts of the switch 362, the switches 294 and 298, conductor 487, junctions 266, 199, 195 and 193, switch 286, and junction 201 to conductor 30. The resulting energization of the coil 578 will close the contacts 584, 585, 586 and 588. The contacts 584 are in parallel with the switch 286, and hence the closing of those contacts will maintain the circuits which were previously maintained by the switch 286. This means that the switches 294 and 298 will keep the solenoid 230, the solenoid 33, the solenoid 344, the motor 188, and the relay coils 446, 462 and 476 energized until the trailing edge of the bill has passed rearwardly beyond the actuators of those switches. The closing of the contacts 585 will complete a circuit from conductor 30 via junction 200 in FIG. 2, the movable and upper contacts of the switches 214, 34, 36, 38, 40 and 42, the movable and left-hand contacts 470, contacts 585, junction 571, conductor 569 which extends into FIG. 3, junctions 254, 252 and 250, coil 264, and junction 35 to conductor 32. The resulting energization of the coil 264 will close the contacts 264A and 264B; but the closing of the contacts 264A will not be significant at this time because there is an adequate supply of bills to be dispensed as change, and hence the coil 542 in FIG. 8 will not be energized and will not be holding the contacts 542D closed. The closing of the contacts 264B will, however, be significant at this time because it will complete a circuit from output terminal 157 of the bridge rectifier 151 in FIG. 3 via coil 164, contacts 264B, and the output terminal 159 of that bridge rectifier. As a result, the coil 164 will become energized and will cock the wiper 202 of the stepping switch 137.

The closing of the contacts 586, by the energization of the coil 578, is not significant at this time because the movable contact 1470 is out of engagement with the left-hand contact 1470. The closing of the contacts 588, by the energization of the coil 578 will complete a circuit from conductor 30 via junction 179 in FIG. 2, junction 1478, contacts 588, conductor 570 which extends through FIGS. 3, 4 and 5 into FIG. 6, junction 572, coil 479, junction 575, and junction 574 to conductor 32. The resulting energization of the coil 479 will close the contacts 479A and open the contacts 479B; and the closing of the contacts 479A will complete a circuit from prong 952 of plug 950 in FIG. 6 through contacts 479A, junction 953, motor 948, junction 951, and prong 954. The motor 948 will become energized and will run long enough to withdraw the bill from the exit of the bill transport and to hold it within the bill escrow. The coil 479 and the motor 948 will remain energized only as long as the coil 578 remains energized; and that coil will open as soon as the bill passes beyond the actuators of the switches 294 and 298.

Prior to the time the bill passes beyond the actuators of the switches 294 and 298, that bill will pass beyond the actuator of the switch 286. The resulting opening of that switch will not have any immediate effect because the contacts 584 will maintain the circuits that were being maintained by the switches 294 and 298. Also prior to the time the bill passes beyond the actuators of the switches 294 and 298, the capacitor 536 will discharge sufficiently to permit the coil 528 to let contacts 537 re-open and to let the contacts 541, 545 and 547 re-close.

As the bill passes beyond the actuators of the switches 294 and 298, those switches will re-open; and thereupon the solenoid 230, the motor 188, the solenoid 330 and the solenoid 344 will become de-energized, the coils 520 and 578 will become de-energized, the coils 446, 462 and 476 will become de-energized, and the stepping coil 164 in FIG. 3 will become de-energized. The de-energization of the latter coil will permit the wiper 202 to advance a distance equal to the spacing between two of the contacts on the stepping switch 137, and will thus register a hundreds credit on that switch. The de-energization of the solenoid 230 will permit the switch 231 in FIG. 5 to re-close and to re-energize the coin return electromagnets 234 and 235 in FIG. 3.

In the foregoing description of the operation of the bill transport, it was assumed that the inserted bill was an authentic bill; but if that bill had been a spurious bill, the bill transport would have rejected that bill, as was described in the said Schepflin application. The bill transport would reverse the motor 188 and return that bill to the front of the bill transport where it could be retrieved by the patron who inserted it.

In the event a patron wishes to register credits corresponding to a five dollar bill, he need only place the leading edge of that bill between the leading edges of the belts of the bill transport and will then press the push button 340. Thereupon, a circuit will be completed via junction 206 in FIG. 1, conductor 207, junctions 208, 209 and 218, coil 528, resistor 538, diode 540, resistor 539, push button 340, switch 233, junction 236, conductor 238, junction 240, the upper and movable contacts of the switch 290, conductor 242 which extends into FIG. 2, contacts 524, conductor 352, junction 244, contacts 145C, junction 246, conductor 247, contacts 215C, the right-hand and movable contacts 1470, the right-hand and movable contacts 470, the upper and movable contacts of the switches 42, 40, 38, 36, 34 and 214, and junction 200 to conductor 30. That circuit will energize the coil 528; and as that coil becomes energized, the capacitor 536 will become charged. That capacitor will serve, after the push button 340 has been released, to keep the coil 528 energized, as by discharging through that coil and the serially-connected resistor 538. The length of time during which the discharging of the capacitor 536 can keep the coil 528 energized will be determined by the values of the resistor 538 and of the capacitor 536; and that length of time will preferably be less than one second. The use of the capacitor 536 makes certain that the coil 528 will be kept energized for a short, but adequate, period of time.

The energization of the relay coil 528 will open the contacts 541 and thereby prevent the energization of the coil 544 when the contacts 537 close. The closing of the latter contacts will complete a circuit from conductor 30 via junction 200 in FIG. 2, the movable and upper contacts of the switches 214, 34, 36, 38, 40 and 42, the movable and right-hand contacts 470 the movable and right-hand contacts 1470, contacts 215C, junction 246, contacts 145C, junction 244, conductor 352, contacts 524, conductor 242 which extends into FIG. 1, the movable and upper contacts of switch 290, junction 240, contacts 537, solenoid 230, junction 208, conductor 207, and junction 206 to conductor 32. The resulting energization of the solenoid 230 will cause the belts of the bill transport to grip the inserted bill between the confronting faces of those belts. The energization of the solenoid 230 also will close the switch 232 in FIG. 1 and will open the switch 231 in FIG. 5. The opening of the contacts 231 will de-energize the coin return electromagnets 234 and 235 in FIG. 3 and will thus enable the stops controlled by those electromagnets to reject all inserted coins. The closing of the switch 232 will complete a circuit from conductor 30 via junction 200 in FIG. 2, the movable and upper contacts of the switches 214, 34, 36, 38, 40 and 42, the movable and right-hand contacts 470, the movable and right-hand contacts 1470, contacts 215C, junction 246, contacts 145C, junction 244, conductor 352, contacts 524, conductor 242 which extends into FIG. 1, the movable and upper contacts of switch 290, junction 240, contacts 537, switch 232, junction 197, and then either through the main winding of motor 188 and the junction 33 to conductor 32 or through capacitor 190, contacts 558–560, the phase winding of the motor 188, contacts 554–552, and the junction 33 to conductor 32. As a result, the motor 188 will start rotating in such a direction as to cause the belts to start moving the inserted bill toward the rear of the bill transport.

Because the initial energizations of the solenoid 230 and of the motor 188 are effected by closing of the relay contacts 537, and because the discharging of the capacitor 536 can not hold the contacts 537 closed indefinitely, a further connection must be prvoided between conductor 30 and solenoid 230 and motor 188. The bill-actuated switches 274 and 278 in FIG. 1 will provide that further connection as soon as the belts of the bill transport move the leading edge of the inserted bill into engagement with the actuators of those switches.

As the switches 274 and 278 close, a circuit will be completed from conductor 30 via junction 201 in FIG. 1, switches 274 and 278, junction 193, solenoid 230, junction 208, conductor 207, and junction 206 to conductor 32. A second circuit will be completed from conductor 30 via junction 201, switches 274 and 278, junction 193, switch 232, junction 197, and then either through the main winding of the motor 188 and the junction 33 to conductor 32 or through capacitor 190, contacts 558–560, the phase winding of the motor 188, contacts 554–552, and junction 33 to conductor 32. The overall result is the bill-actuated switches 274 and 278 will keep the solenoid 230 and the motor 188 energized.

The belts of the bill transport will continue to move the inserted bill toward the rear of that transport; and the leading edge of that bill will soon engage and move the actuator of the switch 282 in FIG. 1 and thereby close that switch. Thereupon a circuit will be completed from conductor 30 via junction 201 in FIG. 1, switches 274 and 278, junctions 193, 195, 199 and 266, contacts 564–566, junction 268, switch 282, solenoid 330, and junction 93 to conductor 32. The resulting energization of the solenoid 330 will cause a soft-faced roller to engage the lower face of the inserted bill and press the upper face of that bill against the convex face of the magnetic head of the bill transport. The actuator for the switch 282 is set far enough rearwardly of the bill transport to enable the leading edge of the bill to pass between the magnetic head and the soft-faced roller before that leading edge moves the actuator of that switch. As a result, the magnetic head and the roller will not cause the leading edge of that bill to crumble or roll up. However, the actuator of the switch 282 is set close enough to the front of the bill transport to enable the leading edge of the bill to move that actuator before the portrait background of that bill reaches the magnetic head. This means that the magnetic head will engage and sense the portrait background of the bill. The bill will move rearwardly past the magnetic head, and that movement will cause voltage variations to be generated in the coil of that magnetic head, all as disclosed, in the said co-pending Smith et al. application. Those voltage variations will be suitably amplified by a tuned amplifier in the unit 426 of FIG. 1, and will cause the control element in that unit to produce two validating signals, all as disclosed in the said co-pending Smith et al. application.

The first of those two validating signals will energize the coil 1428 in FIG. 1; and thereupon contact 1439 will engage contact 1440 to complete a circuit from conductor 32 via junction 204 in FIG. 1, coil 1446, contacts 1454–1456, contacts 1440–1439, contacts 445, contacts 567, conductor 1448 which extends through FIGS. 2–8 into FIG. 9, contacts 180, diode 303, contact 182, wiper 202, conductor 1449 which extends into FIG. 8, the movable and right-hand contacts 309C, junctions 1453 and 1452, conductor 1450 which extends through FIG. 7 into FIG. 6, contacts 315B, and junctions 311 and 96 to conductor 30. The resulting energization of the coil 1446 will close the contacts 1442 and 1444 and will open the contacts 1445. Closing of the contacts 1444 will complete a holding circuit for the coil 1446 from conductor 32 via junction 204 in FIG. 1, coil 1446, contacts 1444, conductor 475, junctions 477, 199, 195 and 193, contacts 537, junction 240, the upper and movable contacts of switch 290, conductor 242 which extends into FIG. 2, contacts 524, conductor 352, junction 244, contacts 145C, junction 246, conductor 247, contacts 215C, the right-hand and movable contacts 1470, the right-hand and movable contacts 470, the upper and movable contacts of the switches 42, 40, 38, 36, 34 and 214, and junction 200 to conductor 30.

As the first validating signal passes, the coil 1428 will become de-energized and the contact 1439 will move back into engagement with the contact 1438; and that engagement will complete a circuit from conductor 32 via junction 204 in FIG. 1, coil 1462, contacts 1442, conductor 1443 which extends into FIG. 2, contacts 1471, conductor 1447 which extends into FIG. 3, contacts 1438–1439, contacts 445, contacts 567, conductor 1448 which extends through FIGS. 2–8 into FIG. 9, contact 180, diode 303, contact 182, wiper 202, conductor 1449 which extends into FIG. 8, the movable and right-hand contacts 309C, junctions 1453 and 1452, conductor 1450 which extends through FIG. 1 into FIG. 6, contacts 315B, and junctions 311 and 96 to conductor 30. The resulting energization of coil 1462 will close the contacts 1460 and will shift the movable contact 1456 into engagement with the contact 1458. The closing of the contacts 1460 will complete a holding circuit for the coil 1462 from conductor 32 via junction 204 in FIG. 1, coil 1462, contacts 1460, conductor 475, junctions 477, 199, 195 and 193, contacts 537, junction 240, the upper and movable contacts of the switch 290, conductor 242 which extends into FIG. 2, contacts 524, conductor 352, junction 244, contacts 145C, junction 246, conductor 247, contacts 215C, the right-hand and movable contacts 1470 the right-hand and movable contacts 470, the upper and movable contacts of the switches 42, 40, 38, 36, 34 and 214, and junction 200 to conductor 30.

The second validating signal from the unit 426 will again energize the relay coil 1428; and the resulting movement of the contact 1439 into engagement with contact 1440 will complete a circuit from conductor 32 via junction 109 in FIG. 2, coil 1476, conductor 1477 which extends into FIG. 1, contacts 1458–1456, contacts 1440–1439, contacts 445, contacts 567, conductor 1448 which extends through FIGS. 2–8 into FIG. 9, contact 180, diode 303, contact 182, wiper 202, conductor 1449 which extends into FIG. 8, the movable and right-hand contacts 309C, junctions 1453 and 1452, conductor 1450 which extends through FIG. 7 into FIG. 6, contacts 315B, and junctions 311 and 96 to conductor 30. The resulting energization of the coil 1476 will close the contacts 1472 and 1474, will open the contacts 1471, and will shift the movable contact 1470 to its left-hand position. The closing of the contacts 1474 will establish a holding circuit for the coil 1476 from conductor 32 via junction 109 in FIG. 2, coil 1476, contacts 1474, conductor 487 which extends into FIG. 1, junctions 266, 199, 195 and 193, and switches 274 and 278, and junction 201 to conductor 30. The closing of the contacts 1472 completes a circuit from conductor 32 via junction 107 in FIG. 2, coil 520, contacts 1472, junction 1478, and junction 179 to conductor 30; and the resulting energization of the coil 520 will open the contacts 522 and 524 and will close the contacts 526 and 527.

The passing of the second validating signal from the unit 426 will again de-energize the coil 1428 and will thus disconnect the contact 1439 from the coil 1476. However, that coil will be kept energized by the holding circuit established through the contacts 1474. The shifting of the movable contact 1470 to its left-hand position will pre-set a circuit from conductor 32 via junction 109 in FIG. 2, coil 578, contacts 527, the lower and movable contacts of switch 362, switches 294 and 298, conductor 487, junction 266, junctions 199, 195 and 193, switch 286 and junction 201 to conductor 30. The opening of the contacts 1471 will make it possible for the coils 1446, 1462 and 1476 to become deenergized at the conclusion of the operation wherein the five dollar bill is validated.

The opening of the contacts 522, when the coil 520 is energized, will prevent the energization of the coil 544 in FIG. 1 when the contacts 541 subsequently re-close upon the de-energization of the coil 528. The opening of the contacts 524 will additionally isolated the movable contact of the switch 290 from the conductor 30. The closing of the contacts 526 complete a circuit from conductor 32 via junction 105 in FIG. 1, solenoid 344, contacts 526, junction 628, contacts 566–564, junctions 266, 199, 195 and 193, switches 274 and 278, and junction 201 to conductor 30. The resulting energization of the solenoid 344 will permit a gate at the front of the bill transport to move downwardly; and if a sturdy thread, tape or other attachment is not affixed to the inserted bill, that gate will move down far enough to enable the movable contact of the switch 362 in FIG. 1 to move down into engagement with the lower contact of that switch.

The bill will continue to move rearwardly of the bill transport; and its leading edge will soon engage and move the actuator of the switch 286 in FIG. 1. That switch is connected in parallel with the switches 274 and 278; and the closing of that switch will help maintain the circuits which were being maintained by the switches 274 and 278.

Further rearward movement of the bill will cause the leading edge of that bill to engage the actuator of the switch 290, and thereby shift the movable contact of that switch down into engagement with the lower fixed contact of that switch. Because the coils 470 and 520 were previously energized and are still energized, the shifting of that movable contact will not produce any immediate change in the position of any other electrical component of the bill transport.

Continued rearward movement of the bill will cause that bill to release the actuators of the switches 274 and 278, but the switch 286 will keep the resulting opening of those switches from having any immediate effect. Further rearward movement of that bill will cause that bill to engage the actuators of the switches 294 and 298 and to close those switches. Thereupon a circuit will be completed from conductor 32 via junction 109 in FIG. 2, coil 578, contacts 527, the lower and movable contacts of the switch 362, the switches 294 and 298, conductor 487, junctions 266, 199, 195 and 193, switch 286 and junction 201 to conductor 30. The resulting energization of the coil 578 will close the contacts 584, 585, 586 and 588. The contacts 584 are in parallel with the switch 286, and hence the closing of those contacts will maintain the circuits which were previously maintained by the swtich 286. This means that the switches 294 and 298 will keep the solenoid 230, the solenoid 330, the solenoid 344, the motor 188, and the relay coils 1446, 1462 and 1476 energized until the trailing edge of the bill has passed rearwardly beyond the actuators of those switches. The closing of the contacts 585 will complete a circuit from conductor 30 via junction 200 in FIG. 2, the movable and upper contacts of the switches 214, 34, 36, 38, 40 and 42, the movable and right-hand contacts 470, the movable and left-hand contacts 1470, contacts 586, junction 580, coil 591 and junction 111 to conductor 32. The resulting energization of the coil 591 will close the contacts 593 and 597 and will open the contacts 595 and 599. The opening of the contacts 599 is not significant at this time but will become significant during the cycle of operation of the motor 210 in FIG. 3. The opening of the contacts 595 will prevent the energization of the stepping coil 50 of the stepping switch 48 when the coil 145 is energized to effect energization of the motor 210. The closing of the contacts 597 will preset a circuit from conductor 32 via junction 35 in FIG. 3 coil 264, junctions 250, 252 and 254, conductor 569 which extends into FIG. 2, junction 571, contacts 597, junctions 249 and 260, switch 212, and junction 173 to conductor 30.

The closing of the contacts 593 will complete a circuit from conductor 30 via junction 200 in FIG. 2, the movable and upper contacts of switches 214, 34, 36, 38, 40 and 42, the movable and right-hand contacts 470, the movable and left-hand contacts 1470, contacts 586, junction 580, contacts 593, junction 256, coil 145, and junction 115 to conductor 32. The resulting energization of the coil 145 will close the contacts 145A and 145D, will open the contacts 145C, and will shift the movable contact 145B into engagement with the left-hand contact 145B. The closing of the contacts 145A will complete a holding circuit for the coil 591 as well as for the coil 145; and that circuit will extend from conductor 30 via junction 200 in FIG. 2, the movable and upper contacts of the switch 214, conductor 258, contacts 145A, and then either through coil 145 and junction 115 to conductor 32 or past junction 256 through contacts 593, past junction 580, and through coil 591 and junction 111 to conductor 32.

The opening of the contacts 145C is not significant at this time because the shifting of the movable contact 1470 to its left-hand position previously isolated the junction 244 from the conductor 30. The closing of the contacts 145D is not significant at this time because the contacts 595 have been opened and have isolated the contacts 145D from the coil 163. This isolation is necessary to keep the stepping coil 50 of the stepping switch 48 from being energized upon the insertion of a five dollar bill.

The shifting of the movable contacts 145B to the left will energize the motor 210; and the cam adjacent the switch 212 will cause that switch to close and re-open five times, thereby successively completing and interrupting a circuit from conductor 30 via junction 173 in FIG. 2, switch 212, junctions 260 and 249, contacts 597, junction 571, conductor 569 which extends into FIG. 3, junctions 254, 252 and 250, coil 264 and junction 35 to conductor 32. As a result, the coil 264 will become energized and de-energized five times; and each time that coil becomes energized, it will close the contacts 264A and 264B. Each time the contacts 164B close, the coil 164 of the stepping switch 137 will be energized via output terminal 157 of the bridge rectifier 151, coil 164, contacts 264B, and output terminal 159 of that bridge rectifier. The five energizations and de-energizations of the coil 164 will cause the wiper 202 of the stepping switch 137 to advance a distance equal to five times the spacing between two contacts of that switch and thereby register five hundreds credits on that switch.

As the output shaft of the motor 210 approaches the end of a revolution, it will cause the movable contact of the switch 214 to shift down into engagement with the lower fixed contact of that switch, and deenergize the coils 145 and 591 and the motor 210. The interruption of the current to the motor 210 will be only momentary because the bill will pass beyond the actuators of the switches 294 and 298 and permit those switches to re-open; and thereupon the coils 520, 578, 1446, 1462 and 1476, will become de-energized and the contacts 599 will re-energize the motor 210. Those contacts will do so by completing a circuit that extends from conductor 30 via junction 20 in FIG. 2, the movable and lower contacts of the switch 214, contacts 599, contacts 217D, the right-hand and movable contacts 145B, conductor 185 which extends into FIG. 3, motor 210, and junction 117 to conductor 32. The cam on the output shaft of the motor 210 will subsequently return the movable contact of the switch 214 to its upper position and thereby de-energize the motor 210.

The closing of the contacts 586, by the energization of the coil 578, will complete a circuit from conductor 30 via junction 179 in FIG. 2, junction 1478, contacts 588, conductor 570 which extends through FIGS. 3, 4 and 5 into FIG. 6, junction 572, coil 479, junction 575, and junction 574 to conductor 32. The resulting energization of the coil 479 will close the contacts 479A, and open contacts 479B; and the closing of the contacts 479A will complete a circuit from prong 952 of plug 950 in FIG. 6 through contacts 479A, junction 953, motor 948, junction 951, and prong 954. The motor 948 will become energized and will run long enough to withdraw the bill from the exit of the bill transport and to hold it within the bill escrow. The coil 479 and the motor 948 will remain energized only as long as the coil 578 remains energized; and that coil will open as soon as the bill passes beyond the actuators of the switches 294 and 298.

Prior to the time the bill passes beyond the actuators of the switches 294 and 298, that bill will pass beyond the actuator of the switch 286. The resulting opening of that switch will not have any immediate effect because the contacts 584 will maintain the circuits that were being maintained by the switches 294 and 298. Also prior to the time the bill passes beyond the actuators of the switches 294 and 298, the capacitor 536 will discharge sufficiently to permit the coil 528 to let contacts 537 reopen and to let the contacts 541, 545 and 547 re-close.

As the bill passes beyond the actuators of the switches 294 and 298, those switches will re-open; and thereupon the solenoid 230, the motor 188, the solenoid 330 and solenoid 344 will become de-energized, the coils 520 and 578 will become de-energized, and the coils 1446, 1462 and 1476 will become de-energized.

The foregoing discussion was based on the assumption that the patron inserted an authentic five dollar bill. If a patron were to insert a spurious five dollar bill that bill would be returned to him.

It should be noted that as soon as an inserted bill causes a credit of any value to be registered, the coil 386 will be energized by a circuit which extends from conductor 32 via junctions 61, 66, 68, 70 and 276 in FIG. 5, coil 386, conductor 388 which extends through FIG. 4 and into FIG. 3, junctions 129 and 136, contacts 203A, junctions 139 and 135, conductor 141 which extends through FIG. 2 into FIG. 1, contacts 547, conductor 88 which extends to junction 86 in FIG. 3, and then along conductor 88 through FIG. 4 into FIG. 5, the upper and movable contacts of the switch 44, switch 231, junction 92, contacts 624F, contacts 60C, junction 94, conductor 58 which extends into FIG. 6, contacts 65, conductor 59, contacts 72C, junction 56, the right-hand and movable contacts 412A, junction 54, the upper and movable contacts of the delivery switches 419, 417, 415 and 414, and junction 52 to conductor 30. The energization of the coil 386 is desirable because it will enable the contacts 407 to connect the selection switches 399, 401, 403, 402, 403 and 405 to the conductor 30.

It should also be noted that once a five dollar bill has been accepted, and has caused five hundreds credits to be registered on the stepping switch 137, a further five dollar bill can not be accepted. This is due to the fact that the contacts 309D in FIG. 8 are normally open and will normally isolate the cathode of the diode 295 in FIG. 9 from the fifth contact 191 and from all contacts thereabove, and is also due to the fact that insertion of the first five dollar bill will have moved the wiper 202 upwardly to or above the level of the contact 191. As long as the wiper 202 is below the level of the fifth contact 191, the movable contact 1439 will be connected to the conductor 30 by junctions 96 and 311 in FIG. 6, contacts 315B, conductor 1450 which extends through FIG. 7 into FIG. 8, junctions 1452 and 1453, the right-hand and movable contacts 309C, conductor 1449 which extends into FIG. 9, wiper 202, and then either through contact 180 or through contact 182 and diode 303 and contact 180 or through contact 184 and diode 301 and contact 182 and diode 303 and contact 180 or through contact 186 and diode 299 and contact 184 and diode 301 and contact 182 and diode 303 and contact 180 or through contact 189 and diode 297 and contact 186 and diode 299 and contact 184 and diode 301 and contact 182 and diode 303 and contact 180, and then through conductor 1448 which extends through FIGS. 8, 7, 6, 5, 4, 3 and 2 into FIG. 1, contacts 567, and contacts 445 to the movable contact 1439. The isolation of the movable contact 1439 from the conductor 30 which the contacts 309D thus provide will not interfere with the energization of the bill transport; but, instead, will permit that bill transport to move a further five dollar bill toward the rear of that transport. That isolation also will not interfere with the energizations and de-energizations of the coil 1428; but it will keep those energizations and de-energizations from energizing the coil 1446, and will thus keep the coil 520 from becoming energized. As a result, when the further five dollar bill engages the actuator of the switch 290 and shifts the movable contact of that switch downwardly, the coil 544 will be energized by a circuit which extends from conductor 32 via junctions 206, 207, 208 and 209 in FIG. 1, coil 544, junction 493, the lower and movable contacts of the switch 290, conductor 242 which extends into FIG. 2, contacts 524, conductor 352, junction 244, contacts 145C, junction 246, conductor 247, contacts 215C, the right-hand and movable contacts 1470, the right-hand and movable contacts 470, the upper and movable contacts of the switches 42, 40, 38, 36, 34 and 214, and junction 200 to conductor 30. The resulting energization of the coil 544 will open the contacts 567 and will shift the contacts 552, 558 and 564 to the left. The opening of the contacts 567 is not significant at this time, because the contacts 309D have already isolated the movable contacts 1439 from the conductor 30; but the opening of the contacts 567 is significant during the rejection of a five dollar bill whenever the contacts 309D have not been opened.

The shifting of the movable contact 564 to the left, as the coil 544 becomes energized, will de-energize the solenoid 330 and thus permit the roller to be spaced away from the magnetic head as the bill moves back to the front of the bill transport. The shifting of the movable contacts 552 and 558 to the left, as the coil 544 becomes energized, will reverse the connections of the phase winding of the motor 188; and thereupon that motor will start rotating in the opposite direction. The overall result is that the five dollar bill will be moved back to the front of the bill transport where it can be retrieved by the patron. In this way, the money-actuated device of the present invention will prevent the acceptance of a five dollar bill whenever five or more hundreds credits have been registered on the stepping switch 137; and this is important because the maximum credit that can be registered by the three stepping switches 48, 133 and 137 is nine dollars and ninety-nine cents.

It should also be noted that as the wiper 202 moves into engagement with the ninth contact 198, the contacts 174-176 in FIG. 3 will open; and the opening of those contacts will interrupt the circuit which normally extends from conductor 32 via junction 35 in FIG. 3, the coin return electromagnets 234 and 235, junction 37, conductor 39 which extends through FIGS. 4 and 5 into FIG. 6, contacts 479B, switch 481, conductor 82 which extends through FIGS. 5 and 4 into FIG. 3, contacts 176-174, conductor 84, junction 86, conductor 88 which extends through FIG. 4 into FIG. 5, the upper and movable contacts of switch 44, the switch 231, junction 92, contacts 624F, contacts 60C, junction 94, conductor 58 which extends into FIG. 6, contacts 63, conductor 59, contacts 72C, junction 56, the right-hand and movable contacts 412A, junction 54, the upper and movable contacts of the delivery switches 419, 417, 415 and 414, and junction 52 to conductor 30. The interruption of that circut will enable the coin-rejecting stops to enter the various coin passages and reject all further inserted coins, and will enable the switch 233 in FIG. 1 to open and disable the bill transport starting circuit. The overall result is that once the wiper 202 reaches the ninth contact 198, the money-actuated device will reject all further coins and bills.

*Credit Registering Tens Transfer Circuits*

The stepping switches 137, 133 and 48 are made so the wipers 202, 143 and 126, respectively, thereof move in just one direction. Further, those stepping switches are made so the wipers thereof are cocked for advancement whenever the stepping coils are energized but do not actually make an advancement until those stepping coils are de-energized. It is necessary that the credits represented by the wiper 126, as that wiper is moved out of engagement with the ninth contact and into engagement with the zero contact of the units registration stepping switch 48, be transferred to the tens registration stepping switch 133. Similarly, it is necessary that the credits represented by the wiper 143, as that wiper is moved out of engagement with the ninth contact and into engagement with the zero contact of the tens registration stepping switch 133, be transferred to the hundreds registration stepping switch 137. In addition, it is desirable that the said credits be transferred in the form of unit advancements of the wipers 143 and 202. To enable credits to be transferred from the units registration stepping switch 48 to the tens registration stepping switch 133 in the form of a unit advancement of the wiper 143, and to enable credits to be transferred from the tens registration stepping switch 133 to the hundreds registration stepping switch 137 in the form of a unit advancement of the wiper 202, a tens transfer circuit is provided for each of the stepping switches 48 and 133.

The tens transfer circuit for the stepping switch 48 includes contacts 100–102 which are normally open but which close whenever the wiper 126 is moved into engagement with the ninth contact 122. The tens transfer circuit of the stepping switch 133 utilizes contacts 138 which are normally open but which close whenever the wiper 143 is moved into engagement with the ninth contact 162. The closing of the contacts 100–102 whenever the wiper 126 is moved into engagement with the contact 122 will enable the next succeeding closing of the contacts 163B to apply as pulse to the coil 167 via conductor 30, junction 171 in FIG. 3, junction 169, contacts 163B, contacts 102–100, contacts 223D, junction 226, coil 167, and junction 35 to conductor 32. The resulting energization of coil 167 will act through contacts 167A to energize coil 132 to advance the wiper 143 a distance equal to the space between two contacts on the stepping switch 133. This advancement of the wiper 143 will occur at the same time the wiper 126 advances into engagement with the zero contact 104 of the stepping switch 48; and hence the ten unit credits previously represented by the advanced position of the wiper 126 will have been removed from the stepping switch 48 and one tens credit will have been registered on the stepping switch 133.

Similarly, the closing of the contacts 138 whenever the wiper 143 is moved into engagement with the contact 162 will enable the next succeeding closing of the contacts 167B to apply a pulse to the coil 264 via conductor 30, junctions 171, 169 and 175, contacts 167B, contacts 138, contacts 223C, junction 250, coil 264, and junction 35 to conductor 32. The resulting energization of coil 264 will act through contacts 264B to energize coil 164 to advance the wiper 202 a distance equal to the space between two contacts on the stepping switch 137. This advancement of the wiper 202 will occur at the same time the wiper 143 advances into engagement with the zero contact 144 of the stepping switch 133; and hence the ten tens credits previously represented by the advanced position of the wiper 143 will have been removed from the stepping switch 133 and one hundreds credit will have been registered on the stepping switch 137.

The contacts 223D and 223C are normally closed, and they must remain closed during the registering of credits corresponding to inserted coins and bills. However, those contacts must be opened to prevent the transferring of credits between the stepping switches 48, 133 and 137, as during the deducting of credits and during the "homing" of the wipers 126, 143 and 202. Those contacts are opened during the deducting of credits by the shifting of the movable contact 60B to the right in FIG. 5 to complete a circuit through the coil 223 via conductor 32, junction 225 in FIG. 3, coil 223, conductor 221 which extends through FIG. 4 into FIG. 5, the movable and right-hand contacts 60B, conductor 352 which extends to junction 353 in FIG. 4 and then through FIG. 3 to junction 244 in FIG. 2, contacts 145C, junction 246, conductor 247, contacts 215C, the right-hand and movable contacts 1470, the right-hand and movable contacts 470, the upper and movable contacts of switches 42, 40, 38, 36, 34 and 214, and junction 200 to conductor 30. The contacts 223D and 223C also are opened during the "homing" of the wipers 126, 143 and 202 after the dispensing of change; and those contacts are opened by the completion of a circuit when the switch 894 and the contacts 910 in FIG. 6 are closed—that circuit extending from conductor 32 via junction 225, coil 223, conductor 221 which extends through FIG. 4 into FIG. 5, the movable and left-hand contacts 60B, junction 692, conductor 690 which extends into FIG. 6, junction 694, contacts 910, the lower and movable contacts of switch 894, junction 892, and junction 339 to conductor 30. The contacts 223D and 223C additionally are opened during the "homing" of the wipers 126, 143 and 202 after a patron has retrieved the money she inserted; and those contacts are opened by the completion of a circuit when the contacts 621 close—that circuit extending from conductor 32 via junction 225, coil 223, conductor 221 which extends through FIG. 4 into FIG. 5, the movable and left-hand contacts 608, junction 692, conductor 690 which extends into FIG. 6, junction 694, contacts 621, junction 398, conductor 404 which extends through FIGS. 5 and 4 and into FIG. 3, and then either through junction 396, contacts 131D–131C, junction 390, and junction 170 to conductor 30, or junctions 396 and 394, contacts 165C, junctions 392 and 390, and junction 170 to conductor 30, or junctions 396 and 394, contacts 203C, junctions 392 and 390, and junction 170 to conductor 30.

By utilizing these credit registering tens transfer circuits, the money-actuated device of the present invention is enabled to transfer unit credits to the tens registering stepping switch while erasing those credits from the unit registering stepping switch, and to transfer tens credits to the hundreds registering stepping switch while erasing those tens credits from the tens registering stepping switch. Also, by utilizing these credit registering tens transfer circuits, the money-actuated device of the present invention is enabled, whenever required, to prevent the transferring of credits between the various stepping switches; as, for example, during the deducting of credits when each digit of the selling price must be deducted from the corresponding digit of the registered credits without any regard to the other digits of the registered credits.

*Selection Switches Circuit*

A circuit is provided to enable the selection switches of the money-actuated device of the present invention to control the selection relays of that money-actuated device; and that circuit will enable each selection switch to control its corresponding selection relay. Thus, that circuit enables the selection switch 399 to control the selection relay 354, enables the selection switch 401 to control the selection relay 355, enables the two left-handmost selection switches 403 to control the selection relays 356 and 357, enables the selection switch 402 to control the selection relay 359, enables the two right-handmost selection switches 403 to control the selection relays 361 and 363, and enables the selection switch 405 to control the selection relay 358.

It would be undesirable for that circuit to permit the actuation of a selection switch to always lead to the energization of the corresponding selection relay. For example, it would be undesirable for that circuit to permit a patron to actuate a selection switch and thereby energize the corresponding selection relay at a time when no money had been introduced into the money-handling device. Also, it would be undesirable for that circuit to permit a patron to actuate a selection switch and thereby energize the corresponding selection relay during the time when bills are being introduced and validated. Further, it would be undesirable for that circuit to permit a patron to actuate a selection switch and thereby energize the corresponding selection relay during the time when the money that had been inserted by a patron was being returned to her or during the time when change was being dispensed to a patron. In addition, it would be undesirable for that circuit to permit a patron to actuate a selection switch and thereby energize the corresponding selection relay during the period which begins with the initiation of a vending cycle and which concludes with the completion of that cycle or with the completion of the credit deducting cycle, whichever is later in point of time. Moreover, it would be undesirable for that circuit to permit a patron to actuate a selection switch and thereby energize the corresponding selection relay at a time when the supply of the desired product was exhausted. Furthermore, it would be undesirable for that circuit to permit another selection switch to actuate its corresponding selection relay while a given selection relay is still actuated.

To enable that circuit to keep the selection switches from actuating the corresponding selection relays under these various circumstances, a number of contacts and switches are included in that circuit; and those contacts and switches will be actuated as required to keep the selection switches from actuating the corresponding selection relays. Thus, the contacts 131D–131C, contacts 165C and contacts 203C are provided in that circuit to isolate the selection switches from the conductor 30 whenever no credits have been registered. The contacts 418B, contacts 416B, contacts 423C, contacts 409C, contacts 410C, contacts 421B, contacts 411B and contacts 408B are provided to keep other selection switches from actuating their corresponding selection relays while a given selection relay is still actuated. The contacts 407 are provided in that circuit to isolate the selection switches from the conductor 30 whenever no money has been introduced into the money-actuated device, during the time when bills are being introduced and validated, during the time when the money that had been inserted by a patron is being returned to her during the time when change is being dispensed and during the period which begins with the initiation of a vendng cycle and which concludes with the completion of that cycle or with the completion of the credit deducting cycle, whichever is later in point of time. The empty switches 391, 393, 395 and 397 are provided in the selection switches circuit to isolate the selection switches from the selection relays whenever the supply of the desired product is exhausted.

The contacts 407 in the selection switches circuit is controlled by a coil 386, and that coil is controlled by a circuit extending from conductor 32 via junctions 61, 66, 68, 70 and 276, coil 386, conductor 388 which extends through FIG. 4 into FIG. 3, and then either through junction 129 and contacts 131A to junction 135, or through junctions 129 and 136, contacts 165A, and junction 139 to junction 135, or through junctions 129 and 136, contacts 203A and junction 139 to junction 135, and then through conductor 141 which extends through FIG. 2 into FIG. 1, contacts 547, conductor 88 which extends through FIG. 2 to a junction 86 in FIG. 3 and then extends through FIG. 4 into FIG. 5, the upper and movable contacts of the switch 44, switch 231, junction 92, contacts 624F, contacts 60C, junction 94, conductor 58 which extends into FIG. 6, contacts 65, conductor 59, contacts 72C, junction 56, the right-hand and movable contacts 412A, junction 54, and the upper and movable contacts of the delivery switches 419, 417, 415 and 414 to junction 52 and conductor 30. This circuit will be interrupted when the money-actuated device of the present invention is in its stand-by condition, and hence the contacts 407 will be open and will be isolating the selection switches from conductor 30 whenever that money-actuated device is in that condition. However, as soon as a credit is registered on one or more of the stepping switches 48, 133 and 137, the circuit which controls the coil 386 will be completed and will energize that coil and thereby cause the contacts 407 to connect the selection switches to conductor 30. The circuit which controls the coil 386 will again be interrupted, and the contacts 407 will again isolate the selection switches from conductor 30, during the time when bills are being introduced and validated, during the time when the money that had been inserted by a patron is being returned to her or during the time when change is being dispensed, and during the period which begins with the initiation of a vending cycle and which concludes with the completion of that cycle or with the completion of the credit deducting cycle, whichever is later in point of time.

The contacts 408B, 410C and 409C in the selection switches circuits are actuatable by the three credit sensing relays 408, 410 and 409 in the hundreds credit sensing circuit. The contacts 411B, the contact 416B, and the contact 418B are actuatable by the three credit sensing coils 411, 416 and 418 in the tens credit sensing circuit; and the contacts 421B and 423C are actuatable by the two credit sensing coils 421 and 423 in the units credit sensing circuit. The various contacts 418B, 416B, 423C, 409C, 410C, 421B, 411B and 408B have been provided on the corresponding credit sensing relays to enable the actuation of various combinations of those relays, by the actuation of a given selection relay, to isolate the various selection switches from conductor 30. That isolation accomplishes the desired objective of keeping other selection switches from actuating their corresponding selection relays while the given selection relay is still energized. Specifically, if the registered credits equal the selling price of the desired product, all of the credit-sensing relays will be energized; and this means that the contacts 410C, 421B, 411B and 408B will be open and that the movable contact 418B will be shifted to the left to isolate the various selection switches from conductor 30. If the registered credits exceed the selling price of the desired product, one or more of the credit sensing relays 418, 410, 421, 411 and 408 will be energized; and this means that one or more of the contacts 418B, 410C, 421B, 411B and 408B will be acting to isolate the various selection switches from conductor 30. As a result, whether the registered credits equal or exceed the selling price corresponding to a given selection relay, the actuation of that selection relay will cause various of the credit sensing relays to isolate the various selection switches from conductor 30 and thereby keep any other selection relay from being actuated until after the given selection relay is re-set.

The contacts 131C–131D, the contacts 165C, and the contacts 203C are controlled by the coils 131, 165 and 203. Those coils are, in turn, controlled by the normally-open contacts 90, 134 and 166 on the stepping switches 48, 133 and 137. The contacts 90, 134 and 166 will be open whenever no credits have been registered; and hence the contacts 131C–131D, 165C and 203C also will be open whenever no credits have been registered.

By utilizing this selection switch circuit, the money-actuated device of the present invention is enabled to prevent the actuation of any of the selection relays until at least one credit has been registered. Further, by utilizing this selection switch circuit, the money-actuated device of the present invention is enabled to prevent the actuation of any of the selection relays under other predetermined circumstances; and yet that money-actuated device is enabled to provide proper and precise actuation of those selection relays at the appropriate time.

*Selection Relays Circuit*

The lower contacts of the selection switches 399, 401, 403, 402, 403 and 405 are connected to the setting coils of the corresponding selection relays. In the case of the lower contact of the switch 399, the movable and left-hand contacts of the empty switch 391 and a conductor 546 directly connect that contact to the coil 354S of the selection relay 354. Similarly, the movable and left-hand contacts of the third left-handmost empty switch 395 and a conductor 568 directly connect the lower contact of the switch 402 with the setting coil of the selection relay 359. With regard to the lower contacts of the other selection switches 401, 403, and 405, the connection to the setting coil of the corresponding selection relay is through the movable and upper contacts of the lower sections of vend control switches and then through the movable and left-hand contacts of the empty switches. Specifically, the lower contact of the selection switch 401 is connected to the coil 355S of selection relay 355 through the movable and upper contacts of the lower section of the vend control switch 427, the movable and left-hand contacts of the empty switch 393, and a conductor 548. The lower contacts of the selection switches 403 are connected to the setting coils of the relays 356, 357, 368 and 363 by the movable and upper contacts of the lower sections of the four left-handmost vend control switches 429, by the movable and left-hand contacts of the two left-handmost and the two right-handmost empty switches 395, and the conductors 702, 705, 629 and 704. The lower contact of the selection switch 405 is connected to the setting coil 358S of the relay 358 by the movable and upper contact of the lower section of the right-handmost vend control switch 429, the movable and left-hand contacts of the empty switch 397, and conductor 551.

It will be noted that the lower contacts of the selection switches 399 and 402 are directly connected to the setting coils of the appropriate selection relays by the empty switches corresponding to the products selected by those selection switches, whereas the lower contacts of the remaining selection switches are connected to the setting coils of the corresponding selection relays by the lower sections of vend control switches and by the empty switches corresponding to the products to be selected by those selection switches. This arrangement makes it possible to subdivide the vending machine into two halves. However, if the vending machine is not to be subdivided, the connection between the selection switch 402 and the selection relay 359 would be made the same as the connections between the switches 403 and 405 and the corresponding selection relays. If the vending machine were to be subdivided into more than two sections, the connections between some of the switches 403 and the corresponding selection relays would be made the same as the connections between switches 399 and 402 and the selection relays 354 and 359.

The vend control switches 427 and 429 are shown and described in detail in co-pending application Serial No. 34,112 of Alvin W. Holstein et al. for Vending Machine which was filed on June 6, 1960. Consequently, the operation of those switches need not be described herein.

In the event a selection switch is actuated and the corresponding empty switch has the movable contact thereof in its right-hand position, the corresponding empty lamp and the "make another selection" lamp will be energized. For example, if it is assumed that the movable contact 391 has shifted to its right-hand position, and if it is further assumed that the selection switch 399 has had the movable contact thereof moved down, a circuit will be completed via conductor 30, junction 170 in FIG. 3, junction 390, either through contacts 131C–131D and junction 396 or through junction 392 and contacts 165C and junctions 394 and 396 or through junction 392 and contacts 203C and junctions 394 and 396, conductor 404 which extends through FIGS. 4 and 5 to junction 398 in FIG. 6 and then through FIG. 7 into FIG. 8, junctions 365, 400 and 406, the right-hand and movable contacts 418B, junction 425, the movable and left-hand contacts 416B, contacts 423C, contacts 409C, contacts 410C, contacts 421B, contacts 411B, contacts 408B, conductor 413 through FIGS. 7 and 6 to contacts 407 in FIG. 5, the left-hand and movable contacts 60A, junction 57, the movable and upper contacts of switches 405, 403, 402, 403 and 401, and the movable and lower contacts of switch 399, the movable and right-hand contacts of empty switch 391, the movable and upper contacts of the upper section of vend control switch 427, conductor 437, the right-hand and movable contacts 434, and either through empty lamp 441 and junctions 70, 68, 66 and 61 to conductor 32, or through diode 451 and resistor 449 and coil 432 and junctions 68, 66 and 61 to conductor 32. The capacitor 447 is in parallel with the coil 432 and will coact with the resistor 449 and the diode 451 to make sure that the movable contact 434 will move fully to its left-hand position after it has started to move in response to the energization of the coil 432. As the movable contact 434 reaches its left-hand position, it will complete a holding circuit via conductor 30, junction 98 in FIG. 5, push button 448, the left-hand and movable contacts 434, diode 451, resistor 449, coil 432, and junctions 68, 66 and 61 to conductor 32. That holding circuit will remain intact until the operator of the vending machine replenishes the supply of products and presses the push button 448. The closing of the contacts 436 will energize the "make another selection" lamp 248 via conductor 32, junctions 61 and 66, lamp 248, contacts 436, conductor 437, the upper and movable contacts of the upper section of vend control switch 427, the right-hand and movable contacts of empty switch 391, the lower and movable contacts of the selection switch 399, and then through the upper and movable contacts of the selection switches 401, 403, 402, 403 and 405, junction 57, the movable and left-hand contacts 60A, switch 407, conductor 413 which extends through FIGS. 6 and 7 to contacts 408B in FIG. 8, contacts 411B, contacts 421B, contacts 410C, contacts 409C, contacts 423C, the left-hand and movable contacts 416B, junction 425, the movable and right-hand contacts 418B, junctions 406, 400 and 365, conductor 404 which extends through FIG. 7 to junction 398 in FIG. 6 and then through FIGS. 5 and 4 to junction 396 in FIG. 3, either through contacts 131D–131C and junction 390 or through junctions 396 and 394 and contacts 165C and junction 392 to junction 390 or through junctions 396 and 394 and contacts 203C and junction 392 to junction 390, and then through junction 170 to conductor 30. It will be noted that the circuit to the "make another selection" lamp 248 was established through the movable and lower contacts of the selection switch 399; and hence as soon as the movable contact of that switch is restored to its normal position, the circuit to that lamp will be broken and that lamp will become dark. As indicated previously herein, the lamp 248 will be in the line of sight of a patron but the lamp 441 will be out of the line of sight of the patron while being visible to an employee of the operator of the money-actuated device. As a result, the patron will be advised to make another selection and an employee of the operator of the vending machine will be advised to replenish the supply of products.

The lamp 455 is similar to the lamp 441, the coil 443 is similar to the coil 432, and the push button 448A is similar to the push button 448. The empty lamp 445 will respond to a shifting of the movable contacts of the empty switch 397 and of the three right-handmost empty switches 395. As a result, if the supply of product corresponding to any of the selection relays 359, 361, 363 and 358 becomes exhausted, the actuation of any of the selection switches corresponding to those selection relays will momentarily illuminate the lamp 248 and will cause the coil 443 to illuminate the lamp 445 and to hold that lamp illuminated until the supply of the exhausted product is replenished and the push button 448A is pressed.

When any of the selection switches corresponding to the selection relays 354, 355, 356, 357, 359, 361, 363 and 358 is actuated at a time when the empty switch corresponding to that selection switch is in its left-hand position, a circuit will be completed to the corresponding setting coil of the selection relay. The energization of that setting coil will close the three normally-open contacts associated with that coil and will also shift the armature of the re-setting coil of that relay to the right. The closing of the two left-handmost normally-open contacts adjacent the setting coil will pre-set a circuit to the hundreds price setter and a circuit to the tens price setter. The closing of the right-handmost normally-open contacts adjacent the setting coil will pre-set the circuit of the re-setting coil of that selection relay. The shifting of the armature of the re-setting coil will shift the three movable contacts adjacent that coil to the right. The shifting of the left-handmost movable contact adjacent that re-setting coil will de-energize the coil 60 in FIG. 5 and will energize the coil 309 in FIG. 8. The closing of the normally-open contacts adjacent that re-setting coil will condition the vending circuit corresponding to that selection relay, and the shifting of the right-handmost movable contact adjacent that re-setting coil and will pre-set a circuit to the units price setter.

The right-handmost contacts adjacent the re-setting coils of the selection relays, other than selection relay 354, normally have the movable and left-hand contacts thereof connected in series to connect each of those movable contacts to conductor 30 and to thereby enable the shifting of any of those movable contacts to pre-set a circuit to the units price setter. The shifting of any one movable contact of the right-handmost contacts adjacent the re-setting coils of the selection relays, other than selection relay 354, will interrupt that series relation and thereby keep the movable contact of the right-handmost contacts of re-setting coils, which are normally connected to conductor 30 by that one movable contact, from pre-setting circuits to the units price setter as long as that one movable contact remains in shifted position. For example, if the selection relay 358 were to be actuated, the movable contact 389 would shift to the right and isolate from conductor 30 the movable contacts of the right-handmost contacts adjacent the re-setting coils of all of the selection relays 354, 355, 356, 357, 359, 361 and 363.

When the coil 60 is de-energized by the shifting of the left-handmost movable contact adjacent the re-setting coil of the actuated selection relay, the movable contact 60A will shift out of engagement with the left-hand contact 60A and thereby de-energize coil 471 and also de-energize the setting coil of the actuated selection relay. However, the de-energization of that setting coil will not affect the position of any of the contacts of that selection relay—those contacts remaining in their shifted positions until the re-setting coil of that selection relay is energized. The opening of the contacts 60C will de-energize the coil 386 and will also de-energize the coin return electromagnets 234 and 235. The shifting of the movable contact 60B to the right will complete a circuit through the coil 223 via conductor 30, junction 225 in FIG. 3, coil 223, conductor 221 which extends through FIG. 4 to the movable contact 60B in FIG. 5, the right-hand contact 60B, conductor 352 which extends to junction 353 in FIG. 4, and then extends through FIG. 3 to junction 244 in FIG. 2, contacts 145C, junction 246, conductor 247, contacts 215C, the right-hand and movable contacts 1470, the right-hand and movable contacts 470, the upper and movable contacts of the switches 42, 40, 38, 36, 34 and 214, and junction 200 to conductor 30. The closing of the contacts 223A connects the cathode of diode 277 in FIG. 10 to the contact 154 via conductors 798 and 800. The closing of the contacts 223B connects the cathode of diode 254 in FIG. 11 to the contact 114 via conductors 802 and 804. The opening of the contacts 223D and 223C disables the credit registering tens transfer circuits.

The energization of the coil 309, as the left-handmost movable contact adjacent the re-setting coil of a selection relay shifts to the right, will be effected by the completion of a circuit that extends from conductor 32 via junction 322 in FIG. 8, coil 309, conductor 316 which extends through FIG. 7 to a junction 318 in FIG. 6 and then extends through FIG. 5 into FIG. 4, junctions 320, 328 and 307, conductor 305, the right-hand and movable contacts 359, and junction 168 to conductor 30. The resulting closing of contacts 309D will connect the cathode of diode 295 to the contact 191 via conductors 300 and 302. The energization of the coil 309 also will shift the movable contacts 309A, 309B and 309C to the left and thereby connect the wipers of the stepping switches 48, 133 and 137 to the coils 424, 418 and 410 of the credit sensing relays. The connecting of those wipers to those coils will enable the various credit sensing relays to interact to determine whether the registered credits fall short of, equal or exceed the selling price of the product corresponding to the actuated selection relay.

The selection relays 354, 355 and 358 are, respectively, connected to the vertical bars of the price setters adjacent the stepping switches 48, 133 and 137 by conductors 806, 808 and 810, by conductors 812, 814 and 816, and by conductors 818, 820 and 822. Corresponding groups of conductors extend from the selection relays 356, 357, 359, 361 and 363 to other vertical bars of those price setters. In addition, it will be noted that a fourth conductor extends from each of the selection relays 354, 355, 356, 357, 359, 361 and 362; and those fourth conductors extend to the motor or solenoids or other sources of motive power that serve to dispense the various desired products. These various conductors are the broken conductors in FIG. 4 which extend upwardly from the various selection relays.

*Credit Sensing Circuits*

The credit sensing circuits of the money-actuated device of the present invention utilize the stepping switches 48, 133 and 137, utilize diodes connected between the contacts of those stepping switches, utilize price setters connected to the contacts of those stepping switches, utilize credit sensing relays, and utilize diodes which are adjacent those credit sensing relays. The credit sensing circuits will determine whether the registered credits fall short of, equal or exceed the selling price of the product that is selected by the actuation of any given selection relay. In fact, the credit sensing circuits will determine whether each digit of the registered credits falls short of, equals or exceeds the corresponding digit of the selling price of the product that is selected by the actuation of any given selection relay. The various credit sensing circuits will be enabled to determine whether the registered credits fall short of, equal or exceed the selling price of the product that is selected by the actuation of any given selection relay when that selection relay is actuated and closes the two left-handmost contacts adjacent the setting coil thereof and also closes the right-handmost contacts adjacent the re-setting coil thereof.

The said contacts of the given selection relay will coact with the price setters to enable actuation of that given selection relay to connect the conductor 30 to predetermined contacts on the stepping switches. The positions of the wipers of those stepping switches relative to those predetermined contacts will enable the diodes connected between the contacts of the stepping switches to determine whether A.C. voltage, D.C. voltage of one polarity, or D.C. voltage of the opposite polarity will be applied to the diodes adjacent the credit sensing relays. A.C. voltage will be applied to the diodes adjacent the credit sensing relays whenever the registered credits equal the selling price of the product corresponding to the given selection relay, D.C. voltage of one polarity will be applied to the diodes adjacent the credit sensing relays whenever the registered credits exceed the selling price of the product corresponding to the given selection relay, and D.C. voltage of the opposite polarity will be applied to the diodes adjacent some of the credit sensing relays whenever the registered credits fall short of the selling price of the product corresponding to the given selection relay. One combination of the credit sensing relays will respond to the applying of A.C. voltage to the diodes adjacent thereto to initiate a vending cycle, another combination of credit sensing relays will respond to the applying of D.C. voltage of the one polarity to the diodes adjacent thereto to initiate a vending cycle if there is a sufficient supply of money available to dispense the correct change, and a third combination of credit sensing relays will respond to the applying of D.C. voltage of the opposite polarity to the diodes adjacent thereto to prevent the initiation of a vending cycle.

The coils of all of the nine credit sensing relays will be de-energized whenever the money-actuated device of the present invention is in its stand-by condition. However, as soon as a credit of any value has been registered, the coils 423, 416 and 409 of the middle row of credit sensing relays will become energized by a circuit which extends from conductor 30 via junction 170 in FIG. 3, junction 390, and then either through contacts 131C–131D and junction 396 or through junction 392 and contacts 165C and junctions 394 and 396 or through junction 392 and contacts 203C and junctions 394 and 396, and then through conductor 404 which extends through FIGS. 4 and 5 to junction 398 in FIG. 6, and then extends through FIG. 7 into FIG. 8, junction 365, and then either through the right-hand and movable contacts 424B and diodes 519 and 521 and coil 423 or through junction 406 and the right-hand and movable contacts 418B and junction 425 and diodes 691 and 693 and coil 416 or through junction 406 and the right-hand and movable contacts 410A and junction 699 and diodes 695 and 697 and coil 409, and then through junction 698 to conductor 32. The three coils 423, 416 and 409 will remain energized until a credit sensing cycle is initiated.

Each of the price setters of the credit sensing circuits has horizontal bars that are connected to the contacts of a stepping switch and has vertical bars that overlie, but are normally insulated from, the horizontal bars. Any given vertical bar of a price setter can be connected to any given horizontal bar of that price setter by a price-setting pin. For example the price setter adjacent the stepping switch 48 has horizontal bars 304 connected to the contacts of that switch; and vertical bars 306 overlie the bars 304 but are insulated from those bars. Price-setting pin 792 connects the uppermost bar 304 to the left-handmost bar 306 to establish nine as the last digit of the selling price of the product selected by selection switch 399 and selection relay 354. Price-setting pin 794 connects the second lowermost bar 304 to the second left-handmost bar 306 to establish one as the last digit of the selling price of the product selected by selection switch 401 and selection relay 355. Price-setting pin 796 connects the third uppermost bar 304 to the right-handmost bar 306 to establish seven as the last digit of the selling price of the product selected by selection switch 405 and selection relay 358.

The price setter adjacent the stepping switch 133 has horizontal bars 308 connected to the contacts of that switch; and vertical bars 310 overlie the bars 308 but are insulated from those bars. Price-setting pin 786 connects the uppermost bar 308 to the left-handmost bar 310 to establish nine as the middle digit of the selling price of the product selected by selection switch 399 and selection relay 354. Price-setting pin 788 connects the fourth uppermost bar 308 to the second left-handmost bar 310 to establish six as the middle digit of the selling price of the product selected by selection switch 401 and selection relay 355. Price-setting pin 790 connects the uppermost bar 308 to the right-handmost bar 310 to establish nine as the middle digit of the selling price of the product selected by selection switch 405 and selection relay 358.

The price setter adjacent the stepping switch 137 has horizontal bars 312 connected to the contacts of that switch; and vertical bars 314 overlie the bars 312 but are insulated from those bars. Price-setting pin 780 connects the second uppermost bar 312 to the left-handmost bar 314 to establish eight as the first digit of the selling price of the product selected by selection switch 399 and selection relay 354. Price-setting pin 782 connects the fifth lowermost bar 312 to the second left-handmost bar 314 to establish four as the first digit of the selling price of the product selected by selection switch 401 and selection relay 355. Price-setting pin 784 connects the lowermost bar 312 to the right-handmost bar 314 to establish zero as the first digit of the selling price of the product selected by selection switch 405 and selection relay 358.

The positions of the wipers 126, 143 and 202 will indicate the values of the three digits of the registered credits; and if each of those wipers is in engagement with a contact, of a stepping switch, to which a price-setting pin is directly connected, the actuation of the selection relay corresponding to those price-setting pins will apply A.C. voltage to the diodes 516, 535 and 543. Those diodes will pass the positive-going half cycles of that A.C. voltage to the coils 424, 418 and 410 of the lowermost row of credit sensing relays in FIG. 8 and thereby cause those coils to become energized. Thereupon the movable contact 424B will shift to the left and the contacts 424D will close, the movable contact 418B will shift to the left and the contacts 418C will close, and the movable contact 410A will shift to the left and the contacts 410B will close to permit the wipers 126, 143 and 202 to apply A.C. voltage to the cathodes of the diodes 519, 691 and 695. Those diodes will coact with the diodes 521, 693 and 697 and the left-hand and movable contacts 424B, 418B and 410A to pass the negative-going cycles of that A.C. voltage to the coils 423, 416 and 409 of the middle row of credit sensing relays; and the diodes 519, 691 and 695 will coact with the left-hand and movable contacts 424B, 418B and 410A and with the contacts 424D, 418C and 410B to pass the negative-going cycles of that A.C. voltage to the coils 421, 411 and 408 of the uppermost row of credit sensing relays. As a result, if the three digits of the registered credits equal the three digits of the selling price of the desired product, all of the credit sensing relays in the uppermost row in FIG. 8 will be energized; and thereupon a vending cycle will be initiated.

If each of the wipers 126, 143 and 202 is in engagement with a contact, of a stepping switch, below the level of a contact to which a price-setting pin is directly connected, the actuation of the selection relay corresponding to those price-setting pins will be unable to apply A.C. voltage to the diodes 516, 535 and 543, because the diode or diodes connected intermediate the said contacts will rectify the A.C. voltage from the price-setting pins. The rectified voltage will be applied to the diodes 516, 535 and 543, but that voltage will be of the opposite polarity and will thus be unable to cause current to flow through the diodes 516, 535 and 543. As a result, the coils 424, 418 and 410 of the lowermost row of credit sensing relays will not be energized; and because those coils will not become energized, the diodes 519, 691 and 695 will not be connected to the wipers 126, 143 and 202, and the coils 421, 411 and 408 of the uppermost row of credit sensing relays will not be energized. Since at least one of those coils must be energized before a vending cycle can be initiated, it should be apparent that if each of the wipers 126, 143 and 202 is in engagement with a contact, of a stepping switch, below the level of a contact to which a price-setting pin is directly connected, the actuation of the selection relay corresponding to those price-setting pins will be unable to initiate a vending cycle.

If each of the wipers 126, 143 and 202 is in engagement with a contact, of a stepping switch, above the level of a contact to which a price-setting pin is directly connected, the actuation of the selection relay corresponding to those price-setting pins will cause the diode or diodes connected intermediate the said contacts to rectify the A.C. voltage, from the price-setting pins, to D.C. voltage of the said one polarity. That D.C. voltage will readily cause current to pass through the diodes 516, 535 and 543 and permit the coils 424, 418 and 410 of the lowermost row of credit sensing relays to become energized. Thereupon the left-hand and movable contacts 424B, 418B and 410A will permit the wipers 126, 143 and 202 to apply the said D.C. voltage of the said one polarity to the cathodes of the diodes 519, 691 and 695. That voltage will be unable to cause current to flow through those diodes and hence the coils 423, 416 and 409 of the middle row of credit sensing relays will become de-energized. As those coils become de-energized, the contacts 423A and 409A wil close and the movable contact 416B will shift to the right; and thereupon the left-hand and movable contacts 424B, the left-hand and movable contacts 418B and the left-hand and movable contacts 410A in the lowermost row of credit sensing relays, the contacts 423A, the right-hand and movable contacts 416B and the contacts 409A in the middle row of credit sensing relays, and the contacts 424D, 418C and 410B in the lowermost row of credit sensing relays will coact to connect the wipers 126, 143 and 202 to the coils 421, 411 and 408 in the uppermost row of credit sensing relays. Thereupon, those coils will become energized by the said D.C. voltage of the said one polarity; and hence a vending cycle will be initiated.

The utilization of these credit sensing circuits enables the money-actuated device to determine, with complete accuracy, whether the registered credits fall short of, equal or exceed the selling price of the desired product.

*Exact Credit Circuits*

If it is assumed that a patron has inserted ninety-seven cents, and if it is further assumed that the said patron has actuated the selection switch 405, the registered credits will equal the selling price of the desired product. Those registered credits will be indicated by the engagement of the wiper 202 with the zero contact 180 of stepping switch 137, by the engagement of the wiper 143 with the ninth contact 162 of stepping switch 133, and by the engagement of the wiper 126 with the seventh contact 118 of stepping switch 48.

Actuation of the selection relay 358, by the actuation of the selection switch 405, will complete an exact credit sensing circuit. That circuit extends from conductor 30 via junction 200 in FIG. 2, the movable and upper contacts of the switches 214, 34, 36, 38, 40 and 42, the movable and right-hand contacts 470, the movable and right-hand contacts 1470, contacts 215C, conductor 247, junction 246, contacts 145C, junction 244, conductor 352 which extends through FIG. 3 into FIG. 4 and junction 353; and one branch of that circuit extends through the movable and right-hand contacts 389, junction 821, conductor 822 which resumes in FIG. 11, the right-handmost vertical bar 306, price-setting pin 796, the third uppermost horizontal bar 304, contact 118, wiper 126, conductor 324 which extends through FIGS. 10 and 9 into FIG. 8, the movable and left-hand contacts 309A, junction 518, diode 516, coil 424, and junction 457 to conductor 32. A second branch of that circuit extends through the movable and right-hand contacts 389, junction 821, the movable and left-hand contacts 381, conductor 820 which resumes in FIG. 10, the right-handmost vertical bar 310, price-setting pin 790, the uppermost horizontal bar 308, the contact 162, wiper 143, conductor 326 which extends through FIG. 9 into FIG. 8, the movable and left-hand contacts 309B, junction 534, diode 535, coil 418, and junction 457 to conductor 32. The third branch of that circuit extends through the movable and right-hand contacts 389, junction 821, the movable and left-hand contacts 381, the movable and left-hand contacts 379, conductor 818 that resumes in FIG. 9, the right-handmost vertical bar 314, price-setting pin 784, the lowermost horizontal bar 312, contact 180, wiper 202, conductor 1449 which extends into FIG. 8, the movable and left-hand contact 309C, junctions 332 and 549, diode 543, coil 410, and junction 457 to conductor 32. The completion of this exact credit sensing circuit will energize the coils 424, 418 and 410; and then the coil 424 will effect the energization of the coils 423 and 421, the coil 418 will effect the energization of the coils 416 and 411, and the coil 410 will effect the energization of the coils 409 and 408.

Specifically, the coil 424 will effect the energization of the coils 423 and 421 by completing a circuit which extends from conductor 30 via junction 200 in FIG. 2, the movable and upper contacts of the switches 214, 34, 36, 38, 40 and 42, the movable and right-hand contacts 470, the movable and right-hand contacts 1470, contacts 215C, conductor 247, junction 246, contacts 145C, junction 244, conductor 352 which extends through FIG. 3 into FIG. 4, junction 353, the movable and right-hand contacts 389, junction 821, conductor 822 which resumes in FIG. 11, the right-handmost vertical bar 306, price-setting pin 796, the third uppermost horizontal bar 304, contact 118, wiper 126, conductor 324 which extends through FIGS. 10 and 9 into FIG. 8, the movable and left-hand contacts 309A, junction 518, the left-hand and movable contacts 424B and diode 519, and then either through diode 521 and coil 423 and junction 698 and conductor 32 to junction 696 or through contacts 424D and coil 421 to the junction 696.

The coil 418 will effect the energization of the coils 416 and 411 by completing a circuit which extends from conductor 30 via junction 200 in FIG. 2, the movable and upper contacts of the switches 214, 34, 36, 38, 40 and 42, the movable and right-hand contacts 470, the movable and right-hand contacts 1470, contacts 215C, conductor 247, junction 246, contacts 145C, junction 244, conductor 352 which extends through FIG. 3 into FIG. 4, junction 353, the movable and right-hand contacts 389, junction 821, the movable and left-hand contacts 381, conductor 820 which resumes in FIG. 10, the right-handmost vertical bar 310, price-setting pin 790, the uppermost horizontal bar 308, the contact 162, wiper 143, conductor 326 which extends through FIG. 9 into FIG. 8, the movable and left-hand contacts 309B, junction 534, the left-hand and movable contacts 418B, junction 425 and diode 691, and then either through the diode 693 and coil 416 and junction 698 and conductor 32 to junction 696 or through the left-hand and movable contacts 418C and coil 411 to the junction 696.

The coil 410 will effect the energization of the coils 409 and 408 by completing a circuit which extends from conductor 30 via junction 200 in FIG. 2, the movable and upper contacts of the switches 214, 34, 36, 38, 40 and 42, the movable and right-hand contacts 470, the movable and right-hand contacts 1470, contacts 215C, conductor 247, junction 246, contacts 145C, junction 244, conductor 352 which extends through FIG. 3 into FIG. 4, junction 353, the movable and right-hand contacts 389, junction 821, the movable and left-hand contacts 381, the movable and left-hand contacts 379, conductor 818 that resumes in FIG. 9, the right-handmost vertical bar 314, price-setting pin 784, the lowermost horizontal bar 312, contact 180, wiper 202, conductor 1449 which extends into FIG. 8, the movable and left-hand contacts 309C, junctions 332 and 549, the left-hand and movable contacts 410A, junction 699 and diode 695 and then either through diode 697 and coil 409 and junction 698 and conductor 32 to junction 696 or through the left-hand and movable contacts 410B and coil 408 to the junction 696.

It should be noted that as the coils 424, 418 and 410 of the lowermost row of credit sensing coils became energized, the movable contacts 424B, 418B and 410A shifted to the left and thereby interrupted the circuit that initially energized the coils 423, 416 and 409 of the middle row of credit sensing coils but immediately re-energized those coils. The initial energization of the coils 423, 416 and 409 of the middle row of credit sensing coils and the subsequent prompt re-energization of those coils is important in making the final energization of the coils 421, 411 and 408 of the uppermost row of credit sensing coils occur after the coils 424, 418 and 410 of the lowermost row of credit sensing coils have become energized and the coils 423, 416 and 409 of the middle row of credit sensing coils have had an opportunity to remain energized, as when the registered credits equal the selling price of the desired product, or to become de-energized, as when the registered credits exceed the selling price of the desired object. It is in this way that the coils of the lowermost row of credit sensing relays energize the coils of the middle and uppermost rows of credit sensing relays when the registered credits equal the selling price of the desired product.

*Excess Credit Circuits*

If it is assumed that a patron has inserted nine dollars and has made a selection or selections which reduced the residual credit to five dollars and seventy-six cents, and if it is further assumed that the patron has actuated the selection switch 401, each digit of the registered credits will exceed the corresponding digit of the selling price of the desired product. Those registered credits will be indicated by the engagement of the wiper 202 with the fifth contact 191 of stepping switch 137, by the engagement of the wiper 143 with the seventh contact 158 of stepping switch 133, and by the engagement of the wiper 126 with the sixth contact 116 of the stepping switch 48.

Actuation of the selection relay 355, by the actuation of the selection switch 401, will complete an excess credit sensing circuit. That circuit extends from conductor 30 via junction 200 in FIG. 2, the movable and upper contacts of the switches 214, 34, 36, 38, 40 and 42, the movable and right-hand contacts 470, the movable and right-hand contacts 1470, contacts 215C, conductor 247, junction 246, contacts 145C, junction 244, conductor 352 which extends through FIG. 3 into FIG. 4, junction 353, the movable and left-hand contacts 389, the right-handmost movable and left-hand contacts adjacent the resetting coils of the selection relays 363, 361, 359, 357 and 356, the movable and right-hand contacts 377 to junction 815; and one branch of that circuit extends to conductor 816 which resumes in FIG. 11, the second left-handmost vertical bar 306, price-setting pin 794, the second lowermost horizontal bar 304, contact 106, diode 265, contact 108, diode 263, contact 110, diode 261, contact 112, diode 259, conductor 804, which resumes in FIG. 3, the left-hand and movable contacts 223B, conductor 802 which resumes in FIG. 11, contact 114, diode 257, contact 116, wiper 126, conductor 324 which extends through FIGS. 10 and 9 into FIG. 8, the movable and left-hand contacts 309A, junction 518, diode 516, coil 424, and junction 457 to conductor 32. A second branch of that circuit extends from junction 815 through the movable and left-hand contacts 369, conductor 814 which resumes in FIG. 10, the second left-handmost vertical bar 310, price setting pin 788, the fourth uppermost horizontal bar 308, contact 156, diode 273, contact 158, wiper 143, conductor 326 which extends through FIG. 9 into FIG. 8, the movable and left-hand contacts 309B, junction 534, diode 535, coil 418, and junction 457 to conductor 32. The third branch of that circuit extends from junction 815 through the movable and left-hand contacts 369, the movable and left-hand contacts 367, conductor 812 which resumes in FIG. 9, the second left-handmost vertical bar 314, price-setting pin 782, the fifth lowermost horizontal bar 312, contact 189, diode 295, conductor 300 which extends into FIG. 8, the left-hand and movable contacts 309D, conductor 302 which extends into FIG. 9, contact 191, wiper 202, conductor 1449 which extends into FIG. 8, the movable and left-hand contacts 309C, junctions 332 and 549, diode 543, coil 410, and junction 457 to conductor 32. The completion of this excess credit sensing circuit will energize the coils 424, 418 and 410; and then the coil 424 will effect the de-energization of coil 423 and will coact with that de-energized coil to effect the energization of the coil 421. Similarly, the coil 418 will effect the de-energization of coil 416 and will coact with that de-energized coil to effect the energization of the coil 411; and the coil 410 will effect the de-energization of the coil 409 and will coact with that de-energized coil 408 to effect the energization of the coil 408.

Specifically, the coil 424 will interrupt the initial energizing circuit of the coil 423 by shifting the movable contact 424D out of engagement with the right-hand contact 424B, and will connect the price-setting pin 794 to the diode 519 via diodes 265, 263, 261, 259 and 257, wiper 126, conductor 324, the movable and left-hand contacts 309A, junction 518 and the left-hand and movable contacts 424B. Current will not, at this time, be able to flow through the diode 519 and re-energize the coil 423 because the positioning of the wiper 126 above the level of the price-setting pin 794, effectively makes the polarity of the diode 519 opposite to the polarities of the diodes 265, 263, 261, 259 and 257. The coil 424 will energize the coil 421 by closing the contacts 424D and thereby completing a circuit which extends from conductor 30 via junction 200 in FIG. 2, the movable and upper contacts of the switches 214, 34, 36, 38, 40 and 42, the movable and right-hand contacts 470, the movable and right-hand contacts 1470, contacts 215C, conductor 247, junction 246, contacts 145C, junction 244, conductor 352 which extends through FIG. 3 into FIG. 4, junction 353, the movable and left-hand contacts 389, the right-handmost movable and left-hand contacts adjacent the re-setting coils of the selection relays 363, 361, 359, 357 and 356, the movable and right-hand contacts 377 to junction 815, conductor 816 which resumes in FIG. 11, the second left-handmost vertical bar 306, price-setting pin 794, the second lowermost horizontal bar 304, contact 106, diode 265, contact 108, diode 263, contact 110, diode 261, contact 112, diode 259, conductor 804 which resumes in FIG. 3, the left-hand and movable contacts 223B, conductor 802 which resumes in FIG. 11, contact 114, diode 257, contact 116, wiper 126, conductor 324 which extends through FIGS. 10 and 9 into FIG. 8, the movable and left-hand contacts 309A, junction 518, the left-hand and movable contacts 424B, contacts 423A, contacts 424D, coil 421, and junction 696 to conductor 32. Similarly, the coil 418 will interrupt the initial energizing circuit of the coil 416 by shifting the movable contact 418 out of engagement with the right-hand contact 418B, and will connect the price-setting pin 788 to the diode 691 via diode 273, wiper 143, conductor 326, the movable and left-hand contacts 309B, the left-hand and movable contacts 418B, and junction 425. Current will not, at this time, be able to flow through the diode 691 and re-energize the coil 416 because the positioning of the wiper 143 above the level of the price-setting pin 788 effectively makes the polarity of the diode 691 opposite to the polarity of the diode 273. The coil 418 will energize the coil 411 by closing the contacts 418C, and thereby completing a circuit which extends from conductor 30 via junction 200 in FIG. 2, the movable and upper contacts of the switches 214, 34, 36, 38, 40 and 42, the movable and right-hand contacts 470, the movable and right-hand contacts 1470, contacts 215C, conductor 247, junction 246, contacts 145C, junction 244, conductor 352 which extends through FIG. 3 into FIG. 4, junction 353, the movable and left-hand contacts 389, the right-handmost movable and left-hand contacts adjacent the re-setting coils of the selection relays 363, 361, 359, 357 and 356, the movable and right-hand contacts 377 to junction 815; the movable and left-hand contacts 369, conductor 814 which resumes in FIG. 10, the second left-handmost vertical bar 310, price-setting pin 788, the fourth uppermost horizontal bar 308, contact 156, diode 273, contact 158, wiper 143, conductor 326 which extends through FIG. 9 into FIG. 8, the movable and left-hand contacts 309B, the left-hand and movable contacts 418B, junction 425, the movable and right-hand contacts 416B, contacts 418C, coil 411, and junction 696 to conductor 32. The coil 410 will interrupt the initial energizing circuit of the coil 409 by shifting contact 410A out of engagement with the right-hand contact 410A, and will connect the price-setting pin 782 to the diode 695 via diode 295, wiper 202, conductor 1449, the movable and left-hand contacts 309C, junction 332 and 549, the left-hand and movable contacts 410A and junction 699. Current will not, at this time, be able to flow through the diode 695 and re-energize the coil 409 because the positioning of the wiper 202 above the level of the price-setting pin 782 effectively makes the polarity of the diode 695 opposite to the polarity of the diode 295. The coil 410 will energize the coil 408 by closing the contacts 410B and thereby completing a circuit which extends from conductor 30 via junction 200 in FIG. 2, the movable and upper contacts of the switches 214, 34, 36, 38, 40 and 42, the movable and right-hand contacts 470, the movable and right-hand contacts 1470, contacts 215C, conductor 247, junction 246, contacts 145C, junction 244, conductor 352 which extends through FIG. 3 into FIG. 4, junction 353, the movable and left-hand contacts 389, the right-hand-most movable and left-hand contacts adjacent the re-setting coils of the selection relays 363, 361, 359, 357 and 356, the movable and right-hand contacts 377 to junction 815, the movable and left-hand contacts 369, the movable and left-hand contacts 367, conductor 812 which resumes in FIG. 9, the second left-handmost vertical bar 314, price-setting pin 782, the fifth lowermost horizontal bar 312, contact 189, diode 295, conductor 300 which extends into FIG. 8, the left-hand and movable contacts 309D, conductor 302 which extends into FIG. 9, contact 191, wiper 202, conductor 1449 which extends into FIG. 8, the movable and left-hand contacts 309C, junctions 332 and 549, the left-hand and movable contacts 410A, junction 699, contacts 409A, contacts 410B, coil 408, and junction 696 to conductor 32. It is in this way that the coils of the lowermost row of credit sensing relays will effect the de-energization of the coils 423, 416 and 409 of the middle row of credit sensing relays, and will coact with those de-energized coils to effect the energization of the coils 421, 411 and 408 in the uppermost row of credit sensing coils.

*Credit Deducting and Product Vending Circuits*

The credit deducting and product vending circuits of the money-actuated device of the present invention include the credit sensing relays, include the stepping switches 48, 133 and 137, include the relays of which the coils 565, 466 and 412 are parts, include the memory relay 501, include the deductor motor 422, and also include the deductor switches 670, 672 and 674. The circuits must deduct the selling price of the desired product from the registered credits and must also initiate the vending of that product.

The wipers 126, 143 and 202 of the stepping switches 48, 133 and 137 move uni-directionally, and hence the required deductions of credits can not be effected by rotating those wipers in the reverse direction. Instead, those deductions of credit must be effected by advancing the wipers 126, 133 and 137 still further in the normal direction.

The stepping switch 48 has ten fixed contacts; and if one of those fixed contacts is disposed rearwardly of the wiper 126 a distance equal to two, three or four advancements of that wiper, that one contact will simultaneously be disposed forwardly of that wiper a distance equal to eight, seven or six advancements, respectively, of that wiper. As a result, if the wiper 126 is to be moved into engagement with a contact which is disposed rearwardly of the initial position of that wiper a distance equal to two, three or four advancements of that wiper, that wiper can be moved into engagement with that contact by moving that wiper in the normal, forward direction a distance equal to eight, seven or six advancements, respectively, of that wiper. Those eight, seven and six forward advancements are the differences, respectively, between the numeral ten and the numerals two, three and four which represent the spaces between the initial position and the desired position of that wiper, and hence those eight, seven and six advancements are the tens-complements of the spaces between the initial and the desired positions of that wiper.

The stepping switch 133 also has ten fixed contacts; and, therefore, if that switch could be considered without regard to the switches 48 and 137, the wiper of that switch could be moved into engagement with a rearwardly-disposed fixed contact by advancing that wiper a distance equal to the tens-complement of that fixed contact. Similarly, the stepping switch 137 has ten fixed contacts; and if that switch could be considered without regard to the switches 48 and 133, the wiper of that switch could be moved into engagement with a rearwardly-disposed fixed contact by advancing that wiper a distance equal to the tens-complement of that fixed contact. However, the switch 137 can not be considered without regard to the switches 48 and 133, and the switch 133 can not be considered without regard to the switch 48 because of possible "borrowings" from the credit digits corresponding to the wipers 202 and 143. As a result, a compensation must be provided for possible "borrowings" from the credit digits corresponding to the wipers 202 and 143.

The present invention compensates for possible "borrowings" from the credit digits corresponding to the wipers 202 and 143 by advancing the wipers 202 and 143 the nines-complements rather than the tens-complements of the first and middle digits of the sales price and by providing additional and compensating advancements of those wipers where those "borrowings" do not occur. For example, whenever the last digit of the credit equals or is larger than the last digit of the sales price, there will be no "borrowing" from the credit digit corresponding to the wiper 143; and hence an additional advancement will be provided for that wiper to convert the nines-complement to the tens-complement. However, whenever the last digit of the credit is smaller than the last digit of the sales price, there will be a "borrowing" from the credit digit corresponding to the wiper 143; and an additional advancement will not be needed, because the nines-complement will directly compensate for the said "borrowing."

Similarly, whenever the middle digit of the credit is larger than the middle digit of the sales price, or whenever the middle digit of the credit equals the middle digit of the sales price and the last digit of the credit equals or is larger than the last digit of the sales price, there will be no "borrowing" from the credit digit corresponding to the wiper 202; and hence an additional advancement will be provided for the wiper 202 to convert the nines-complement to the tens-complement. However, if the middle digit of the credit is smaller than the middle digit of the sales price, there will be a "borrowing" from the credit digit corresponding to the wiper 202. Also, if the middle digit of the credit is equal to the middle digit of the sales price but the last digit of the credit is less than the last digit of the sales price, there will be a "borrowing" from the credit digit corresponding to the wiper 202. In either of these last events, additional advancements of the wiper 202 will not be needed, because the nines-complements will directly compensate for the said "borrowing."

In the following equations, the above relations are set forth in abbreviated form; and in those equations A, B and C, are, respectively, the first, middle and last digits of the credit. D, E and F are, respectively, the first, middle and last digits of the sales price; and X, Y and B are the advancements which must be provided, respectively, for the wipers 202, 143 and 126:

$X = 9 - D + (1 \text{ if } B > E \text{ or if } B = E \text{ and } C \geqq F)$
$Y = 9 - E + (1 \text{ if } C \geqq F)$
$Z = 10 - F$ If it is asumed that the patron has been credited with five dollars, and if it is further assumed that the sales price is one dollar and thirty five cents, the value of A will be five, the values of B and C will be zero, the value of D will be one, the value of E will be three, and the value of F will be five. The value of X will then be determined as follows:

$X = 9 - 1 = 8$ because B is not greater than E, and because B does not equal E. The value of Y will then be determined as follows:

$Y = 9 - 3 = 6$ because C is neither equal to nor greater than F. The value of Z will then be determined as follows:

$$Z = 10 - 5 = 5$$

This means that eight advancements must be provided for the wiper 202, six advancements for the wiper 143, and five advancements for the wiper 126. When those wipers receive those numbers of advancements, the wiper 202 will engage the contact 186, the wiper 143 will engage the contact 156, and the wiper 126 will engage the contact 114; and those wipers will thus establish a residual credit of three dollars and sixty five cents.

If it is asumed that the patron has been credited with five dollars and sixty cents, and if it is further assumed that the sales price is one dolar and thirty five cents, the value of X will be determined as follows:

$$X = 9 + 1 - 1 = 9$$

because B is greater than E. Y will be determined as follows:

$$Y = 9 - 3 = 6$$

because C is neither equal to nor greater than F. Z will be determined as follows:

$$Z = 10 - 5 = 5$$

This means that nine advancements will be provided for the wiper 202, six advancements will be provided for the wiper 143, and five advancements will be provided for the wiper 126. When those wipers receive those numbers of advancements, the wiper 202 will engage contact 189, the wiper 143 will engage contact 148, and the wiper 126 will engage the contact 114; and those wipers will thus establish a residual credit of four dollars and twenty five cents.

If it is assumed that the patron has been credited with five dollars and thirty eight cents, and it is further assumed that the sales price is one dollar and thirty five cents, the value of X will be determined as follows:

$$X = 9 - 1 + 1 = 9$$

because B is equal to E and C is greater than F. Y will be determined as follows:

$$Y = 9 - 3 + 1 = 7$$

because C is greater than E. Z will be determined as follows:

$$Z = 10 - 5 = 5$$

This means that nine advancements will be provided for the wiper 202, seven advancements will be provided for the wiper 143, and five advancements will be provided for the wiper 126. When those wipers receive those numbers of advancements, the wiper 202 will engage contact 189, the wiper 143 will engage contact 144, and the wiper 126 will engage the contact 110; and those wipers will thus establish a residual credit of four dollars and three cents.

Other examples could be given, but these three examples are sufficient to show that whenever a "borrowing" from the middle digit of the credit occurs, an advancement equal to the nines-complement rather than the tens-complement of the middle digit of the sales price is proivded for the wiper 143. However, if there is no "borrowing" from the middle digit of the credit, an advancement equal to the tens-complement of the middle digit of the sales price will be provided for the wiper 143. Further, if a "borrowing" from the first digit of the credit occurs, an advancement equal to the nines-complement rather than the tens-complement of the sales price is provided for the wiper 202; but if there is no "borrowing" from the first digit of the credit, an advancement equal to the tens-complement of the sales price will be provided for the wiper 202.

The money-actuated device of the present invention uses the credit sensing relays to determine when the advancements provided for the wipers 202 and 143, respectively, should equal the tens-complements or the nines-complements of the first and middle digits of the sales price. Specifically, if the relay coil 416 shifts the movable contacts 416C into engagement with the right-hand contact 416C and thereby shows that B is greater than E, a circuit will be pre-set via conductor 30, junctions 170, 390 and 392 in FIG. 3, contacts 165C, junctions 394 and 396, conductor 404 which extends through FIGS. 4 and 5 to junction 398 in FIG. 6 and then through FIG. 7 into FIG. 8, junctions 365, 400, 406 and 431, the right-hand and movable contacts 416C, conductor 533 which extends into FIG. 9, and contact 673 of deductor switch 674. When the deductor motor 422 subsequently rotates the wiper of the deductor switch 674 into and out of engagement with the contact 673, that wiper will close and re-open a circuit that extends from conductor 30 via junctions 170, 390 and 392 in FIG. 3, contacts 165C, junctions 394 and 396, conductor 404 which extends through FIGS. 4 and 5 to junction 398 in FIG. 6 and then through FIG. 7 into FIG. 8, junctions 365, 400, 406 and 431, the right-hand and movable contacts 416C, conductor 533 which extends into FIG. 9, contact 673, the wiper of the deductor switch 674, contact 671, conductor 680 which resumes in FIG. 3, diode 686, junctions 252 and 250, coil 264, and junction 35 to conductor 32. The resulting energization and de-energization of the coil 264, and hence of the stepping coil 164, will provide the additional advancement for the wiper 202 which is needed to make the total advance of that wiper equal to the tens-complement rather than the nines-complement of the first digit of the sales price.

If the coils 416, 418 and 424 shift the movable contact 416C into engagement with the left-hand contact 416C and close the contacts 418D and 424C, and thereby show that B equals E and that C equals or is larger than F, the circuit to the coil 264 will be pre-set via conductor 30, junctions 170 and 390, either through contacts 131C–131D to junction 396 or through junction 392 and contacts 165C and junction 394 to junction 396, and then through conductor 404 which extends through FIGS. 4 and 5 to junction 398 in FIG. 6 and then through FIG. 7 into FIG. 8, junctions 365 and 400, contacts 424C, contacts 418D, the left-hand and movable contacts 416C, conductor 533 which extends into FIG. 9, and contact 673 of deductor switch 674. When the deductor motor 422 subsequently rotates the wiper of the deductor switch 674 into and out of engagement with the contact 673, the coil 264 will energize and de-energize the stepping coil 164 and thereby provide the additional advancement for the wiper 202 which is needed to make the total advance of that wiper equal to the tens-complement rather than the nines-complement of the first digit of the sales price.

If the relay coil 424 closes the contacts 424C, and thereby shows that C is larger than or equal to F, a circuit will be pre-set from conductor 30 via conductor 30, junctions 170 and 390, either through contacts 131C–131D to junction 396 or through junction 392 and contacts 165C and junction 394 to junction 396, and then through conductor 404 which extends through FIGS. 4 and 5 to junction 398 in FIG. 6 and then through FIG. 7 into FIG. 8, junctions 365 and 400, contacts 424C, and conductor 366 which extends through FIG. 9 into FIG. 10 to contact 709. When the deductor motor subsequently rotates the wiper of the deductor switch 672 into and out of engagement with the contact 709 that wiper will close and re-open a circuit that extends from conductor 30, junctions 170 and 390, either through contacts 131C–131D to junction 396 or through junction 392 and contacts 165C and junction 394 to junction 396, and then through conductor 404 which extends through FIGS. 4 and 5 to junction 398 in FIG. 6 and then through FIG. 7 into FIG. 8, junctions 365 and 400, contacts 424C, conductor 366 which extends through FIG. 9 into FIG. 10, contact 709, the wiper of the deductor switch 672, contact 707, conductor 678 which resumes in FIG. 3, diode 684, junctions 228, 227 and 226, coil 167, junction 35 to conductor 32. The resulting energization and deenergization of the coil 167 and hence of the stepping coil 132, will provide the additional advancement for the wiper 143 which is needed to make the total advance of that wiper equal to the tens-complement rather than the nines-complement of the middle digit of the sales price.

The money-operated device provided by the present invention is thus enabled, in a straight-forward and certain manner, to provide the required additional advancements for the wipers 202 and 143. In this way, that money-operated device fully and precisely compensates for any "borrowings" from the first and middle digits of the initial credit during the deduction of the sales price from that credit.

As indicated hereinbefore, the energization of the coils 424, 418 and 416 can close contacts 424C and 418D and can shift the movable contact 416C to the right to pre-set circuits to the coils 264 and 132; but those circuits will not be completed until such time as the wipers of the deductor switches 674 and 672, respectively, are moved into engagement with the contacts 673 and 709. The wipers of all of the deductor switches move in the clockwise direction, and hence the wipers of the deductor switches 674 and 672 will engage the contacts 673 and 709, respectively, before they can engage any other contacts. It will be noted that deductor switch 670 has contacts which are mounted in the same relative positions in which the contacts of the deductor switches 674 and 672 are positioned; and this is desirable because it means that no credit can be deducted from the units stepping switch 48 prior to the initiation of the additional advancements, if any, of the wipers 202 and 143. In brief, the additional advancements, if any, for the wipers 202 and 143 and the initial advancement, if any, of the wiper 126 will be provided during the early part of the cycle of the output shaft of the deductor motor 422. The remaining advancements, if any, for the wipers 202, 143 and 126 will be provided during the rest of the cycle of that output shaft.

The wipers of the deductor switches can not move until the deductor motor 422 is energized; and that motor can not be energized until the vend relay coil 412 is energized. To energize that coil, a selection switch must cause a selection relay to actuate an appropriate combination of the credit sensing relays and thereby complete a circuit to coil 565 of the preliminary vent relay. One such circuit will be completed in the event the registered credits equal the selling price of the desired product, and one of three further such circuits will be completed in the event the registered credits exceed the selling price of the desired product. Regardless of which of these four circuits is completed, the coil 565 will effect the de-energizing of the coil 466 and will effect the energizing of the coil 412. The resulting energizing of the coil 412 will initiate the credit deducting cycle and will also initiate the product vending cycle.

*Exact Credit Deducting and Product Vending Circuits*

Whenever the registered credit equals the selling price of a desired product, and the selection relay corresponding to that product is actuated, the coils 60 and 471 will become de-energized and the coils 223 and 309 will become energized. The de-energization of the coil 471 will enable contacts controlled thereby to pre-set a circuit to the vend relay 412. The energization of the coils 223 and 309 will interconnect the two groups of diodes on the stepping switch 48, will interconnect the two groups of diodes on the stepping switch 133, will interconnect the two groups of diodes on the stepping switch 137, and will interrupt the credit registering tens transfer circuits. As the coil 309 becomes energized, the contacts controlled thereby will connect the wipers of the stepping switches to the credit sensing relays to energize them.

If it is assumed that a credit of ninety-seven cents has been registered, the actuation of the selection relay 358 will effect a deducting of ninety-seven cents from the registered credits and will effect the dispensing of the product corresponding to that selection relay. Specifically, when the selection relay 358 is actuated, circuits will be completed that extends from conductor 32 via junctions 495, 497, 515 and 517 in FIG. 6, coil 565, conductor 504 which extends into FIG. 5, contacts 469, conductor 502 which extends through FIGS. 6 and 7 into FIG. 8, junctions 830 and 832, the left-hand and movable contacts 423B, contacts 421A, the left-hand and movable contacts 416D, contacts 411A, the junction 834, the left-hand and movable contacts 409B, contacts 408, the right-hand and movable contacts 524A, junctions 836 and 332, the left-hand and movable contacts 309C, conductor 1449 which extends into FIG. 9, wiper 202, contact 180, the lowermost horizontal bar 312, price-setting pin 784, the right-handmost vertical bar 314, conductor 818 which resumes in FIG. 4, contacts 379, contacts 381, junction 821, the right-hand and movable contacts 389, junction 353, conductor 352 which extends through FIG. 3 to junction 244 in FIG. 2, contacts 145C, junction 246, conductor 247, contacts 215C, the right-hand and movable contacts 1470, the right-hand and movable contacts 470, the upper and movable contacts of the switches 42, 40, 38, 36, 34 and 214, and junction 200 to the conductor 30. The resulting energization of the coil 565 will close the contacts 565A and 565B and will open the contacts 565C. The closing of the contacts 565A pre-sets a circuit to the vend relay coil 412, the closing of the contacts 565B pre-sets a circuit to the coil 501S of the memory relay 501, and the opening of the contacts 565C interrupts the circuit that normally energizes the coil 466. Thereupon, the contacts 466A will close, the contacts 466B will close, and the contacts 466C will open. The closing of the contacts 466B will complete a circuit from conductor 32 via junction 130 in FIG. 3, coil 131, junction 127, conductor 125 which extends through FIGS. 4 and 5 into FIG. 6, contacts 466B, and junction 464 to conductor 30. This circuit will keep the coil 131 energized even if all of the wipers 126, 143 and 202 were to reach or to pass through their zero positions at the same time during the credit deducting operation. The contacts 466C are connected in series relation with the re-setting coils of the selection relays, and hence the opening of those contacts will prevent any energization of those re-setting coils. This is desirable because those coils should not be energized subsequent to the initiation of a credit deducting cycle and prior to the end of that cycle or the end of the product vending cycle. The closing of the contacts 466A will complete a circuit which extends from conductor 32 via junctions 574, 575 and 576 in FIG. 6, coil 412, junction 561, the movable and upper contacts of the switch 435, contacts 466A, contacts 565A, junction 318, conductor 316 which extends through FIG. 5 to junction 320 in FIG. 4, the right-hand and movable contacts 385, the left-handmost left-hand and movable contacts adjacent the re-setting coils of the selection relays 363, 361, 359, 357 and 356, the left-hand and movable contacts 373, the left-hand and movable contacts 459, and junction 168 to conductor 30.

At the time the coil 412 was energized, the coil 501S in FIG. 5 also was energized by a circuit which extends from conductor 32 via junction 506 in FIG. 5, coil 501S, contacts 509, conductor 530 which extends into FIG. 6, contacts 565B, junctions 563 and 561, the movable and upper contacts of the switch 435, contacts 466A, contacts 565A, junction 318, conductor 316 which extends through FIG. 5 into FIG. 4, junction 320, the right-hand and movable contacts 385, the left-handmost left-hand and movable contacts adjacent the re-setting coils of the selection relays 363, 361, 359, 357 and 356, the left-hand and movable contacts 373, the left-hand and movable contacts 459, and junction 168 to conductor 30. The relay 501 is the vend memory relay and is actuated to disable the circuits which could otherwise be used by a patron to effect the return of the money inserted by her.

When the vent relay coil was energized, the contacts 412G were opened, and the movable contacts 412A, 412C and 412E shifted into engagement, respectively, with the left-hand contacts 412A, 412C and 412E. The opening of the contacts 412G will disable a circuit which is used to re-set the selection relays during the latter part of the credit deducting cycle. The shifting of the movable contacts 412A into engagement with the left-hand contact 412A completes a holding circuit that extends from conductor 30 via junction 52 in FIG. 6, the movable and upper contacts of the delivery switches 414, 415, 417 and 419, junction 54, the movable and left-hand contacts 412A, junctions 563 and 561, coil 412, and junctions 576, 575 and 574 to conductor 32. This holding circuit will keep the coil 412 energized until the delivery switch 419 is actuated during the vending of the desired product. The shifting of the movable contact 412A out of engagement with the right-hand movable contact 412A keeps the coil 466 de-energized until the end of the vending cycle. The shifting of the movable contact 412A out of engagement with the right-hand contact 412A additionally interrupts the circuit of the coin return electromagnets 234 and 235 in FIG. 3; and this is desirable because the selection relays can be re-set prior to the completion of the credit deducting and product vending cycle, and it would be undesirable for the coin return electromagnets to become re-energized prior to the end of that cycle. Moreover, the shifting of the movable contacts 412A out of engagement with the right-hand contact 412A disables the circuits which a patron can normally complete to effect the return of the money which she inserts. Also the shifting of the movable contact 412A out of engagement with the right-hand contact 412A will additionally interrupt the circuit to the coil 386, and this is desirable because it will prevent effective actuation of any of the selection switches prior to the completion of the credit deducting and product vending cycle.

The shifting of the movable contacts 412C into engagement with the left-hand contact 412C pre-sets a circuit which will extend through conductor 828 to the source of motive power that is disposed within the appropriate half of the vending machine and that actually dispense the desired product. The shifting of the movable contact 412C out of engagement with the right-hand contact 412C is not significant at this time, but would be significant during the later part of the credit deducting and product vending cycle if the source of motive power in the appropriate half of the vending machine were a motor, because such a motor would have to receive power through the movable and right-hand contacts 412C at that time to be able to restore the delivery switch 419 to its normal upper position.

The shifting of the movable contact 412E out of engagement with the right-hand contact 412E will additionally interrupt the circuit to the coil 471; and this is desirable because that coil should not be capable of being re-energized until after the conclusion of the credit deducting and product vending cycle. The shifting of the movable contact 412E into engagement with the left-hand contact 412E completes a circuit that extends from conductor 32 via junctions 514 and 335 in FIG. 6, and then either through the coil 315 to the junction 334 or through the motor 422 to the junction 334, and then through the left-hand and movable contacts 412E, junction 336, the upper and movable contacts of the switch 420, the movable and upper contacts of the switch 430, conductor 351 which extends into FIG. 5, the left-hand and movable contacts 624G, conductor 349 which extends through FIGS. 4, 3 and 2 into FIG. 1, junction 236, conductor 238, junction 240, the upper and movable contacts of the switch 290, conductor 242 which extends into FIG. 2, contacts 524, conductor 352, junction 244, contacts 145C, junction 246, conductor 247, contacts 215C, the right-hand and movable contacts 1470, the right-hand and movable contacts 470, the upper and movable contacts of the switches 42, 40, 38, 36, 34 and 214, and junction 200 to conductor 30. The resulting energization of the coil 315 will close the contacts 315A and will open the contacts 315B. The closing of the contacts 315A is not significant at this time but will become significant during later part of the credit deducting and product vending cycle. The opening of the contacts 315B will keep the payout electromagnets in FIGS. 9, 10 and 11 from becoming energized during the credit deducting and product vending cycle.

The energization of the motor 422, which occurs when the movable contact 412E shifts to the left, will cause a cam on the output shaft of that motor to promptly shift the movable contact of the switch 420 downwardly to isolate that motor and the coil 315 from their initial energizing circuit and to complete a holding circuit for that motor and coil. That holding circuit extends from conductor 32 via junctions 514 and 335 in FIG. 6, and then either through the motor 422 to the lower contact of the switch 420 or through the coil 315 and junction 334 to that lower contact, and then through the movable contact of that switch, the movable and upper contacts of the switch 430, conductor 351 which extends into FIG. 5, the left-hand and movable contacts 624G, conductor 349 which extends through FIGS. 5, 4, 3 and 2 into FIG. 1, junction 236, conductor 238, junction 240, the upper and movable contacts of the switch 290, conductor 242 which extends into FIG. 2, contacts 524, conductor 352, junction 244, contacts 145C, junction 246, conductor 247, contacts 215C, the right-hand and movable contacts 1470, the right-hand and movable contacts 470, the upper and movable contacts of the switches 42, 40, 38, 36, 34 and 214, and junction 200 to conductor 30. Rotation of the output shaft of the motor 422 will rotate the wipers of the deductor switches 670, 672 and 674 in the clockwise direction in FIGS. 11, 10 and 9. As the wiper of the deductor switch 674 moves into engagement with the contact 673, a circuit will be completed from conductor 32 via junction 35 in FIG. 3, coil 264, junctions 250 and 252, diode 686, conductor 680 which resumes in FIG. 9, contact 671, the wiper of the deductor switch 674, contact 673, conductor 533 which extends into FIG. 8, the movable and left-hand contacts 416C, contacts 418D, contacts 424C, junctions 400 and 365, conductor 404 which extends through FIG. 7 to junction 398 in FIG. 6, and then through FIGS. 5 and 4 into FIG. 3, junction 396 and then either through contacts 131D–131C to junction 390 or through junction 394 and contacts 165C and junction 392 to junction 390, and then through junction 170 to conductor 30. The resulting energization of the coil 264 will energize the coil 164 in the manner described hereinbefore, and the energization of the latter coil will cock the wiper 202 of the stepping switch 137.

At the time the wiper of the deductor switch 674 moved into engagement with the contact 673, the wiper of the deductor switch 672 moved into engagement with the contact 709; and thereupon a circuit was completed to provide an additional advancement for the wiper 143 of the stepping switch 133. That circuit extends from conductor 32 via junction 35 in FIG. 3, coil 167, junctions 226, 227 and 228, diode 684, conductor 678 which resumes in FIG. 10, contacts 707, the wiper of deductor switch 672, contact 709, conductor 366 which extends through FIG. 9 into FIG. 8, contacts 424C, junctions 400 and 365, conductor 404 which extends through FIG. 7 to junction 398 in FIG. 6 and then through FIGS. 5 and 4 into FIG. 3, junction 396, and then either through contacts 131D–131C to junction 390 or through junction 394 and contacts 165C and junction 392 to junction 390, and then through junction 170 to conductor 30. The resulting energization of the coil 167 will energize the stepping coil 132 of the stepping switch 133 and will thereby cock the wiper 143 of that stepping switch.

At the time the wipers of the deductor switches 674 and 672 moved, respectively, into engagement with the contacts 673 and 709, the wiper of the deductor switch 670 moved into engagement with the contact 731. The coil 163 in FIG. 3 was not energized upon the engagement of that wiper with the contact 731 because the positioning of the price setting pin 796 relative to that contact of the stepping switch 48 to which the deductor switch contact 731 is connected is such that energizing current for the coil 163 would have to flow through the diodes 255, 257, 259, 261, 263, 265 and 267 in a direction which is opposite to the direction in which current can flow through the diode 682 in FIG. 3. The overall result is that the coils 163 and 50 can not energize to effect cocking of the wiper 126. As the deductor motor 422 continues to rotate its output shaft in the clockwise direction it will move the wipers of the deductor switches 674 and 672, respectively, beyond the contacts 673 and 709; and thereupon the wipers 202 and 143 of the stepping switches 137 and 133 will advance—the wiper 202 moving up into engagement with contact 182 and the wiper 143 moving into engagement with the zero contact 144.

As the deductor motor 422 continues to rotate its output shaft in the clockwise direction, the wipers of the deductor switches 674, 672 and 670 will, respectively, move into engagement with the contacts 675, 711 and 732. The engagement of the wiper of the deductor switch 674 with the contact 675 will complete a circuit from conductor 32 via junction 35 in FIG. 3, coil 264, junctions 250 and 252, diode 686, conductor 680 which resumes in FIG. 9, contacts 671, the wiper of the deductor switch 674, contact 675, contact 180, the lowermost horizontal bar 312, price setting pin 784, conductor 818 which resumes in FIG. 4, contacts 379, contacts 381, the right-hand and movable contacts 389, junction 353, conductor 352 which extends through FIG. 3 to junction 244 in FIG. 2, contacts 145C, junction 246, conductor 247, contacts 215C, the right-hand and movable contacts 147O, the right-hand and movable contacts 470, the upper and movable contacts of the switches 42, 40, 38, 36, 34 and 214, and junction 200 to conductor 30. The resulting energization of the coil 264 will energize the coil 164 and thereby cock the wiper 202 of the stepping switch 137.

At the time the wiper of the deductor switch 674 moved into engagement with the contact 675, the wiper of the deductor switch 672 moved into engagement with the contact 711 and the wiper of the deductor switch 670 moved into engagement with the contact 732. However, the coil 167 will not be energized, because the positioning of the price setting pin 790 relative to that contact of the stepping switch 133 to which the deductor switch contact 711 is connected is such that energizing current for the coil 167 would have to flow through the diodes 283, 281, 279, 277, 275, 273, 271 and 269 in a direction which is opposite to the direction in which current can flow through the diode 684 in FIG. 3. Non-advancement of the wiper 143 is desirable because that wiper has already reached its ultimate position. Also, the coil 163 will not be energized, because the positioning of the price setting pin 796 relative to that contact of the stepping switch 48 to which the deductor switch contact 732 is connected is such that energizing current for the coil 163 would have to flow through the diodes 255, 275, 259, 261, 263 and 265 in a direction which is opposite to the direction in which current can flow through the diode 682 in FIG. 3. The overall result is that as the wipers of the deductor switches move into engagement with the second contacts of those switches, the wiper 202 will be cocked but the wipers 143 and 126 will not be cocked. As the wipers of the deductor switches moves out of engagement with the second contacts of those switches, the wiper 202 will advance into engagement with the contact 184.

In like manner, the movement of the wipers of the deductor switches 670, 672 and 674 into and out of engagement with the third, fourth, fifth, sixth and seventh contacts of those switches will result in advancement of the wiper 202 but will not result in any advancements of the wipers 143 and 126; and after the wiper of the deductor switch 674 moves out of engagement with the seventh contact of that switch, the wiper 202 will move into engagement with the contact 194.

As the wipers of the deductor switches 670, 672 and 674 move into engagement with the eighth contacts of those switches, circuits will be completed through the coils 264 and 163, but no circuit will be completed through the coil 167. As a result, the stepping coils 164 and 50 will be energized and will cock the wipers 202 and 126 but the wiper 143 will not be cocked. As the wipers of the deductor switches move out of engagement with the eighth contacts of those switches, the wipers 202 and 126 will advance, respectively, into engagement with the contacts 196 and 120.

As those wipers move into engagement with the ninth contacts of those switches, circuits will be completed through the coils 264 and 163 but no circuit will be completed through the coil 167. As a result, the stepping coils 164 and 50 will be energized and will cock the wipers 202 and 126 but the wiper 143 will not be cocked. As the wipers of the deductor switches move out of engagement with the ninth contacts of those switches, the wiper 202 will advance into engagement with the contact 198 and the wiper 126 will advance into engagement with the contact 122.

Further rotation of the output shaft of the deductor motor 422 will cause the wipers of the deductor switches to move into and out of engagement with the tenth contacts of those switches; and as those wipers so move, circuits will be completed and then interrupted through the coils 264 and 163, with consequent energization and de-energization of the stepping coils 164 and 50. As a result, the wiper 202 will advance into engagement with the zero contact 180 and the wiper 126 will advance into engagement with the zero contact 104.

Subsequently, the deductor motor 422 will cause the wipers of the deductor switches 670, 672 and 674 to move into and out of engagement with the eleventh contacts of those switches and to come to rest intermediate those eleventh contacts and the first contacts of those switches. As those wipers move into and out of engagement with those eleventh contacts, no change will occur in any of the other electrical components of the money-actuated device, because those contacts are not connected to any other components.

About the time the wipers of the deductor switches 670, 672 and 674 move into and out of engagement with the eleventh contacts of those switches, a cam that is on the output shaft of the deductor motor 422 and that is adjacent the switch 435 will shift the movable contact of that switch down into engagement with the lower contact of that switch. That shifting will complete a circuit which extends from conductor 30 via junction 52 in FIG. 6, the movable and upper contacts of the delivery switches 414, 415, 417 and 419, junction 54, the movable and left-hand contacts 412A, junctions 563 and 561, the movable and lower contacts of the switch 435, the left-hand and movable contacts 412C, conductor 823 which extends through FIG. 5 to junction 343 in FIG. 4, contacts 387, and thence via conductor 828 to the source of motive power, in the appropriate section of the vending machine, which will actually dispense the desired product. In this way, the vending of the desired product is effected automatically when the wipers of the deductor switches have passed beyond the tenth contacts of those switches.

Almost immediately thereafter, a cam on the output shaft of the deductor motor 422 will close the switch 433 in FIG. 6, but this closing will be ineffective at this time because the contacts 412G are still open. Almost immediately after the closing of the switch 433, a further cam on the output shaft of the deductor motor 422 will shift the movable contact of the switch 430 down into engagement with the lower contact of that switch. Thereupon, the deductor motor 422 will come to rest and the coil 515 will become deenergized because the shifting of that movable contact will break the running circuit of that motor and will break the holding circuit of that coil.

In the event the source of motive power in the appropriate section of the vending machine were to be a solenoid, the dispensing of the product would be almost immediate, and the delivery switch 419 would have the movable contact thereof shifted down almost immediately. In the event a motor were to be used as that source of motive power, there would be a delay of at least a fraction of a second in the shifting of the movable contact of the delivery switch 419 down into engagement with the lower contact of that switch. Until the movable contact of the delivery switch 419 is shifted down into engagement with the lower contact of that switch, and is then freed for movement back up into engagement with the upper contact of that switch, the motor 422 and the coil 315 will remain de-energized.

As the movable contact of the delivery switch 419 is shifted down into engagement with the lower contact of that switch, that movable contact will de-energize the vend relay coil 412. It should be noted that the shifting of the movable contact of the delivery switch 419 and the resultant de-energization of the vend relay coil 412 will not remove power from the source of motive power within the vending machine. Specifically, a circuit will be completed from conductor 30 via junction 52 in FIG. 6, the movable and upper contacts of the delivery switches 414, 415 and 417, the movable and lower contacts of the delivery switch 419, the right-hand and movable contacts 412C, conductor 823 which extends through FIG. 5 into FIG. 4, junction 343, contacts 387 and thence to conductor 828. This means that the source of motive power within the appropriate section of the vending machine will be supplied with power to enable it to complete its cycle of operation and fully dispense the desired product. That source of motive power, will, where it is a motor, have its own cycling control mechanism so that it will complete its cycle and then come to rest and will not institute a further cycle of operation until a further selection is made by the selection switches of the money-actuated device.

The de-energization of the vend relay coil 412 will effect the re-setting of the selection relays and will effect the movement of the bills and coins, if any, in the bill escrow and coin escrow into the cash box. Both of those actions will take place promptly. The re-setting of the selection relays is initiated by closing the contacts 412G and shifting the movable contact 412E back into engagement with the right-hand contact 412E to complete a circuit which extends from conductor 30 via junction 52 in FIG. 6, the movable and upper contacts of the delivery switches 414, 415, 417 and 419, junction 54, contacts 412G, switch 433, junction 336, the movable and right-hand contacts 412E, conductor 350 which extends into FIG. 5, the upper and movable contacts of switches 399, 401, 403, 402, 403 and 405, junction 57, coil 471, and junctions 484, 482, 480 and 478 to conductor 32. The resulting opening of the contacts 469 will de-energize the coil 565 and permit the contacts 565C to re-close; and thereupon a circuit will be completed from conductor 32 via junctions 495, 497, 515 and 517 in FIG. 6, coil 466 capacitor 465, diode 473, contacts 573, junction 56, the right-hand and movable contacts 412A, junction 54, the upper and movable contacts of the delivery switches 419, 417, 415 and 414, and junction 52 to conductor 30. The re-closing of the contacts 466C will participate in pre-setting a circuit that is used in re-setting the selection relays of the money-actuated device.

The energization of the coil 471 also closed the contacts 468; and thereupon a circuit was completed that extended from conductor 30 via junction 52 in FIG. 6, the movable and upper contacts of the delivery switches 414, 415, 417 and 419, junction 54, contacts 412G, switch 43, junction 336, the movable and right-hand contacts 412E, conductor 350 which extends into FIG. 5, the upper and movable contacts of the selection switches 399, 401, 403, 402, 403 and 405, junction 57, the movable and right-hand contacts 60A, contacts 468, conductor 532 which extends into FIG. 6, contacts 466C, conductor 337 which extends through FIG. 5 to junction 342 in FIG. 4, contacts 383, re-setting coil 358R, and junction 345 to conductor 32. As a result the re-setting coil 358R will be energized and will re-set the selection relay 358; and thereupon the contacts 387 will re-open, the movable contacts 385 and 389 will shift back into engagement with the left-hand contacts 385 and 389, and then the contacts 379, 381 and 383 will re-open.

*Excess Credit Deducting and Product Vending Circuits*

Whenever the registered credit exceeds the selling price of a desired product, and the selection relay corresponding to that product is actuated, the coils 60 and 471 will become de-energized and the coils 223 and 309 will become energized. The de-energization of the coil 471 will enable contacts controlled thereby to pre-set a circuit to the vend relay 412. The energization of the coils 223 and 309 will interconnect the two groups of diodes on the stepping switch 48, will interconnect the two groups of diodes on the stepping switch 133, will interconnect the two groups of diodes on the stepping switch 137, and will interrupt the credit registering tens transfer circuits. As the coil 309 becomes energized, the contacts controlled thereby will connect the wipers of the stepping switches to the coils of the credit sensing relays in the lowermost row of credit sensing relays. If it is assumed that a credit of nine dollars has been registered, the actuation of the selection relay 354 will effect an eight dollars and ninety-nine cents from the registered credits and will effect the dispensing of the product corresponding to that selection relay and will also effect the dispensing of one penny as change.

It will be noted that the second and last digits of the registered credits fall short of the second and last digits of the selling price of the product associated with the selection relay 354, and that the first digit of the registered credits exceeds the first digit of that selling price. As a result, the coils 408, 410, 416 and 423 in FIG. 8 will be energized but the coils 409, 411, 418, 421 and 424 will be de-energized. The fact that the coils 418 and 424 are not energized is significant, those coils will permit the contacts 418D and 424C to be open.

When the selection relay 354 is actuated, the coils 60 and 471 will become de-energized and the coils 223 and 309 will become energized; and, thereupon, a circuit will be completed that extends from conductor 32 via junctions 495, 497, 515 and 517 in FIG. 6, coil 565, conductor 504 which extends into FIG. 5, contacts 469, conductor 502 which extends through FIGS. 6 and 7 into FIG. 8, junctions 830 and 831, the right-hand and movable contacts 587A, the right-hand and movable contacts 542B, the right-hand and movable contacts 409B, contacts 408A, the movable and right-hand contacts 542A, junctions 836 and 332, the left-hand and movable contacts 309C, conductor 1449 which extends into FIG. 9, wiper 202, diode 287, contact 196, the second uppermost horizontal bar 312, price setting pin 780, left-handmost vertical bar 314, conductor 806 which resumes in FIG. 4, contacts 450, contacts 452, junction 809, the right-hand and movable contacts 463, the left-hand and movable contacts 377, the right-handmost left-hand and movable contacts adjacent the re-setting coils of the selection relays 356, 357, 359, 361 and 363, the left-hand and movable contacts 389, junction 353, conductor 352 which extends through FIG. 3 to junction 244 in FIG. 2, contacts 145C, junction 246, conductor 247, contacts 215C, the right-hand and movable contacts 1470, the right-hand and movable contacts 470, the upper and movable contacts of the switches 42, 40, 38, 36, 34 and 214, and junction 200 to the conductor 30. The resulting energization of the coil 565 will close the contacts 565A and 565B and will open the contacts 565C. The closing of the contacts 565A presets a circuit to the vend relay coil 412, the closing of the contacts 565B pre-sets a circuit to the coil 501S of the memory relay 501, and the opening of the contacts 565C interrupts the circuit that normally energizes the coil 466. Thereupon, the contacts 466A will close, the contacts 466B will close, and the contacts 466C will open. The closing of the contacts 466B will complete a circuit from conductor 32 via junction 130 in FIG. 3, coil 131, junction 127, conductor 125 which extends through FIGS. 4 and 5 into FIG. 6, contacts 466B, and junction 464 to conductor 30. This circuit will keep the coil 131 energized even if all of the wipers 126, 143 and 202 were to reach or to pass through their zero positions at the same time during the credit deducting operation. The contacts 466C are connected in series relation with the re-setting coils of the selection relays, and hence the opening of those contacts will prevent any energization of those re-setting coils. This is desirable because those coils should not be energized subsequent to the initiation of a credit deducting cycle and prior to the end of that cycle or the end of the product vending cycle. The closing of the contacts 466A will complete a circuit which extends from conductor 32 via junctions 574, 575 and 576 in FIG. 6, coil 412, junction 561, the movable and upper contacts of the switch 435, contacts 466A, contacts 565A, junction 318, conductor 316 which extends through FIG. 5 to junction 320 in FIG. 4, the right-hand and movable contacts 385, the left-handmost left-hand and movable contacts adjacent the re-setting coils of the selection relays 363, 361, 359, 357 and 356, the left-hand and movable contacts 373, the left-hand and movable contacts 459, and junction 168 to conductor 30.

At the time the coil 412 was energized, the coil 501S in FIG. 5 also was energized by a circuit which extends from conductor 32 via junction 506 in FIG. 5, coil 501S, contacts 509, conductor 530 which extends into FIG. 6, contacts 565B, junctions 563 and 561, the movable and upper contacts of the switch 435, contacts 466A, contacts 565A, junction 318, conductor 316 which extends through FIG. 5 into FIG. 4, junction 320, the right-hand and movable contacts 385, the left-handmost left-hand and movable contacts adjacent the re-setting coils of the selection relays 363, 361, 359, 357 and 356, the left-hand and movable contacts 373, the left-hand and movable contacts 459, and junction 168 to conductor 30. The relay 501 is the vend memory relay and is actuated to disable the circuits which could otherwise be used by a patron to effect the return of the money inserted by her.

When the vend relay coil was energized, the contacts 412G were opened, and the movable contacts 412A, 412C and 412E shifted into engagement, respectively, with the left-hand contacts 412A, 412C and 412E. The opening of the contacts 412G will disable a circuit which is used to re-set the selection relays during the latter part of the credit deducting cycle. The shifting of the movable contacts 412A into engagement with the left-hand contact 412A completes a holding circuit that extends from conductor 30 via junction 52 in FIG. 6, the movable and upper contacts of the delivery switches 414, 415, 417 and 419, junction 54, the movable and left-hand contacts 412A, junctions 563 and 561, coil 412, and junctions 576, 575 and 574 to conductor 32. This holding circuit will keep the coil 412 energized until the delivery switch 419 is actuated during the vending of the desired product. The shifting of the movable contact 412A out of engagement with the right-hand movable contact 412A keeps the coil 466 de-energized until the end of the vending cycle.

The shifting of the movable contact 412A out of engagement with the right-hand contact 412A additionally interrupts the circuit of the coin return electromagnets 234 and 235 in FIG. 3; and this is desirable because the selection relays can be re-set prior to the completion of the credit deducting and product vending cycle, and it would be undesirable for the coin return electromagnets to become re-energized prior to the end of that cycle. Moreover, the shifting of the movable contacts 412A out of engagement with the right-hand contact 412A disables the circuits which a patron can normally complete to effect the return of the money which she inserts. Also the shifting of the movable contact 412A out of engagement with the right-hand contact 412A will additionally interrupt the circuit to the coil 386, and this is desirable because it will prevent effective actuation of any of the selection switches prior to the completion of the credit deducting and product vending cycle.

The shifting of the movable contacts 412C into engagement with the left-hand contact 412C pre-sets a circuit which will extend through conductor 828 to the source of motive power that is disposed within the appropriate half of the vending machine and that actually dispense the desired product. The shifting of the movable contact 412C out of engagement with the right-hand contact 412C is not significant at this time, but would be significant during the latter part of the credit deducting and product vending cycle if the source of motive power in the appropriate half of the vending machine were a motor, because such a motor would have to receive power through the movable and hight-hand contacts 412C at that time to be able to restore the delivery switch 419 to its normal upper position.

The shifting of the movable contact 412E out of engagement with the right-hand contact 412E will additionally interrupt the circuit to the coil 471; and this is desirable because that coil should not be capable of being re-energized until after the conclusion of the credit deducting and product vending cycle. The shifting of the movable contact 412E into engagement with the left-hand contact 412E completes a circuit that extends from conductor 32 via junctions 514 and 335 in FIG. 6, and then either through the coil 315 to the junction 334 or through the motor 422 to the junction 334, and then through the left-hand and movable contacts 412E, junction 336, the upper and movable contacts of the switch 420, the movable and upper contacts of the switch 430, conductor 351 which extends into FIG. 5, the left-hand and movable contacts 624G, conductor 349 which extends through FIGS. 4, 3 and 2 into FIG. 1, junction 236, conductor 238, junction 240, the upper and movable contacts of the switch 290, conductor 242 which extends into FIG. 2, contacts 524, conductor 352, junction 244, contacts 145C, junction 246, conductor 247, contacts 215C, the right-hand and movable contacts 1470, the right-hand and movable contacts 470, the upper and movable contacts of the switches 42, 40, 38, 36, 34 and 214, and junction 200 to conductor 30. The resulting energization of the coil 315 will close the contacts 315A and will open the contacts 315B. The closing of the contacts 315A is not significant at this time but will become significant during a later part of the credit deducting and product vending cycle. The opening of the contacts 315B will keep the payout electromagnets in FIGS. 9, 10 and 11 from becoming energized during the credit deducting and product vending cycle.

The energization of the motor 422, which occurs when the movable contact 412E shifts to the left, will cause a cam on the output shaft of that motor to promptly shift the movable contact of the switch 420 downwardly to isolate that motor and the coil 315 from their initial energizing circuit and to complete a holding circuit for that motor and coil. That holding circuit extends from conductor 32 via junctions 514 and 335 in FIG. 6, and then either through the motor 422 to the lower contact of the switch 420 or through the coil 315 and junction 334 to that lower contact, and then through the movable contact of that switch, the movable and upper contacts of the switch 430, conductor 351 which extends into FIG. 5, the left-hand and movable contacts 624G, conductor 349 which extends through FIGS. 5, 4, 3 and 2 into FIG. 1, junction 236, conductor 238, junction 240, the upper and movable contacts of the switch 290, conductor 242 which extends into FIG. 2, contacts 524, conductor 352, junction 244, contacts 145C, junction 246, conductor 247, contacts 215C, the right-hand and movable contacts 147O, the right-hand and movable contacts 470, the upper and movable contacts of the switches 42, 40, 38, 36, 34 and 214, and junction 200 to conductor 30. Rotation of the output shaft of the motor 422 will rotate the wipers of the deductor switches 670, 672 and 674 in the clockwise direction in FIGS. 11, 10 and 9. As the wiper of the deductor switch 674 moves into engagement with the contact 673, a circuit will not be completed through the coil 264 because the contacts 418D and 424C are open and will prevent the completion of a circuit that otherwise would extend from conductor 32 via junction 35 in FIG. 3, coil 264, junctions 250 and 252, diode 686, conductor 680 which resumes in FIG. 9, contact 671, the wiper of the deductor switch 674, contact 673, conductor 533 which extends into FIG. 8, the movable and left-hand contacts 416C, contacts 418D, contacts 424C, junctions 400 and 365, conductor 404 which extends through FIG. 7 to junction 398 in FIG. 6, and then through FIGS. 5 and 4 into FIG. 3, junctions 396 and 394, contacts 203C, and junctions 392, 390 and 170 to conductor 30. The contacts 418D and 424C are open, as previously described herein, because the second and last digits of the registered credits fall short of the second and last digits of the selling price; and it is the fact that those contacts are open which accounts for the inability of the coil 264 to become energized when the wiper of the deductor switch 674 engages the contact 673. The overall result is that the coils 264 and 164 can not energize to effect the cocking of the wiper 202.

At the time the wiper of the deductor switch 674 moves into engagement with the contact 673, the wiper of the deductor switch 672 will move into engagement with the contact 709; but a circuit will not be completed through the coil 167 because the contacts 424C, which are in the energizing circuit of that coil, are open—all as explained hereinbefore. The overall result is that the coils 167 and 132 can not energize to effect the cocking of the wiper 143.

At the time the wipers of the deductor switches 674 and 672 moved, respectively, into engagement with the contacts 673 and 709, the wiper of the deductor switch 670 moved into engagement with the contact 731. The coil 163 in FIG. 3 was not energized upon the engagement of that wiper with the contact 731 because the positioning of the price setting pin 792 relative to that contact of the stepping switch 48 to which the deductor switch contact 731 is connected is such that energizing current for the coil 163 would have to flow through the diodes 251, 253, 255, 257, 259, 261, 263, 265 and 267 in a direction which is opposite to the direction in which current can flow through the diode 682 in FIG. 3. The overall result is that the coils 163 and 50 can not energize to effect cocking of the wiper 126.

As the deductor motor 422 continues to rotate its output shaft in the clockwise direction, the wipers of the deductor switches 674, 672 and 670 will, respectively, move into engagement with the contacts 675, 711 and 732. That engagement will not energize any of the coils 264, 167 or 163, because the positionings of the price setting pins 780, 786 and 792 relative to the contacts 180, 144 and 106 of the stepping switches are such that energizing current for those coils would have to flow through some of the diodes connected to those stepping switches in directions which are opposite to the directions in which current can flow through the diodes 686, 684 and 682 in FIG. 3. The overall result is that as the wipers of the deductor switches move into engagement with the second contacts of those switches, none of the wipers 202, 143 and 126 will be cocked for advancement.

In like manner, the movement of the wipers of the deductor switches 670, 672 and 674 into and out of engagement with the third, fourth, fifth, sixth, seventh, eighth and ninth contacts of those switches will not advance any of the wipers 202, 143 and 126.

As the wipers of the deductor switches 670, 672 and 674 move into engagement with the tenth contacts of those switches, circuits will be completed through the coils 264 and 163, but no circuit will be completed through the coil 167. As a result, the stepping coils 164 and 50 will be energized and will cock the wipers 202 and 126 but the wiper 143 will not be cocked. As the wipers of the deductor switches move out of engagement with the tenth contacts of those switches, the wipers 202 and 126 will advance, respectively, into engagement with the contacts 180 and 106. At this time, the wipers 202, 143 and 126 will register a residual credit of one cent.

Subsequently, the deductor motor 422 will cause the wipers of the deductor switches 670, 672 and 674 to move into and out of engagement with the eleventh contacts of those switches and to come to rest intermediate those eleventh contacts and the first contacts of those switches. As those wipers move into and out of engagement with those eleventh contacts, no change will occur in any of the other electrical components of the money-actuated device, because those contacts are not connected to any other components.

About the time the wipers of the deductor switches 670, 672 and 674 move into and out of engagement with the eleventh contacts of those switches, a cam that is on the output shaft of the deductor motor 422 and that is adjacent the switch 435 will shift the movable contact of that switch down into engagement with the lower contact of that switch. That shifting will complete a circuit which extends from conductor 30 via junction 52 in FIG. 6, the movable and upper contacts of the delivery switches 414, 415, 417 and 419, junction 54, the movable and left-hand contacts 412A, junctions 563 and 561, the movable and lower contacts of the switch 435, the left-hand and movable contacts 412C, conductor 823 which extends through FIG. 5 to junction 343 in FIG. 4, junction 825, contacts 461, and thence via conductor 824 to the source of motive power, in the appropriate section of the vending machine, which will actually dispense the desired product. In this way, the vending of the desired product is effected automatically when the wipers of the deductor switches have passed beyond the tenth contacts of those switches.

Almost immediately thereafter, a cam on the output shaft of the deductor motor 422 will close the switch 433 in FIG. 6, but this closing will be ineffective at this time because the contacts 412G are still open. Almost immediately after the closing of the switch 433, a further cam on the output shaft of the deductor motor 422 will shift the movable contact of the switch 430 down into engagement with the lower contact of that switch. Thereupon, the deductor motor 422 will come to rest and the coil 315 will become de-energized because the shifting of that movable contact will break the running circuit of that motor and will break the holding circuit of that coil.

In the event the source of motive power in the appropriate section of the vending machine were to be a solenoid, the dispensing of the product would be almost immediate, and the delivery switch 414 would have the movable contact thereof shifted down almost immediately. In the event a motor were to be used as that source of motive power, there would be a delay of at least a fraction of a second in the shifting of the movable contact of the delivery switch 414 down into engagement with the lower contact of that switch. Until the movable contact of the delivery switch 414 is shifted down into engagement with the lower contact of that switch, and is then freed for movement back up into engagement with the upper contact of that switch, the motor 422 and the coil 315 will remain de-energized.

As the movable contact of the delivery switch 414 is shifted down into engagement with the lower contact of that switch, that movable contact will de-energize the vend relay coil 412. It should be noted that the shifting of the movable contact of the delivery switch 414 and the resultant de-energization of the vend relay coil 412 will not remove power from the source of motive power within the vending machine. Specifically, a circuit will be completed from conductor 30 via junction 52 in FIG. 6, the movable and lower contacts of the delivery switch 414, the right-hand and movable contacts 412C, conductor 823 which extends through FIG. 5 into FIG. 4, junction 343, junction 825, contacts 461, and thence to conductor 824. This means that the source of motive power within the appropriate section of the vending machine will be supplied with power to enable it to complete its cycle of operation and fully dispense the desired product.

The de-energization of the vend relay coil 412 will effect the re-setting of the selection relays and will effect the movement of the bills and coins, if any, in the bill escrow and coin escrow into the cash box. Both of those actins will take place promptly. The re-setting of the selection relays is initiated by closing the contacts 412G and shifting the movable contact 412E back into engagement with the right-hand contact 412E to complete a circuit which extends from conductor 30 via junction 52 in FIG. 6, the movable and upper contacts of the delivery switches 414, 415, 417 and 419, junction 54, contacts 412G, switch 433, junction 336, the movable and right-hand contacts 412E, conductor 350 which extends into FIG. 5, the upper and movable contacts of switches 399, 401, 403, 402, 403 and 405, junction 57, coil 471, and junctions 484, 482, 480 and 478 to conductor 32. The resulting opening of the contacts 469 will de-energize the coil 565 and permit the contacts 565C to re-close; and thereupon a circuit will be completed from conductor 32 via junctions 495, 497, 515 and 517 in FIG. 6, coil 466, capacitor 465, diode 473, contacts 573, junction 56, the right-hand and movable contacts 412A, junction 54, the upper and movable contacts of the delivery switches 419, 417, 415 and 414, and junction 52 to conductor 30. The re-closing of the contacts 466C will participate in pre-setting a circuit that is used in re-setting the selection relays of the money-actuated device.

The energization of the coil 471 also closed the contacts 468; and thereupon a circuit was completed that extended from conductor 30 via junction 52 in FIG. 6, the movable and upper contacts of the delivery switches 414, 415, 417 and 419, junction 54, contacts 412G, switch 433, junction 336, the movable and right-hand contacts 412E, conductor 350 which extends into FIG. 5, the upper and movable contacts of the selection switches 399, 401, 403, 402, 403 and 405, junction 57, the movable and right-hand contacts 60A, contacts 468, conductor 532 which extends into FIG. 6, contacts 466C, conductor 337 which extends through FIG. 5 to junction 342 in FIG. 4, junction 364, contacts 453, coil 354R, and junction 347 to conductor 32. As a result, the re-setting coil 354R will be energized and will re-set the selection relay 354; and thereupon the contacts 461 will open, the movable contacts 459 and 463 will shift back into engagement with the left-hand contacts 459 and 463, and then the contacts 450, 452 and 453 will re-open.

*Selection Relays Re-Setting Circuits*

The shifting of the movable contact 385 to the left, as the re-setting coil 358R was energized, will energize the coil 60 by a circuit which extends from conductor 32 via junctions 61, 66, 68, 70 and 276 in FIG. 5, coil 60, conductor 55 which extends into FIG. 4, the left-hand and movable contacts 385, the left-handmost left-hand and movable contacts adjacent the re-setting coils of the selection relays 363, 361, 359, 357 and 356, the left-hand and movable contacts 373, the left-hand and movable contacts 459, and junction 168 to conductor 30. This energization of the coil 60 is significant because it means that the said coil has returned to its standby condition.

As the movable contact 385 in FIG. 4 shifted to the left to energize the coil 60, it also de-energized the coil 309. That de-energization is significant because it means that the coil 309 has returned to its standby condition. As the coil 60 became energized, it shifted the movable contact 60B out of engagement with the right-hand contact 60B and thereby de-energized the coil 223 in FIG. 3. That de-energization is significant because it means that the coil 223 has returned to its standby condition.

Although the actuated selection relay has been re-set, a patron will be unable, at this time, to effect a further selection of a product because the contacts 407 adjacent the coil 386 in FIG. 5 are still open. This is important because it would be undesirable to permit a patron to make a further selection until the inserted money has been transferred from the coin escrow and from the bill escrow into the cash boxes. The coil 386 is kept de-energized because the contacts 131A, 165A, and 203A in FIG. 3 are open; and the coils controlling those contacts are kept de-energized because the contacts 90, 134 and 166 in FIG. 3 are open—the wipers 126, 143 and 202 being in their zero positions.

At the time the coil 471 is energized during the re-setting operation, the motor 422 will be re-energized by the shifting of the movable contact 412A into engagement with the right-hand contact 412A. The subsequent rotation of the output shaft of that motor will move the wipers of the deductor switches 670, 672 and 674 toward their homing positions intermediate the eleventh and first contacts of those switches, and will successively shift the movable contact of the switch 430 back up into engagement with the upper contact of that switch, reopen the switch 433, and shift the movable contact 435 back up into engagement with the upper contact of that switch. As the output shaft of the motor 422 reaches its normal, standby position, it will shift the movable contact 420 back up into engagement with the upper contact of that switch. At this time, the motor 422 will have rotated the output shaft thereof through one complete revolution and that motor will then come to rest.

At the time the motor 422 was re-energized, the coil 315 also was re-energized; and that coil closed the contacts 315A and opened the contacts 315B. The closing of the contacts 315A completed a circuit which extended from conductor 30 via junction 170 in FIG. 3, junction 390, contacts 131C–131E, contacts 165B, contacts 203B, conductor 626 which extends through FIG. 4 into FIG. 5, the movable and right-hand contacts 624C, the movable and left-hand contacts 503, conductor 313 which extends into FIG. 4, contacts 315A, and junction 579; and then one branch of that circuit extended through the movable and right-hand contacts 618, solenoid 76 and junction 512 to conductor 32. Another branch of that circuit extended from junction 579 through junction 78, conductor 62 which extends into FIG. 7, coil 600, and junction 602 to conductor 32. A third branch of that circuit extended from junction 579 through junction 78, contacts 72B, the movable and left-hand contacts 63, coil 64S, junctions 577, 576, 575 and 574 to conductor 32. The resulting energization of the solenoid 76 will cause the floor of the hopper, which serves as the coin escrow, to be shifted to direct the coins in that hopper toward the coin cash box. The energization of the coil 600 is not significant at this time, because the energization of that coil will merely re-set the wiper 630 of the exact bill stepper 594 in FIG. 7; and that wiper has not yet been moved out of its zero position.

The energization of the coil 64S of the relay 64 will, by actuating contacts adjacent thereto, energize the motor 948 of the bill escrow. As it becomes energized, the coil 64S will close the contacts 69, will shift the movable contact 71 to the left, and will close the contacts 73. Also, that coil will shift the armature of the re-setting coil 64R to the right and thereby close the contacts 67, open the contacts 65, and shift the movable contact 63 to the right. The closing of the contacts 67 is ineffective at this time because the contacts 623 adjacent the coil 617 are open. The opening of the contacts 65 will additionally prevent energization of the coil 386; and this is desirable because it will make certain that the selection switches can not effect actuation of the selection relays until after the conclusion of the running of the motor 948. The shifting of the movable contact 63 into engagement with the right-hand contact 63 will hold the solenoid 76 and the coil 600 energized. The closing of the contacts 73 pre-sets a circuit to the solenoid 962 of a stepping coil. The shifting of the movable contact 71 into engagement with the left-hand contact 71 energizes the coil 479 by completing a circuit which extends from conductor 32 via junctions 574 and 575 in FIG. 6, coil 479, junction 572, the movable and left-hand contacts 71, junction 582, junction 968, and junction 966 to conductor 30. As the movable contact 71 shifts out of engagement with the right-hand contact 71 it will break the circuit to the coil 976 in FIG. 6; and this is significant because it will permit subsequent energizations of the coil 962 to advance the wiper adjacent the coil 962. The closing of the contacts 69 pre-sets the circuit of the re-setting coil 64R.

As the coil 479 becomes energized, it will open the contacts 497B and close the contacts 479A. The opening of the contacts 479B will make certain that the coin return electromagnets 234 and 235 will continue to remain de-energized. The closing of the contacts 479A will complete a circuit which extends from prong 952 of plug 950 in FIG. 6, through contacts 479A, junction 953 and then either through the motor 948 and junction 951 to prong 954 or through the coil 956 to the junction 951 and then to the prong 954. The coil 956 releases a brake which normally holds the shaft of the motor 948 against rotation, and hence the energization of the motor 948 and of the coil 956 will permit the shaft of that motor to rotate. That shaft is connected to the bill escrow and will start the belts of that escrow moving in a direction which would carry any bills, held between those belts, toward the bill cash box. In the particular illustration given, no bills were held in the bill escrow; but if bills had been so held, they would have been moved toward the bill cash box. Each revolution of the output shaft of the motor 948 will cause the cam 949 thereon to close and then re-open the switch 960. As that switch closes and re-opens, it will break and then interrupt a circuit to the stepping coil 962 of the stepper; and that circuit extends from conductor 32 via junctions 495 and 497 in FIG. 6, coil 962, contacts 73, switch 960, junction 968, and junction 966 to conductor 30. After a predetermined number of revolutions, usually twelve, the stepper will advance far enough to close the switch 964 in FIG. 6 and energize coil 72 by a circuit which extends from conductor 32 via junctions 574, 575, 576 and 577 in FIG. 6, coil 72, resistor 77, diode 79, switch 964, junction 968, and junction 966 to conductor 30.

The energization of the coil 72 will close the contacts 72A and open the contacts 72B and 72C. The opening of the contacts 72B will prevent energization of the coil 64S when the coil 64R is subsequently energized during the re-setting of the relay 64. The opening of the contacts 72C additionally prevents the energization of the coil 386, and thereby additionally prevents the actuation of the selection relays by the selection switches, until after the completion of the cycle of operation of the motor 948. The closing of the contacts 72A will complete a circuit which extends from conductor 32 via junctions 574 and 575 in FIG. 6, coil 64R, contacts 69, junction 583, contacts 72A, junction 582, and junctions 968 and 966 to conductor 30. The resulting energization of the coil 64R will re-close the contacts 65, will re-open the contacts 67, and will shift the movable contact 63 back into engagement with the left-hand contact 63. Also, that energization will shift the armature of the coil 64S to the right and thereby re-open the contacts 69 and 73 and shift the movable contact 71 back into engagement with the right-hand contact 71.

As the movable contact 71 shifts out of engagement with the left-hand contact 71, it will de-energize the coil 479; and that de-energization will open the contacts 479A and de-energize the motor 948 and the coil 956. Thereupon, the brake will be applied to the shaft of that motor and that motor will come to rest. Simultaneously, the shifting of the movable contact 71 into engagement with the right-hand contact 71 will re-energize the coil 976 of the stepper, and will thereby enable the wiper of that stepper to return to its zero position. As that wiper returns to its zero position, the switch 964 will open and thereby disconnect the coil 72 from the conductor 30. The capacitor 75 and the resistor 77 will coact to keep the coil 72 energized for a fraction of a second; but thereafter the contacts 72A will re-open and the contacts 72B and 72C will re-close.

The opening of the contacts 69 will interrupt the circuit to the coil 64R. The opening of the contacts 73 will interrupt the circuit to the coil 973. The opening of the contacts 67 is not significant at this time; but the closing of the contacts 65 will pre-set a circuit to the relay coil 386 and will also complete the circuit of the electromagnets 234 and 235 in FIG. 3. The shifting of the movable contact 63 away from the right-hand contact 63 will de-energize the solenoid 76 and the coil 600; and the shifting of that contact to the left will pre-set a circuit to the coil 64S.

Simultaneous with the completion of the circuit which energized the coil 64R, a second circuit will be completed which extends from conductor 32 via junction 510 in FIG. 5, coil 501R, conductor 573 which extends into FIG. 6, junction 583, contacts 72A, junction 582, and junctions 968 and 966 to conductor 30. The resulting energization of the coil 501R will re-set the memory relay 501, and thereby re-open the contacts 511 and 513 and will also re-close the contacts 509. That energization will then cause the armature of the coil 501S to shift to the right and re-open the contacts 507, re-close the contacts 505, and shift the movable contact 503 into engagement with the right-hand contact 503. This is significant because it will restore those various contacts to their standby condition.

At this time, the delivery switches 414, 415, 417 and 419 will be in their upper positions, the movable contact 412A will be in engagement with the right-hand contact 412A, the contacts 72C will be closed, the contacts 65 will be closed, the contacts 60C will be closed, the contacts 624F will be closed, the switch 231 will be closed, the movable contact of the switch 44 will be in its upper position, the contacts 547 in FIG. 1 will be closed, but the contacts 131A, 165A and 203A will be open because the wipers 126, 143 and 202 will be zero. This means that the coil 386 will be de-energized and that the contacts 407 will be open; but that as soon as a credit of any value is established, the contacts 407 will close and will effectively place the selection relays under the control of the selection switches. At this time, the circuit of the coin return electromagnets 234 and 235 will be complete, and those electromagnets will be holding the coin-rejecting stops out of the penny, nickel, dime, quarter and fifty cent passageways. Also, the coin return electromagnet 234 will permit the switch 233 to connect conductor 30 to one terminal of the push button 340. As a result, the money-actuated device will be in its normal standby condition.

In one of the foregoing illustrations, the selling price was assumed to be equal to the registered credits; and wherever that is the case, the actuation of the selection relay will coact with the credit sensing relays to energize the vend relay 412 and thereby cause the deductor switches of the money-actuated device to coact with the stepping coils of the stepping switches to provide whatever advancements are needed to move the wipers of those stepping switches to their zero positions. Further, the money-actuated device will effect the energization of the source of motive power within the appropriate half of the vending machine, and will additionally cause the solenoid 76 adjacent the coin escrow and the motor 948 adjacent the bill escrow to be actuated to move any coins or bills into the cash boxes. Further, the memory relay 501 will be reset to its standby position. Throughout the entire period between the actuation of a selection relay and the readying of the money-actuated device for standby operation, the coin return electromagnets 234 and 235 will be kept de-energized, so the stops controlled thereby will reject coins and so the switch 233 in FIG. 1 will prevent completion of the bill transport starting circuit. Moreover, during that period, the coil 386 will be kept de-energized, and hence the contacts 407 will remain open and will keep the selection switches from actuating the corresponding selection relays. In this way, full protection is provided for the patron and for the operator of the money-operated device.

In another of the foregoing illustrations, the selling price was assumed to be less than the registered credits; and wherever that is the case, the actuation of the selection relay will coact with the credit sensing relays to energize the vend relay 412 and thereby cause the deductor switches of the money-actuated device to coact with the stepping coils of the stepping switches to provide whatever advancements are needed to cause the stepping switches to indicate the residual credit. Further, the money-actuated device will effect the energization of the source of motive power within the appropriate half of the vending machine, and will then come to rest and await further actuation by the patron—such as the inserting of additional money, the making of additional selections or the actuating of change payout switch 44. Throughout the entire period between the actuation of a selection relay and the time the money-actuated device comes to rest, the coin return electromagnets 234 and 235 will be kept de-energized, so the stops controlled thereby will reject coins and so the switch 233 in FIG. 1 will prevent completion of the bill transport starting circuit. Moreover, during that period, the coil 386 will be kept de-energized, and hence the contacts 407 will remain open and will keep the selection switches from actuating the corresponding selection relays. In this way, full protection is provided for the patron and for the operator of the money-operated device.

*Chance Dispensing Circuits*

To obtain the change due him, a patron need only actuate the switch 44 in FIG. 5. The shifting of the movable contact of that switch down into engagement with the lower contact of that switch will complete a circuit which extends from conductor 32 via junction 506 in FIG. 5, coils 624S, contacts 624E, conductor 622 which extends through FIGS. 5 and 4 into FIG. 3, junction 620, contacts 131B, junction 616, conductor 614 which extends through FIG. 2 into FIG. 1, contacts 545, conductor 612 which extends through FIGS. 2, 3 and 4 to junction 341 in FIG. 5, the lower and movable contacts of switch 44, switch 221, junction 92, contacts 624F, contacts 60C, junction 94, conductor 58 which extends into FIG. 6, contacts 65, conductor 59, contacts 72C, junction 56, the right-hand and movable contacts 412A, junction 54 and the upper and movable contacts of the delivery switches 419, 417, 415 and 414, and junction 52 to conductor 30. The energization of the coil 624S will close the contacts 624A and 624B and will shift the movable contact 624C to the left, and it will also cause the armature of the coil 624R to shift to the right and thereby open the contacts 624E and 624F and shift the movable contact 624G to the right. As the contacts 624F open they will maintain the coil 386 in a de-energized condition; and de-energization of the coil 386 is desirable to render the selection switches ineffective during the paying out of change.

The shifting of the movable contact 624G to the right completed a circuit from conductor 32 via junction 512 in FIG. 6 through the solenoid 76, contacts 624B, junction 631, the right-hand and movable contacts 513, the right-hand and movable contacts 624G, conductor 349 which extends through FIGS. 4, 3 and 2 to junction 236 in FIG. 1, conductor 238, junction 240, the upper and movable contacts of switch 290, conductor 242, contacts 524, conductor 352, junction 244, contacts 145C, junction 246, conductor 247, contacts 215C, the right-hand and movable contacts 1470, the right-hand and movable contacts 470, the upper and movable contacts of switches 42, 40, 38, 36, 34 and 214, and junction 200 to conductor 30. The resulting energization of the solenoid 76 will cause the floor of the coin escrow to shift into position to cause the coins in that escrow to be directed to the coin cash box. Simultaneously, a circuit was completed from conductor 32 via junctions 574, 575, 576 and 577 in FIG. 6, coil 64S, the left-hand and movable contacts 63, contacts 72B, junctions 78 and 579, the movable and right-hand contacts 618, conductor 581 which extends into FIG. 5, contacts 624B, junction 631, the right-hand and movable contacts 513, the right-hand and movable contacts 624G, conductor 349 which extends through FIGS. 4, 3 and 2 into FIG. 1, junction 236, conductor 238, junction 240, the upper and movable contacts of switch 290, conductor 242, contacts 524, conductor 352, junction 244, contacts 145C, junction 246, conductor 247, contacts 215C, the right-hand and movable contacts 1470, the right-hand and movable contacts 470, the upper and movable contacts of switches 42, 40, 38, 36, 34 and 214, and junction 200 to conductor 30.

The resulting energization of the coil 64S will close the contacts 69 and 73 and will shift the movable contact 71 to the left, and will also cause the armature of the coil 64R to shift to the right and close the contacts 67, open the contacts 65, and shift the movable contact 63 to the right. The shifting of the movable contact 71 to the left will complete a circuit through coil 479 from conductor 32 via junction 574 in FIG. 6, junction 575, coil 479, junction 572, the left-hand and movable contacts 71, junctions 582, 968 and 966 to conduct 30. The energization of the coil 479 will open the contacts 479B and thereby de-energize the coin return electromagnets 234 and 235 to prevent the acceptance of further coins and bills. The energization of the coil 479 also will close the contacts 479A and thereby complete a circuit from prong 954 of plug 950, junction 951, and then either through the motor 948 to the junction 953 or through the coil 956 to that junction, and then through contacts 479A to prong 952 of that plug. The energization of the coil 956 will release a brake that normally bears against the shaft of the motor 948, and the energization of the motor 948 will start rotating that output shaft. Rotation of that output shaft will cause the cam 949 thereon to close and then re-open the switch 960 in FIG. 6. Each time the switch 960 closes, it will complete a circuit from conductor 32 via junctions 495 and 497 in FIG. 6, coil 962, contacts 73, switch 960, junctions 968 and 966 to conductor 30; and each time the switch 960 opens it will de-energize the coil 962. As that coil is successively energized and de-energized throughout the change-dispensing cycle, it will advance the wiper of the stepper and will, close to the end of that cycle, close the switch 964 in FIG.

6. As the output shaft of the motor 948 rotates, it will cause the belts of the bill escrow to move the four one dollar bills and the one five dollar bill toward the bill-receiving cash box.

At this moment, the memory relay 501 will still be in its actuated state, because the wiper 126 is indicating a residual credit. This fact is of importance in connection with the completion of a circuit which extends from conductor 32 via junction 508 in FIG. 5, contacts 507, contacts 624A, conductor 633 which extends through FIGS. 6, 7 and 8 into FIG. 9, junction 634, conductor 746, junctions 635, 636, 637, 639, 640, 641, 643, 645, 647, 656, 657, 659, 661, 663, 665 and 667, electromagnet 531, diode 500, contact 106, wiper 126, conductor 324 which extends through FIGS. 10 and 9 into FIG. 8, the movable and right-hand contacts 309A, junction 1452, conductor 1450 which extends through FIG. 7 into FIG. 6, contacts 315B, junction 311, and junction 96 to conductor 30. The resulting energization of the electromagnet 531 will free the armature thereof from the path of the coin ejector adjacent one of the coin storage tubes for pennies, but that ejector will be held by a cam on the output shaft of the motor 882 in FIG. 6. That motor, and the motor 880 for the bill-ejecting mechanism will become energized by a circuit which extends from conductor 32 via junction 879 in FIG. 6, junction 878, and then either through motor 882 and the movable and upper contacts of the switch 886 to junction 877 or through the motor 880 and the movable and upper contacts of the switch 884 to junction 877, and then through contacts 888, conductor 632 which extends into FIG. 5, junction 631, the right-hand and movable contacts 513, the right-hand and movable contacts 624G, conductor 349 which extends through FIGS. 4, 3 and 2 into FIG. 1, junction 236, conductor 238, junction 340, the upper and movable contacts of the switch 290, conductor 242 which extends into FIG. 2, contacts 524, conductor 352, junction 244, contacts 145C, junction 246, conductor 247, contacts 215C, the right-hand and movable contacts 1470, the right-hand and movable contacts 470, the upper and movable contacts of the switches 42, 40, 38, 36, 34 and 214, and junction 200 to conductor 30. Almost immediately, cams on the shafts of the motors 882 and 880 will shift the movable contacts of the switches 886 and 884 downwardly into engagement with the lower contacts of those switches, and thereupon a circuit will be completed from conductor 32 via junction 879 in FIG. 6, junction 878, motor 882, the movable and lower contacts of the switch 886, the upper and movable contacts of the switch 896, junction 892, and junction 339 to conductor 30. Also a circuit will be completed from conductor 32 via junction 879 in FIG. 6, junction 878, motor 880, the movable and lower contacts of the switch 884, the upper and movable contacts of the switch 894, junction 892, and junction 339 to conductor 30. The output shafts of the motors 882 and 880 will, respectively, rotate the cams adjacent the coin ejecting slides and will rotate the crank adjacent the bill ejectors. No bills will be ejected, because none of the coils or electromagnets associated with the stepping switch 137 were energized, and no nickels, dimes, quarters or half dollars will be paid out because none of the coils or electromagnets associated with the stepping switch 137 were energized. However, the electromagnet 531 in FIG. 11 was energized, and hence the coin ejecting slide adjacent that electromagnet will be permitted to pay out a penny during the revolution of the output shaft of the motor 822. That penny will pass to a chute which will conduct it to a cup-like receptacle at the exterior of the money-actuated device; and a patron can then retrieve that penny.

As the motors 882 and 880 continue to rotate the output shafts thereof, a cam on the output shaft of the motor 882 will shift the movable contact of the switch 896 down into engagement with the lower contact of that switch; and thereupon the motor 882 will come to rest. That downward shifting of that movable contact will also complete a circuit from conductor 32 via junction 495 in FIG. 6, junctions 497 and 515, coil 890, the lower and movable contacts of the switch 896 and junctions 892 and 339 to conductor 30. The resulting energization of the coil 890 will close the contacts 910 and 934 and will open the contacts 888. The opening of the contacts 888 will interrupt the initial energizing circuit of the motors 880 and 882. The closing of the contacts 934 will complete a circuit which extends from conductor 32 via junction 322 in FIG. 8, coil 309, conductor 316 which extends through FIG. 7 to junction 318 in FIG. 6, contacts 934, the lower and movable contacts of switch 896, and junctions 892 and 339 to conductor 30. The resulting energization of the coil 309 will shift the movable contacts 309A, 309B and 309C to the left, and will thereby disconnect the wipers 126, 143 and 202 from conductor 30. This isolation is desirable because it will keep the wipers from coacting with the contacts of the stepping switches 48, 113 and 137 to cause arcing or other electrical effects as those wipers are moved to their homing positions prior to the completion of the cycle of operation of the money-actuated device.

The motor 880 will shift the movable contact of the switch 894 down out of engagement with the upper contact of that switch, and will thereby break the running circuit of that motor. The shifting of that movable contact down into engagement with the lower contact of that switch and will thereby complete a circuit which extends from the conductor 30 via junction 339 in FIG. 5, junction 892, the movable and lower contacts of switch 894, contacts 910, junction 694, conductor 690 which extends into FIG. 5, junction 692, and then either through FIG. 4 into FIG. 3, diode 644, resistor 642, junction 68A, contacts 654A, resistor 646, coil 648 and junction 225 to conductor 32 or through the left-hand and movable contacts 60B, conductor 221 which extends through FIG. 4 into FIG. 3, coil 223, and junction 225 to conductor 32. The resulting energization of the coil 648 in FIG. 3 will close the contacts 648A, 648B, 648C and 648D; and the closing of the contacts 648A will complete a circuit from conductor 32 via junction 225 in FIG. 3, coil 654, resistor 652, contact 648A, junction 688, resistor 642, diode 644, conductor 690 which extends through FIG. 4 to junction 692 in FIG. 5 and then on into FIG. 6, junction 694, contacts 910, the lower and movable contacts of switch 894, junction 892, and junction 339 to conductor 30. The energization of the coil 654 in FIG. 3 will effect prompt opening of the contacts 654A and will thus isolate the coil 648 from the conductor 30. However, the coil 648 will not immediately permit the contacts 648A, 648B, 648C and 648D to re-open because the capacitor 650 will coact with the resistor 646 to maintain the coil 648 energized for a short, finite period of time. When the coil 648 does permit the contacts 648A to re-open, the coil 654 will be isolated from conductor 30; but that coil will not immediately permit the contacts 654A to re-open, because the capacitor 655 will coact with the resistor 652 to hold the coil 654 energized for a short, finite period of time. The overall result is that the coils 648 and 654 will alternately energize and de-energize, and will effect recurrent closings and openings of the contacts 648B, 648C and 648D. The recurrent closings and openings of the contacts 648C and 648D will not be effective at this time because the wipers 143 and 202 of the stepping switches 133 and 137 are in engagement with the zero contacts of those stepping switches. However, the recurrent closing and opening of the contacts 648B will recurrently complete and interrupt a circuit which extends from conductor 32 via junction 35 an FIG. 3, coil 163, junctions 219 and 220, conductor 222 which extends downwardly to contacts 648B, junction 127, contacts 90, and junction 171 to conductor 30. Each energization of the coil 163 will effect an energization of the stepping coil 50 of the stepping switch 48, and each deenergization of the coil 163 will effect a de-energization of the stepping coil 50; and the recurrent energizations and de-energizations of stepping coil 50 will cock and then advance the wiper 126 of the stepping switch 48. That wiper will continue to move past the contacts 108, 110, 112, 114, 116, 118, 120 and 122 and will come to rest in engagement with the contact 104. As that wiper moves into engagement with the contact 104, the contacts 99 will open and will break the circuit to the coil 163 and also to the coil 131.

Throughout the time the coils 648 and 654 were being alternately energized and de-energized, the coil 223 was continuously energized; and thus continuously held the contacts 223D and 223C open. As a result the credit registering tens transfer circuits were kept open, all as described hereinbefore.

The said breaking of the circuit to the coil 131, as the contacts 99 re-opened, de-energized that coil. The consequent shifting of the contacts 131C into engagement with the contact 131E completed a circuit from conductor 32 via junction 510 in FIG. 6, coil 624R, the left-hand and movable contacts 624C, conductor 626 which extends through FIG. 4 into FIG. 3, contacts 203B, contacts 165B, contacts 131E–131C, junction 390, and junction 170 to the conductor 30. The resulting energization of the coil 624R will shift the movable contact 624G to the left and will re-close the contacts 624E and 624F. Furthermore, that energization will cause the armature of the coil 624S to shift to the right and re-open the contacts 624A and 624B and to shift the movable contacts 624C to the right. Thereupon, the motors 880 and 882 will be re-energized; the motor 880 being energized by a circuit extending from conductor 32 via junctions 879 and 878 in FIG. 6, motor 880, the movable and lower contacts of switch 884, the upper contact of switch 894, conductor 885 which extends into FIG. 5, the right-hand and movable contacts 503, the right-hand and movable contacts 624C, conductor 626 which extends through FIG. 4 into FIG. 3, contacts 203B, contacts 165B, contacts 131E–131C, and junctions 390 and 170 to conductor 30. The motor 882 will be re-energized by a circuit extending from conductor 32 via junctions 879 and 878 in FIG. 6, motor 882, the movable and lower contacts of switch 886, conductor 893 which extends into FIG. 5, contacts 505, the right-hand and movable contacts 624C, conductor 626 which extends through FIG. 4 into FIG. 3, contacts 203B, contacts 165B, contacts 131E–131C, and junctions 390 and 170 to conductor 30. As the motors 880 and 882 resume operation, they will cause cams on the output shafts thereof to shift the movable contacts of the switches 894 and 896 back up to their upper positions; and at such time those motors will be energized by a circuit extending from conductor 32 through junction 879 in FIG. 6, junction 878, and then either through motor 880 and the movable and lower contacts of switch 884 and the upper and movable contacts of switch 894 to the junction 892 or through the motor 882 and the movable and lower contacts of switch 886 and the upper and movable contacts of switch 896 to the junction 892, and then to junction 339 and conductor 30.

The shifting of the movable contacts of the switches 894 and 896 back to their upper positions will interrupt the circuits to the coils 648 and 654 of the homing relays and will thereby de-energize those relays. This interruption is effected either by the action of the switch 896 in de-energizing the coil 890 to re-open the contacts 910 or by the action of the switch 894 in breaking the circuit to the contacts 910. Almost immediately thereafter, the cams on the output shafts of the motors 880 and 882 will shift the movable contacts of the switches 884 and 886 back up into their initial positions to break the running circuits of those motors. Thereupon, those motors will come to rest.

Shortly after the motors 880 and 882 come to rest, the wiper of the stepper will close the switch 964 in FIG. 6. Thereupon a circuit will be completed from conductor 32 via junctions 574, 575, 576 and 577 in FIG. 6, coil 72, resistor 77, diode 79, switch 964, and junctions 968 and 966 to conductor 30. The resulting energization of the coil 72 will close the contacts 72A and open the contacts 72B and 72C. As the contacts 72A close, a circuit will be completed from conductor 32 via junction 510 in FIG. 5, coil 501R, conductor 573 which extends into FIG. 6, junction 583, contacts 72A, and junctions 582, 968 and 966 to conductor 30. The resulting energization of the coil 501R will shift the armature of that coil to the left and re-close the contacts 509, re-open the contacts 511 and shift the movable contact 513 to the left. Also, that energization will shift the armature of the coil 501S to the right and re-open the contacts 507, re-close the contacts 505, and shift the movable contact 503 to the right. In doing so, it will erase the memory of the successful energization of the selection relay 354.

The closing of the contacts 72A also completes a circuit from conductor 32 via junction 574 in FIG. 6, junction 575, coil 64R, contacts 69, junction 583, contacts 72A, and junction 582, 968 and 966 to conductor 30. The opening of the contacts 72C will keep the coin return electromagnets 234 and 235 de-energized, and will thereby continue to prevent the acceptance of further coins and bills. Furthermore the opening of the contacts 72B will keep the selection switches 405, 403, 402, 403, 401 and 399 from actuating the selection relays.

Shortly thereafter, enough of the charge on the capacitor 75 in FIG. 6 will have leaked off through the coil 72 and the resistor 77 to reduce the current flowing through that coil to a level which is insufficient to hold the contacts 72C open. Thereupon, those contacts will re-close and will thereby re-energize the coin return electromagnets 234 and 235. Also, the re-closing of the contacts 72C will make it possible for the selection switches 405, 403, 402, 403, 401 and 399 to control the corresponding selection relays.

*Money Returning Circuits*

A patron can, prior to the time a credit deducting and product vending cycle has been initiated, obtain the return of the money which he inserted. All the patron need do is to actuate the switch 44 in FIG. 5; and thereupon a circuit will be completed from conductor 32 via junction 506 in FIG. 5, coil 624S, contacts 624E, conductor 622 which extends through FIG. 4 to junction 620 in FIG. 3, and then either through contacts 131B to junction 616 or through contacts 165D to junction 616 or through contacts 203D to junction 616, and thence along conductor 614 which extends through FIG. 2 into FIG. 1, contacts 545, conductor 612 which extends through FIGS. 2, 3 and 4 to junction 341 in FIG. 5, the lower and movable contacts of switch 44, switch 231, junction 92, contacts 624F, contacts 60C, junction 94, conductor 58 which extends into FIG. 6, contacts 65, conductor 59, contacts 72C, junction 56, the right-hand and movable contacts 412A, junction 54, the upper and movable contacts of the delivery switches 419, 417, 415 and 414, and junction 52 to conductor 30.

The resulting energization of the coil 624S will close the contacts 624A and 624B and will shift the movable contact 624C into engagment with the left-hand contact 624C; and it will also shift the armature of the coil 624R to the right, thereby opening the contacts 624E and 624F and shifting the movable contact 624G to the right. The closing of the contacts 624A is ineffective at this time because the contacts 507 are open; and the closing of the contacts 624B is ineffective at this time because the movable contact 573 is not of engagement with the right-hand contact 513, and hence the solenoid 76 in FIG. 6 adjacent the coin escrow can not be energized. This is important because the patron must be protected against the energization of the solenoid 76 and the consequent directing of the coins into the coin cash box of the money-actuated device. The shifting of the movable contact 624C into engagement with the left-hand contact 624C pre-sets a circuit to the coil 624R in FIG. 5. The shifting of the movable contact 624C out of engagement with the right-hand contact 624C is ineffective at this time, but it is significant in connection with the dispensing of change after a selection has been made and a credit deducting and product vending cycle has been completed. The opening of the contacts 624E will de-energize the coil 624S, but the armatures of the coils 624S and 624R are mechanically latched; and hence the de-energization of the coil 624S will not affect the shifted contacts of the coils 624S and 624R. The opening of the contacts 624F will de-energize the coin return electromagnets 234 and 235 and will thereby prevent the acceptance of further coins and bills until after the conclusion of the money returning operation. In addition, the opening of the contacts 624F will de-energize the coil 386, and thereby permit the contacts 407 to open—with consequent isolation of the selection switches from conductor 30. That isolation is desirable because it will prevent actuation of any of the selection relays prior to the conclusion of the money returning operation. The shifting of the movable contact 624G out of engagement with the left-hand contact 624G will de-energize the coil 471 in FIG. 5; but the resultant opening of contacts 468 and the closing of contacts 469 are ineffective at this time. The shifting of the movable contact 624G into engagement with the right-hand contact 624G will complete a circuit from conductor 32 via junction 514 in FIG. 6, coil 617, conductor 610 which extends into FIG. 5, the lefthand and movable contacts 513, the right-hand and movable contacts 624G, conductor 349 which extends through FIGS. 4, 3 and 2 into FIG. 1, junction 236, conductor 238, junction 240, the upper and movable contacts of switch 290, conductor 242 which extends into FIG. 2, contacts 524, conductor 352, junction 244, contacts 145C, junction 246, conductor 247, contacts 215C, the right-hand and movable contacts 1470, the right-hand and movable contacts 470, the upper and movable contacts of switches 42, 40, 38, 36, 34 and 214, and junction 200 to conductor 30.

The resulting energization of the coil 617 will close the contacts 623, 621 and 619 and will shift the movable contact 618 into engagement with the left-hand contact 618. The closing of the contacts 623 will pre-set a holding circuit for the coil 617. The shifting of the movable contact 618 into engament with the left-hand contact 618 will complete a circuit from conductor 30 via junction 96 in FIG. 6, junction 311, the left-hand and movable contacts 618, junction 579, junction 78, and then either through conductor 62 and coil 600 and junction 602 to conductor 32 or through contacts 72B, the movable and left-hand contacts 63, coil 64S, and junctions 577, 576, 575 and 574 to conductor 32. The resulting energization of the coil 600 will not be signficant at this time, because the wiper 630 of the exact bill stepper 594 has not moved from its zero position.

The energization of the coil 64S of the relay 64 will, by actuating contacts adjacent thereto, energize the motor 948 of the bill escrow. As it becomes energized, the coil 64S will close the contacts 69, will shift the movable contact 71 to the left, and will close the contacts 73. Also, that coil will shift the armature of the re-setting coil 64R to the right and thereby close the contacts 67, open the contacts 65, and shift the movable contact 63 to the right. The closing of the contacts 67 will complete the pre-set holding circuit for the coil 617 in FIG. 6. The opening of the contacts 65 will additionally prevent energization of the coil 386; and this is desirable because it will make certain that the selection switches can not effect actuation of the selection relays until after the conclusion of the running of the motor 948.

The shifting of the movable contact 63 into engagement with the right-hand contact 63 will not be significant at this time. The closing of the contacts 73-pre-sets a circuit to the solenoid 962 of a stepping coil. The shifting of the movable contact 71 into engagement with the left-hand contact 71 energizes the coil 479 by completing a circuit which extends from conductor 32 via junctions 574 and 575 in FIG. 6, coil 479, junction 572, the movable and left-hand contacts 71, junction 582, junction 968, and junction 966 to conductor 30. As the movable contact 71 shifts out of engagement with the right-hand contact 71 it will break the circuit to the coil 976 in FIG. 6; and this is significant because it will permit subsequent energizations of the coil 962 to advance the wiper adjacent the coil 962. The closing of the contacts 69 pre-sets the circuit of the resetting coil 64R.

As the coil 479 becomes energized, it will open the contacts 479B and close the contacts 479A. The opening of the contacts 479B will make certain that the coin return electromagnets 234 and 235 will continue to remain de-energized. The closing of the contacts 479A will complete a circuit which extends from prong 952 of plug 950 in FIG. 6, through contacts 479A, junction 953 and then either through the motor 948 and junction 951 to prong 954 or through the coil 956 to the junction 951 and then to the prong 954. The coil 956 releases a brake which normally holds the shaft of the motor 948 against rotation, and hence the energization of the motor 948 and of the coil 956 will permit the shaft of that motor to rotate. That shaft is connected to the bill escrow and will sart the belts of that escrow moving in a direction which would carry any bills, held between those belts, toward the gate which will be shifted to cause those bills to be returned to the patron.

The shifting of the movable contact 618 out of engagement with the right-hand contact 618 will additionally isolate the solenoid 76 from the conductor 30, and will thereby prevent the directing of coins from the coin escrow into the coin cash box. The closing of the contacts 619 will complete a circuit which extends from conductor 32 via junction 512 in FIG. 6, solenoid 80, contacts 619, and junctions 311 and 96 to conductor 30. The resulting energization of the solenoid 80 will shift the floor of the coin escrow and thereby direct the coins within that coin escrow toward the cup-like receptacle at the exterior of the money-actuated device. As a result, the patron will be able to retrieve the coins which he inserted. In addition, the closing of the contacts 619 will complete a circuit which contents from conductor 32 via junction 574 in FIG. 6, solenoid 483, contacts 619, and junctions 311 and 96 to conductor 30. The resulting energization of the solenoid 483 will shift the gate which is associated with the bill escrow, and which normally is in position to direct bills into the bill cash box. The shifting of that gate will enable that gate to direct bills to a cup-like receptacle at the exterior of the money-actuated device. As the solenoid 483 is energized, it will open the switch 481 in FIG. 6, and will thereby additionally de-energize the coin return electromagnets 234 and 235. This is important because the cycle of the bill escrow is relatively long, and it is important that the coin-return electromagnets 234 and 235 be kept energized until the conclusion of that cycle. The closing of the contacts 621 by the energization of the coil 617 will complete a circuit which extends from conductor 30 via junction 170 in FIG. 3, junction 390 and then either through contacts 131C–131D and junction 396 or junction 392 and contacts 165C and junction 394 to junction 396 or junction 392 and contacts 203C and junction 394 to junction 396, and then through conductor 404 which extends through FIGS. 4 and 5 to junction 398 in FIG. 6, contacts 621, junction 694, and conductor 690 which extends to junction 692 in FIG. 5; and then one branch of that circuit extends through the left-hand and movable contacts 60B, conductor 221 which extends through FIG. 4 into FIG. 3, coil 223, and junction 225 to conductor 32. Another branch of that circuit extends from the junction 692 along conductor 690 through FIG. 4 into FIG. 3, diode 644 resistor 642, junction 688, contact 654A, resistor 646, coil 648, and junction 225 to conductor 32.

The energization of the coil 223 will open the credit registering tens transfer circuits by opening the contacts 223D and 223C. The closing of the contacts 223A and 223B will be ineffective at this time. The energization of the coil 648 will act to energize the coil 654; and thereupon those coils and the contacts associated therewith will provide a series of pulses which will be applied to the coils 163, 167 and 264 in FIG. 3. Those pulses will pulse the stepping coils 50, 132 and 164 of the stepping switches 48, 133 and 137; and the overall result is that the wipers 126, 143 and 202 will be stepped to their zero positions and will then come to rest. Each revolution of the output shaft of the motor 948 will cause the cam 949 thereon to close and then re-open the switch 960. As that switch closes and re-opens, it will break and then interrupt a circuit to the stepping coil 962 of the stepper; and that circuit extends from conductor 32 via junctions 495 and 497 in FIG. 6, coil 962, contacts 73, switch 960, junction 968, and junction 966 to conductor 30. After a predetermined number of revolutions, usually twelve, the stepper will advance far enough to close the switch 964 in FIG. 6 and energize coil 72 by a circuit which extends from conductor 32 via junctions 574, 575, 576 and 577 in FIG. 6, coil 72, resistor 77, diode 79, switch 964, junction 968, and junction 966 to conductor 30.

The energization of the coil 72 will close the contacts 72A and open the contacts 72B and 72C. The opening of the contacts 72B will prevent energization of the coil 64S when the coil 64R is subsequently energized during the re-setting of the relay 64. The opening of the contacts 72C additionally prevents the energization of the coil 386, and thereby additionally prevents the actuation of the selection relays by the selection switches, until after the completion of the cycle of operation of the motor 948. The closing of the contacts 72A will complete a circuit which extends from conductor 32 via junctions 574 and 575 in FIG. 6, coil 64R, contacts 69, junction 583, contacts 72A, junction 582, and junctions 968 and 966 to conductor 30. The resulting energization of the coil 64R will re-close the contacts 65, will re-open the contacts 67, and will shift the movable contact 63 back into engagement with the left-hand contact 63. Also, that energization will shift the armature of the coil 64S to the right and thereby re-open the contacts 69 and 73 and shift the movable contact 71 back into engagement with the right-hand contact 71.

As the movable contact 71 shifts out of engagement with the left-hand contact 71, it will de-energize the coil 479; and that deenergization will open the contacts 479A and de-energize the motor 948 and the coil 956. Thereupon, the brake will be applied to the shaft of that motor and that motor will come to rest. Simultaneously, the shifting of the movable contact 71 into engagement with the right-hand contact 71 will re-energize the coil 976 of the stepper, and will thereby enable the wiper of that stepper to return to its zero position. As that wiper returns to its zero position, the switch 964 will open and thereby disconnect the coil 72 from the conductor 30. The capacitor 75 and the resistor 77 will coact to keep the coil 72 energized for a fraction of a second; but thereafter the contacts 72A will re-open and the contacts 72B and 72C will re-close.

The opening of the contacts 69 will interrupt the circuit to the coil 64R. The opening of the contacts 73 will interrupt the circuit to the coil 973. The opening of the contacts 67 is not significant at this time; but the closing of the contacts 65 will pre-set a circuit to the relay coil 386 and will also complete the circuit of the electromagnets 234 and 235 in FIG. 3. The shifting of the movable contact 63 away from the right-hand contact 63 will de-energize the solenoid 76 and the coil 600; and the shifting of that contact to the left will pre-set a circuit to the coil 64S.

At this time, the money-actuated device of the present invention will, once again, be in its standby condition. Patrons can then insert coins and bills, as desired, and can then actuate the selection switches appropriate to the desired products.

*Coin Empty Circuits*

The money-actuated device provided by the present invention has circuits which will permit coins to be inserted, and will permit products to be vended, even though the supply of coins available for change-making purposes is exhausted; and this is desirable because it will avoid shutting down of the money-actuated device merely because the supply of coins for change-making purposes is exhausted. However, those circuits will fully protect the patron against the loss of change by preventing the actuation of the selected relays in the event the selling price of the desired product falls short of the registered credits by amounts requiring the dispensing of coins as change. Those coin empty circuits include a coin empty switch 590 that operates whenever the supply of coins in any of the coin storage tubes gets too low.

Upon the closing of the switch 590, a circuit will be completed from conductor 30 via junction 338 in FIG. 7, switch 590, conductor 589 which extends into FIG. 8, coil 587, and junction 696 to conductor 32. The resulting energization of the coil 587 will shift the movable contact 587A into engagement with the left-hand contact 587A, will open the contacts 587B and 587C, will shift the movable contact 587D into engagement with the left-hand contact 587D, and will close the contacts 587E. The shifting of the movable contact 587D into engagement with the left-hand contact 587D will complete a circuit which extends from conductor 32 via junction 651 in FIG. 7, coin empty lamp 653, conductor 710 which extends into FIG. 8, the right-hand and movable contacts 542C, the movable and left-hand contacts 587D, conductor 589 which extends into FIG. 7, switch 590, and junction 338 to conductor 30. The energization of the lamp 653 will indicate to patrons that they should not make selections which would require the dispensing of coins as change; and it will indicate to employees of the operator of the money-actuated device that the supply of coins available for change-making purposes should be replenished. The shifting of the movable contact 587D out of engagement with the right-hand contact 587D will interrupt the circuit to the bill empty lamp 658 in FIG. 7. This is desirable because the mere fact that the supply of coins is insufficient will not keep the money-actuated device from dispensing bills as change; and hence the illumination of the coin empty lamp 653 should not cause illumination of the bill empty lamp 658. The closing of the contacts 587E will pre-set a circuit which extends from conductor 32 via junction 651 in FIG. 7, insert exact change lamp 649, conductor 708 which extends into FIG. 8, contacts 587E, conductor 714 which extends into FIG. 7, junction 716, any of the switches 592, and junction 338 to conductor 30.

The contacts 587A, 587B and 587C will be actuated when the coil 587 is energized, and those contacts will coact with contacts on various of the credit sensing relays to prevent actuation of the coil 565 in the event the difference between the registered credits and the selling price of a desired product requires the dispensing of coins as change. The actuation of the contacts 587A, 587B and 587C will not, however, coact with contacts on various of the credit sensing relays to prevent the energization of the coil 565 when the difference between the registered credits and the selling price of a desired product constitute an integral number of dollars.

Whenever the switch 590 is closed and the coil 587 is energized, four different situations could arise upon the actuation of a selection switch. For example, a patron could actuate a selection switch which called for a selling price that exactly equalled the registered credits, he could actuate a selection switch calling for a selling price which falls short of the registered credits by one or more dollars, he could actuate a selection switch calling for a selling price which falls short of the registered credits by one or more tens credits, or he could actuate a selection switch calling for a selling price which falls short of the registered credits by one or more units credits. The first two of these situations will lead to the establishment of two, individually-different circuits from the wiper 202 to the coil 565; and the last two of these situations will prevent the establishment of any circuit from the wiper 202 to the coil 565.

When the patron actuates a selection switch calling for a selling price which exactly equals the registered credits, a circuit will be completed from wiper 202, conductor 1449 which extends into FIG. 8, the movable and left-hand contacts 309C, junctions 332 and 836, the right-hand and movable contacts 542A, contacts 408A, the movable and left-hand contacts 409B, junction 834, contacts 411A, the left-hand and movable contacts 416D, contacts 421A, the movable and left-hand contacts 423B, junctions 832 and 830, conductor 502 which extends through FIGS. 7 and 6 into FIG. 5, contacts 469, conductor 504 which extends into FIG. 6, coil 565, and junctions 517, 515, 497 and 495 to conductor 32. If a patron actuates a selection switch calling for a selling price which falls short of the registered credits by one or more dollars, a circuit will be completed which extends from wiper 202, conductor 1449 which extends into FIG. 8, the movable and left-hand contacts 309C, junctions 332 and 836, the right-hand and movable contacts 542A, contacts 408A, the movable and right-hand contacts 409B, the movable and right-hand contacts 542B, the movable and left-hand contacts 587A, junction 834, contacts 411A, the movable and left-hand contacts 416D, contacts 421A, the movable and left-hand contacts 423B, junctions 832 and 830, conductor 502 which extends through FIGS. 7 and 6 into FIG. 5, contacts 469, conductor 504 which extends into FIG. 6, coil 565, and junctions 517, 515, 497 and 495 to conductor 32. In the event a patron actuates a selection switch calling for a selling price which falls short of the registered credits by one or more tens credits, the contacts 587C will be opened and will interrupt the circuit which otherwise would extend from wiper 202 through conductor 1449 which extends into FIG. 8, the movable and left-hand contacts 309C, junctions 332 and 836, the right-hand and movable contacts 542A, contacts 408A, the movable and left-hand contacts 409B, junction 834, contacts 411A, the movable and right-hand contacts 416D, junction 833, now-open contacts 587C, junctions 831 and 830, conductor 502 which extends through FIGS. 7 and 6 into FIG. 5, contacts 469, conductor 504 which extends into FIG. 6, coil 565, and junctions 517, 515, 497 and 495 to conductor 32. If a patron actuates a selection switch which calls for a selling price that falls short of the registered credits by one or more units credits, the contacts 587C will again be open and will again interrupt a circuit that otherwise would be completed from wiper 202 through conductor 1449 which extends into FIG. 8, the movable and left-hand contacts 309C, junctions 332 and 836, the right-hand and movable contacts 542A, contacts 408A, the movable and left-hand contacts 409B, junction 834, contacts 411A, the movable and left-hand contacts 416D, contacts 421A, the movable and right-hand contacts 423B, junction 833, now-open contacts 587C, junctions 831 and 830, conductor 502 which extends through FIGS. 7 and 6 into FIG. 5, contacts 469, conductor 504 which extends into FIG. 6, coil 565, and junctions 517, 515, 497 and 495 to conductor 32. The overall result is that the actuation of the coil 587 by the closing of the coin empty switch 590 in FIG. 7 will permit the vending of the desired product whenever the selling price of that product equals the registered credits or falls short of the registered credits by one or more dollars, but will prevent the vending of the desired product whenever the selling price of that product falls short of the registered credits in such a way as to require the dispensing of coins as change.

Bill Empty Circuits

The money-actuated device provided by the present invention has circuits which will permit bills to be inserted, and will permit products to be vended, even though the supply of bills available for change-making purposes is exhausted; and this is desirable because it will avoid shutting down of the money-actuated device merely because the supply of bills for change-making purposes is exhausted. However, those circuits will fully protect the patron against the loss of change by preventing the actuation of the selection relays in the event the selling price of the desired product falls short of the registered credits by a dollar or more. Those bill empty circuits include empty switches adjacent each of the currency storage tube and also include an exact bill stepper and a relay which controls that exact bill stepper.

The exact bill stepper is shown in FIG. 7, and it is denoted generally by the numeral 594. That exact bill stepper is inactive as long as there is a sufficient supply of bills available for change-making purposes; but that exact bill stepper comes into action as soon as the supply of bills available for change-making purposes is exhausted, and it will then participate in all subsequent cycles of operation wherein dollar credits are registered. Most of the fixed contacts of the exact bill stepper 594 are connected to contacts on the stepping switch 137 in FIG. 9; and, specifically, the contact 603 in FIG. 7 which corresponds to one dollar is connected to the contact 180 in FIG. 9 which corresponds to zero dollars. The contact 605 in FIG. 7 which corresponds to two dollars is connected to the contact 182 in FIG. 9 which corresponds to one dollar. Similarly, the rest of the contacts of the exact bill stepper 594 are connected to those contacts of the stepping switch 137 which represent one dollar less per contact. This interconnection of the contacts of the exact bill stepper 594 with the contacts of the stepping switch 137 enables the diode 628 in FIG. 8 to become effective whenever a credit of one dollar or more is registered by the money-actuated device.

If it is assumed that one or more of the bill empty switches 592 adjacent one or more of the currency storage tubes is closed, a circuit will be completed from conductor 30 via junction 338 in FIG. 7, one or more of the bill empty switches 592, junction 716, conductor 718 which extends into FIG. 8, coil 542, and junction 322 to conductor 32. The resulting energization of the coil 542 will close the contacts 542D and will shift the movable contacts 542A, 542B and 542C into engagement, respectively, with the left-hand contacts 542A, 542B and 542C. The shifting of the movable contacts 542C into engagement with the left-hand contact 542C will complete a circuit from conductor 32 via junction 651 in FIG. 7, bill empty lamp 658, conductor 706 which extends into FIG. 8, the right-hand and movable contacts 587D, the movable and left-hand contacts 542C, conductor 718 which extends into FIG. 7, junction 716, and then through one or more of the bill empty switches 592 and junction 338 to conductor 30. The shifting of the movable contact 542C away from the right-hand contact 542C will prevent energization of the coin empty lamp 653.

The shifting of the movable contact 542A out of engagement with the right-hand contact 542A will interrupt the circuit which normally connects the wiper 202 of the stepping switch 137 to the coil 565 whenever a credit deducting and vending cycle is to be initiated and all of the bill empty switches 592 are open. The shifting of the movable contact 542A into engagement with the left-hand contact 542A will, whenever no dollar credits have been registered, connect the diode 628 to the wiper 202. However, if one or more dollar credits have been registered, the shifting of the movable contact 542A into engagement with the left-hand contact 542A will not connect that diode to that wiper. This is desirable because the wipers 202 and 630 should be separated from each other in all positions of the wiper 630 other than its normal zero position. Further, this is desirable because it makes certain that in any moved position of the wiper 630, the wiper 202 will be unable to participate in the energization of the preliminary vend relay coil 565.

The shifting of the movable contact 542B out of engagement with the right-hand contact 542B keeps the coil 565 from being energized by some of the circuits which otherwise could be used to energize that coil. The shifting of the movable contact 542B into engagement with the left-hand contact 542B makes it possible to energize the coil 565 by means of circuits which were not previously capable of being completed.

The closing of the contacts 542D pre-sets a circuit which extends from conductor 32 via junction 602 in FIG. 7, electromagnet 598, conductor 712 which extends into FIG. 8, contacts 542D, conductor 272 which extends through FIGS. 7, 6, 5 and 4 into FIG. 3, contacts 264A, conductor 270 which extends through FIG. 4 into FIG. 5, junction 92, contacts 624F, contacts 60C, junction 94, conductor 58 which extends into FIG. 6, contacts 65, conductor 59, contacts 72C, junction 56, the right-hand and movable contacts 412A, junction 54, the upper and movable contacts of the delivery switches 419, 417, 415 and 414, and junction 52 and conductor 30. When this pre-set circuit is subsequently completed by the closing of the contacts 264A, both the stepping coil 598 of the exact bill stepper 594 and the stepping coil 164 of the stepping switch 137 will be energized and will cock the wipers 630 and 202.

It will be noted that under certain circumstances the money-actuated device of the present invention can dispense the desired product and can even dispense coins as change although the supply of bills available for change-making is exhausted. For example, if the selected product has a selling price equaling the registered credits and if the first digit of that selling price is zero the wiper 202 can be connected to the coil 565 of the preliminary vend relay via conductor 1449 which extends into FIG. 8, the movable and left-hand contact 309C, junctions 332 and 836, conductor 841 which extends into FIG. 7, contacts 601, wiper 630, conductor 840 which extends into FIG. 8, diode 628, the movable and left-hand contacts 542A, contacts 408A, the movable and left-hand contacts 409B, junction 834, contacts 411A, the movable and left-hand contacts 416D, contacts 421A, the movable and left-hand contacts 423B, junctions 832 and 830, conductor 502 which extends through FIGS. 7 and 6 into FIG. 5, contacts 469 and conductor 504 which extends into FIG. 6 to coil 565.

In the event a patron selects a product and the first digits of the selling price and of the registered credits are zero and the last digits of the selling price and of the registered credits are equal but the middle digit of the registered credit exceeds the middle digit of the selling price, a circuit will be completed from the wiper 202 via conductor 1449 which extends into FIG. 8, the movable and left-hand contacts 309C, junctions 332 and 836, conductor 841 that extends into FIG. 7, contacts 601, wiper 630, conductor 840 into FIG. 8, diode 628, the left-hand and movable contacts 542A, contacts 408A, the movable left-hand contacts 409B, junction 834, contacts 411A, the movable and right-hand contacts 416D, junction 833, contacts 587C, junctions 831 and 830, conductor 502 which extends through FIGS. 6 and 5 into FIG. 4, contacts 469, and conductor 504 which extends into FIG. 6 to 565.

In the event a patron selects a product and the first digits of the registered credits and of the selling price are zero and the second digits of the selling price and of the registered credits are equal and the last digit of the registered credits exceeds the last digit of the selling price, a circuit can be completed from wiper 202 via conductor 1449 which extends into FIG. 8, the movable and left-hand contacts 309C, junctions 332 and 836, conductor 841 which extends into FIG. 7, contacts 601, wiper 630, conductor 840 which extends into FIG. 8, diode 628, the left-hand and movable contacts 542A, contacts 408A, the left-hand and movable contacts 409B, junction 834, contacts 411A, the movable and left-hand contacts 416D, contacts 421A, the movable and right-hand contacts 423B, junction 833, contacts 587C, junctions 831 and 830, conductor 502 which extends through FIGS. 7 and 6 into FIG. 5, contacts 469, and conductor 504 which extends into FIG. 6 to coil 565.

If a patron actuates selection switch 401 when four dollars and sixty one cents have been registered on the stepping switches 48, 133 and 137, the selling price will equal the registered credits, and a circuit will be completed from conductor 30 via various components to the price setting pin 782 in FIG. 9 and then via horizontal bar 312, contact 189, diode 297, contact 186, conductor 845 which extends through FIGS. 9 and 8 into FIG. 7, contacts 609, wiper 630, conductor 840 which extends into FIG. 8, diode 628, the left-hand and movable contacts 542A, contacts 408A, the left-hand and movable contacts 409B, junction 834, contacts 411A, the left-hand and movable contacts 416D, contacts 421A, contacts 423B, junctions 832 and 830, conductor 502 which extends through FIGS. 7 and 6 into FIG. 5, contacts 469, conductor 504 which extends into FIG. 6, coil 565, and junctions 517, 515, 497 and 495 to conductor 32.

In the event a patron actuates the selection switch 401 when the first and last digits of the registered credits equal the first and last digits of the selling price but the middle digit of the registered credits exceeds the middle digit of the selling price, a circuit will be completed from conductor 30 via various components to the price setting pin 782 in FIG. 9 and then via horizontal bar 312, contact 189, diode 297, contact 186, conductor 845 which extends through FIG. 8 into FIG. 7, contact 609, wiper 630, conductor 840 which extends into FIG. 8, diode 628, the left-hand and movable contacts 542A, contacts 408A, the movable and left-hand contacts 409B, junction 834, contacts 411A, the movable and right-hand contacts 416D, junction 833, contacts 587C, junctions 831 and 830, conductor 502 which extends through FIGS. 7 and 6 into FIG. 5, contacts 469, conductor 504 which extends into FIG. 6, coil 565, and junctions 517, 515, 497 and 495 to conductor 32.

In the event a patron actuates selection switch 401 and the first and second digits of the registered credits and of the selling price are equal but the last digit of the registered credits exceeds the last digit of the selling price, a circuit will be completed from conductor 30 via various components to the price setting pin 782 in FIG. 9, horizontal bar 312, contact 189, diode 297, contact 186, conductor 845 which extends through FIG. 8 into FIG. 7, contact 609, wiper 630, conductor 840 which extends into FIG. 8, diode 628, the left-hand and movable contacts 542A, contacts 408A, the movable and left-hand contacts 409B, junction 834, contacts 411A, the movable and left-hand contacts 416D, contacts 421A, the movable and right-hand contacts 423B, junction 833, contacts 587C, junctions 831 and 830, conductor 502 which extends through FIGS. 7 and 6 into FIG. 5, contacts 469, conductor 504 which extends into FIG. 6, coil 565, and junctions 517, 515, 497 and 495 to conductor 32.

In the event a patron actuates selection switch 401 and the first digit of the registered credits exceeds the first digit of the selling price by one dollar and the middle and last digits of the registered credit fall short of the middle and last digits of the selling price, a circuit will be completed from the conductor 30 via various components to the price setting pin 782 in FIG. 9, horizontal bar 312, contact 189, conductor 846 which extends through FIG. 8 into FIG. 7, contact 611, wiper 630, conductor 840 which extends into FIG. 8, diode 628, the left-hand and movable contacts 542A, contacts 408A, the movable and right-hand contacts 409B, the movable and left-hand contacts 542B, contacts 587B, and then either contacts 418A or 424A, contacts 416A, junctions 832 and 830, conductor 502 which extends through FIGS. 7 and 6 into FIG. 5, contacts 469, conductor 504 which extends into FIG. 6, coil 565, and junctions 517, 515, 497 and 495 to conductor 32.

In the event a patron actuates selection switch 401 and the first digit of the registered credits exceeds the first digit of the selling price by one dollar and the middle digit of the registered credits falls short of the middle digit of the selling price and the last digit of the registered credits equals or exceeds the last digit of the selling price, a circuit will be completed from the conductor 30 via various components to the price setting pin 782 in FIG. 9, horizontal bar 312, contact 189, conductor 846 which extends through FIG. 8 into FIG. 7, contact 611, wiper 630, conductor 840 which extends into FIG. 8, diode 628, the left-hand and movable contacts 542A, contacts 408A, the movable and right-hand contacts 409B, the movable and left-hand contacts 542B, contacts 587B, contacts 424A, contacts 416A, junctions 832 and 830, conductor 502 which extends through FIGS. 7 and 6 into FIG. 5, contacts 469, conductor 504 which extends into FIG. 6, coil 565, and junctions 517, 515, 497 and 495 to conductor 32.

In the event a patron actuates selection switch 401 and the first digit of the registered credits exceeds the first digit of the selling price by one dollar and the middle digit of the registered credits exceeds the middle digit of the selling price and the last digit of the registered credits falls short of the selling price, the contacts 416A will be open and will interrupt the circuit which otherwise could extend from conductor 30 via various components to the price setting pin 782 in FIG. 9, horizontal bar 312, contact 189, conductor 846 which extends through FIG. 8 into FIG. 7, contact 611, wiper 630, conductor 840 which extends into FIG. 8, diode 628, the left-hand and movable contacts 542A, contacts 408A, the movable and right-hand contacts 409B, the movable and left-hand contacts 542B, contacts 587B, contacts 424A, now-open contacts 416A, junctions 832 and 830, conductor 502 which extends through FIGS. 7 and 6 into FIG. 5, contacts 469, conductor 504 which extends into FIG. 6, coil 565, and junctions 517, 515, 497 and 495 to conductor 32.

In the event a patron actuates selection switch 401 and the first digit of the registered credits exceeds the first digit of the selling price by one dollar and the middle digit of the registered credits equals the middle digit of the selling price and the last digit of the registered credits equals or exceeds the last digit of the selling price, both the contacts 418A and 424A will be open and will interrupt the circuit which otherwise could extend from conductor 30 via various components to the price setting pin 782 in FIG. 9, horizontal bar 312, contact 189, conductor 846 which extends through FIG. 8 into FIG. 7, contact 611, wiper 630, conductor 840 which extends into FIG. 8, diode 628, the left-hand and movable contacts 542A, contacts 408A, the movable and right-hand contacts 409B, the movable and left-hand contacts 542B, contacts 587B, either the now-open contacts 418A or the now-open contacts 424A, contacts 416A, junctions 832 and 830, conductor 502 which extends through FIGS. 7 and 6 into FIG. 5, contacts 469, conductor 504 which extends into FIG. 6, coil 565, and junctions 517, 515, 497 and 495 to conductor 32.

In the event a patron actuates selection switch 401 and the first digit of the registered credits exceeds the first digit of the selling price by more than one dollar, and the middle and last digits of the registered credits can be any integers but will be assumed to be zero, a circuit can not be completed to the preliminary vend relay coil 565 because the polarities of the diodes 287, 289, 291, 293 and 295, and will thus block all current flow, when the wiper 630 engages the contacts 613, 615, 625 and 627. Specifically, if a patron actuates selection switch 401 when the first digit of the registered credits is six and the middle and last digits are zero, the polarity of the diode 628 will be opposite to the polarity of the diode 295 and will thus block all flow of current through the circuit which otherwise could extend from conductor 30 via various components to the price setting pin 782 in FIG. 9, horizontal bar 312, contact 189, diode 295, conductor 300 which extends into FIG. 8, contacts 309D, conductor 302 which extends into FIG. 9, contact 191, conductor 847 which extends through FIG. 8 into FIG. 7, contact 613, wiper 630, conductor 840 which extends into FIG. 8, diode 628, the left-hand and movable contacts 542A, contacts 408A, the movable and right-hand contacts 409B, the movable and left-hand contacts 542B, contacts 587B, either the contacts 418A or the contacts 424A, contacts 416A, junctions 832 and 830, conductor 502 which extends through FIGS. 7 and 6 into FIG. 5, contacts 469, conductor 504 which extends into FIG. 6, coil 565, and junctions 517, 515, 497 and 495 to conductor 32.

These illustrations demonstrate the many combinations of registered credits and selling prices which will permit the vending of the desired product even though the supply of bills for change-making purposes is exhausted. In many of these illustrations, coins would be paid out as change; and hence it should be apparent that even though the supply of bills for change-making purposes is exhausted, the money-actuated device of the present invention will be able to vend products where the dispensing of coins as change is required.

Coin Empty and Bill Empty Circuits

Whenever the supply of bills for change-making purposes and the supply of coins for change-making purposes become exhausted, the money-actuated device of the present invention will illuminate an Insert Exact Change lamp and will also prevent the energization of the preliminary vend relay coil 565 whenever the actuation of selection relay would co-act with the then-registered credits to require the dispensing of change. Specifically, whenever one or more of the bill empty switches 592 in FIG. 7 is closed and the coin empty switch 590 also is closed, the relay coils 542 and 587 will be energized and will shift the movable contacts 542A, 542B, 542C, 587A and 587D to the left, will open the contacts 587B and 587C, and will close the contacts 587E. The shifting of the movable contact 587D out of engagement with the right-hand contact 587 will keep the lamp 658 from becoming illuminated, and the shifting of the movable contact 652C out of engagement with the right-hand contact 542C will keep the lamp 653 from becoming illuminated. The closing of the contacts 587E will complete a circuit which extends from conductor 32 via junction 651 in FIG. 7, Insert Exact Change lamp 649, conductor 708 which extends into FIG. 8, contacts 587E, conductor 714 which extends into FIG. 7, junction 716, conductor 718, one or more of the bill empty switches 592, and junction 332 to conductor 30. The completion of that circuit will advise patrons to insert the exact amount of money needed to match the selling price of the desired product.

Also, as a result of the energizations of the relay coils 542 and 587, all combinations of registered credits and selling prices which would require the dispensing of change will be incapable of effecting the energization of the preliminary vend coil 565. However, all combinations of registered credits and selling prices which do not require the dispensing of charge will be capable of effecting the energization of the preliminary vend coil 565.

For example, if a patron actuates selection switch 405 and the first digit of the registered credit is zero and the middle and last digits of the registered credits equal the middle and last digits of the selling price, a circuit will be completed from the conductor 30 via various components to the price setting pin 784 in FIG. 9, horizontal bar 312, contact 180, wiper 202, conductor 1449 which extends into FIG. 8, the movable and left-hand contacts 309C, junctions 332 and 836, conductor 841 which extends into FIG. 7, contacts 601, wiper 630, conductor 840 which extends into FIG. 8, diode 828, the left-hand and movable contacts 542A, contacts 408A, the movable and left-hand contacts 409B, contacts 411A, the movable and left-hand contacts 416D, contacts 421A, the movable and left-hand contacts 423B, junctions 832 and 830, conductor 502 which extends through FIGS. 7 and 6 into FIG. 5, contacts 469, conductor 504 which extends into FIG. 6, coil 565, and junctions 517, 515, 497 and 495 to conductor 32. Also, if a patron actuates selection switch 401 and the registered credits equal the selling price, a circuit will be completed from the conductor 30 via various components to the price setting pin 782 in FIG. 9, horizontal bar 189, diode 297, contact 186, conductor 845 which extends through FIG. 8 into FIG. 7, contact 609, wiper 630, conductor 840 which extends into FIG. 8, diode 628, the left-hand and movable contacts 542A, contacts 408A, the movable and left-hand contacts 409B, junction 834, contacts 411A, the movable and left-hand contacts 416D, contacts 421A, the movable and left-hand contacts 423B, junctions 832 and 830, conductor 502 which extends through FIGS. 7 and 6 into FIG. 5, contacts 469, conductor 504 which extends into FIG. 6, coil 565, and junctions 517, 515, 497 and 495 to conductor 32. These two illustrations are merely representative, because the desired product can be vended whenever the selling price equals the registered credits.

It will be noted that the money-actuated device of the present invention will be able to vend products and will be able to dispense bills as change, even though the supply of coins for change-making purposes has become exhausted. Also, it will be noted that the money-actuated device of the present invention will be able to vend products and will be able to dispense coins as change, even though the supply of bills for change-making purposes has become exhausted. As a result, patrons will not be disappointed, and the operator of the money-actuated device of the present invention will not needlessly lose sales, because of the exhaustion of the supply of coins or bills for change-making purposes.

*Automatic Change Payout Circuits*

In some trading areas, it may be desirable to have the money-actuated device of the present invention automatically dispense the change, if any, at the conclusion of each credit deducting and product vending cycle. To accomplish this result, it is only necessary to close the switch 360 in FIG. 5, because the closing of that switch presets a circuit to the relay coil 624S in FIG. 5. That circuit extends from conductor 30 in FIG. 6 via junction 52, the movable and upper contacts of the delivery switches 414, 415, 417 and 419, contacts 412G, switch 433, the movable and right-hand contacts 412E, conductor 350 which extends into FIG. 5, the upper and movable contacts of the selection switches 399, 401, 403, 402, 403 and 405, junction 57, the movable and right-hand contacts 60A, contacts 511, switch 360, junction 341, conductor 612 which extends through FIGS. 4, 3 and 2 into FIG. 1, contacts 545, conductor 614 which extends through FIG. 2 into FIG. 3, and junction 616, and then either through contacts 131B to junction 620 or through contacts 165D to junction 620 or through conductor 203D to junction 620, and then through conductor 622 which extends through FIG. 4 into FIG. 5, contacts 624E, coil 624S, and junction 506 to conductor 32. This circuit will not be completed until the end of a credit deducting and product vending cycle, and will be completed then only if there is a residual credit. This circuit will be completed by the shifting of the movable contacts 412E and 412G to the right and by the closing of the switch 433; and as that circuit is completed, the coil 624S will become energized and will initiate a change-dispensing cycle in the manner hereinbefore described.

*Actuation of Selection Switch 399*

The selection switch 399 and the selection relay 354 call for a selling price of eight dollars and ninety-nine cents; and it will be assumed that a five dollar bill and four one dollar bills will be inserted. The insertion of the five dollar bill will advance the wiper 202 into engagement with the contact 191 and the insertion of the four one dollar bills will advance that wiper into engagement with the contact 198.

Thereupon the selection switch 399 can be actuated, with consequent actuation of the selection relay 354. The resultant shifting of the movable contact 459 to the right will de-energize the coil 60 in FIG. 5 and will also energize the coil 309 in FIG. 8. Consequent shifting of the movable contact 60B to the right will energize the coil 223, and the shifting of the movable contact 60A to the right will de-energize the coil 471.

The shifting of the movable contacts 309A, 309B and 309C to the left in FIG. 8 will coact with the relative positionings of the price setting pins 780, 786 and 792 and the wipers 202, 143 and 126 to effect the energization of the relay coil 410 in FIG. 8 and to effect the de-energization of the relay coil 409 in FIG. 8 and thereby energize the relay coil 408 in FIG. 8. The resulting shifting of the movable contact 409B to the right and the closing of the contacts 408A will energize the preliminary vend coil 565 in FIG. 6; and thereafter the contacts 565C will open and de-energize the relay coil 466 in FIG. 6. The now-closed contacts 565A and 466A will energize the vend relay coil 412 in FIG. 6.

The resulting shifting of the movable contacts 412E to the left will energize the deductor motor 422 in FIG. 6; and during the ensuing credit deducting cycle, the wiper 126 will be advanced into engagement with the first contact 106 and the wiper 202 will be advanced into engagement with the zero contact 180. The wiper 143 will remain in engagement with the zero contact 144. As a result, those wipers will indicate a residual credit of one cent. The shifting of the movable contact of the switch 435 down into engagement with the fixed contact of that switch will initiate the vending cycle in the manner described hereinbefore.

At the time the vend relay coil 412 became energized, the memory relay 501 in FIG. 5 also became energized.

At the conclusion of the credit deducting and product vending cycles, the money-actuated device will come to rest. Thereafter the patron can actuate the change payout switch 44 in FIG. 5; and thereby actuate the relay 624 in FIG. 5. Thereupon, the solenoid 76, the electromagnet 531, the motor 948, the motor 880, and the motor 882 will be energized to cause the inserted money to pass to the cash boxes, to free the coin-ejecting slide adjacent one of the penny storage tubes, to cycle the cams adjacent the coin storage tubes and thereby effect the dispensing of the penny as change, and to cycle the cranks adjacent the currency storage tubes. Subsequently the homing relay coils 648 and 654 in FIG. 3 will pulse the wiper 126 to its zero position and the memory relay 501 will be restored. At such time, the money-actuated device of the present invention will, once again, be in its standby condition.

*Actuation of Selection Switch 401*

The selection switch 401 and the selection relay 355 call for a selling price of four dollars and sixty-one cents; and it will be assumed that a residual credit of four dollars and seventy-six cents is registered by the stepping switches 48, 133 and 137.

The selection switch 401 can be actuated to actuate the selection relay 355. The resultant shifting of the movable contact 373 to the right will de-energize the coil 60 in FIG. 5 and will also energize the coil 309 in FIG. 8. The consequent shifting of the movable contact 60B to the right will energize the coil 223, and the shifting of the movable contact 60A to the right will de-energize the coil 471.

The shifting of the movable contacts 309A, 309B and 309C to the left in FIG. 8 will coact with the relative positionings of the price setting pins 782, 788 and 794 and the wipers 202, 143 and 126 to effect the energization of the relay coils 408, 409, 410, 411, 418, 421 and 424 and to effect the de-energization of the relay coils 416 and 423. The closing of the contacts 408A and 411A, the shifting of the movable contact 416D to the right, and the holding of the movable contact 409B in its left-hand position will energize the preliminary vend coil 565 in FIG. 6; and thereafter the contacts 565C will open and de-energize the relay coil 466 in FIG. 6. The now-closed contacts 565A and 466A will energize the vend relay coil 412 in FIG. 6.

The resulting shifting of the movable contact 412E to the left will energize the deductor motor 422 in FIG. 6; and during the ensuing credit deducting cycle, the wipers 202 and 143 will receive an additional advancement because the contact 416C has been shifted to the right and the contacts 424C will be closed. These additional advancements are necessary to provide the "ten-complements" which are needed where no "borrowings" occur at the end of the credit deducting cycle, the wiper 202 will be in engagement with the zero contact 180, the wiper 143 will be in engagement with the first contact 146, and the wiper 126 will be in engagement with the fifth contact 114. As a result, those wipers will indicate a residual credit of fifteen cents. The shifting of the movable contact of the switch 435 down into engagement with the movable contact of that switch will initiate the vending cycle in the manner described hereinbefore.

At the time the vend relay coil 412 became energized the memory relay 501 in FIG. 5 also became energized.

At the conclusion of the credit deducting and product vending cycles, the money-actuated device will come to rest. Thereafter the patron can actuate the change payout switch 44 in FIG. 5; and thereby actuate the relay 624 in FIG. 5. Thereupon, the nickle electromagnet 764 in FIG. 10 and the dime electromagnet 762 in FIG. 10 must be energized; and those electromagnets will be energized by the energization of the relay coils 774 and 772 in FIG. 10. The coil 774 is energized by a circuit which extends from conductor 30 via junctions 96 and 311 in FIG. 6, contacts 315B, conductor 1450 which extends through FIG. 7 into FIG. 8, junction 1452, the right-hand and movable contacts 309A, conductor 324 which extends through FIGS. 9 and 10 into FIG. 11, wiper 126, contact 114, diode 494, conductor 775 which extends into FIG. 10, coil 774, junction 661, conductor 746, junctions 659, 657, 656, 647, 645, 643, 641, 640, 639, 637 in FIG. 9, 636, 635, and 634, conductor 633 which extends through FIGS. 8, 7 and 6 into FIG. 5, contacts 624A, contacts 507, and junction 508 to conductor 32. The resulting energization of the coil 774 will close the contacts 774B and will shift the movable contacts 774A and 774C to the left; but the closing of the contacts 774B and the shifting of the movable contact 774A are not significant at this time. The shifting of the movable contact 774C into engagement with the left-hand contact 774C will complete a circuit from conductor 30 via the movable and left-hand contacts 774C, contacts 770C, the nickel electromagnet 764, junction 659 to conductor 746 and thence to conductor 32 as described hereinbefore. The coil 772 is energized by a circuit which extends from conductor 30 via junctions 96 and 311 in FIG. 6, contacts 315B, conductor 1450 which extends through FIG. 7 into FIG. 8, junctions 1452 and 1453, the right-hand and movable contacts 309B, conductor 326 which extends through FIG. 9 into FIG. 10, wiper 143, contact 146, diode 384, relay coil 772, junction 657 to conductor 746 and thence to conductor 32 as described hereinbefore. The resulting energization of the coil 772 will close the contacts 772A to energize the dime electromagnet 762 by a circuit that extends from conductor 30 via junction 726 in FIG. 10, contacts 772A, the right-hand and movable contacts 770B, the dime electromagnet 762, and junction 656 to conductor 746 and thence to conductor 32 as described hereinbefore.

As the relay 624 was actuated, the solenoid 76, the motor 948, the motor 880, and the motor 882 were energized to cause the inserted money to pass to the cash boxes, to cycle the cams adjacent the coin storage tubes and thereby effect the dispensing of the dime and nickel as change, and to cycle the cranks adjacent the currency storage tubes. Subsequently, the homing relay coils 648 and 654 in FIG. 3 will pulse the wipers 126 and 143 to their zero positions and the memory relay 501 will be restored. At such time, the money-actuated device of the present invention will, once again, be in its standby condition.

*Actuation of Selection Switch 405*

The selection switch 405 and the selection relay 358 call for a selling price of ninety-seven cents; and it will be assumed that a residual credit of eight dollars and ninety-six cents is registered by the stepping switches 48, 133 and 137.

The selection switch 405 can be actuated to actuate the selection relay 358. The resultant shifting of the movable contact 385 to the right will de-energize the coil 60 in FIG. 5 and will also energize the coil 309 in FIG. 8. The consequent shifting of the movable contact 60B to the right will energize the coil 223, and the shifting of the movable contact 60A to the right will de-energize the coil 471.

The shifting of the movable contacts 309A, 309B and 309C to the left in FIG. 8 will coact with the relative positionings of the price setting pins 784, 790 and 796 and the wipers 202, 143, and 126 to effect the energization of the relay coils 408, 410, 411, 416, 418 and 423 in FIG. 8 and to effect de-energization of the relay coils 409, 421 and 424. The resulting shifting of the movable contact 409B to the right and the closing of the contacts 408A will energize the preliminary vend coil 565 in FIG. 6; and thereafter the contacts 565C will open and de-energize the relay coil 466 in FIG. 6. The now-closed contacts 565A and 466A will energize the vend relay coil 412 in FIG. 6.

The resulting shifting of the movable contact 412E to the left will energize the deductor motor 422 in FIG. 6; and during the ensuing credit deducting cycle, the wiper 126 will be advanced into engagement with the ninth contact 122, the wiper 143 will be advanced into engagement with the ninth contact 162, and the wiper 202 will be advanced into engagement with the seventh contact 194. As a result, those wipers will indicate a residual credit of seven dollars and ninety-nine cents. The shifting of the movable contact of the switch 435 down into engagement with the movable contact of that switch will initiate the vending cycle in the manner described hereinbefore.

At the time the vend relay coil 412 became energized the memory relay 501 in FIG. 5 also became energized.

At the conclusion of the credit deducting and product vending cycles, the money-actuated device will come to rest. Thereafter the patron can actuate the change payout switch 44 in FIG. 5; and thereby actuate the relay 624 in FIG. 5.

Thereupon the five dollar electronmagnet 660, the two dollar electromagnet 666, the fifty cent electromagnet 756, the quarter electromagnet 758, the two dime electromagnets 760 and 762 and the four penny electromagnets 523, 525, 529 and 531 must be energized. The electromagnets 666, 756, 758, 760 and 762 will be energized by the energization of the relay coils 754, 766, 768, 770 and 772.

The electromagnet 660 and the coil 754 are energized by a circuit which extends from conductor 30 via junctions 96 and 311 in FIG. 6, contacts 315B, conductor 1450 which extends through FIG. 7 into FIG. 8, junctions 1452 and 1453, the right-hand and movable contacts 309C, conductor 1449 which extends into FIG. 9, wiper 202 and contact 194; and then one branch of that circuit extends through diode 291, contact 192, diode 293, contact 191, diode 325, electromagnet 660 and junction 742 to junction 634 while the other branch of that circuit extends through diode 321, relay coil 754, junctions 637, 636 and 635, and conductor 746 to junction 634, and then through conductor 633 to conductor 32 as described hereinbefore. The energization of the coil 754 will open the contacts 754B and thereby prevent the energization of the one dollar electromagnet 668; and that energization will close the contacts 754A to complete the circuit to the two dollar electromagnet 666. That circuit extends from conductor 30, junction 720 in FIG. 9, the movable and right-hand contacts 752B, contacts 754A, electromagnet 666, to junction 745 and then through conductor 633 to conductor 32 as described hereinbefore. In this way, the five dollar electromagnet 660 and the two dollar electromagnet 666 are energized to release the currency ejectors adjacent thereto.

The penny electromagnets are energized by a circuit which extends from conductor 30 via junctions 96 and 311 in FIG. 6, contacts 315B, conductor 1450 which extends through FIG. 7 into FIG. 8, junction 1452, the right-hand and movable contacts 309A, conductor 324 which extends through FIGS. 9 and 10 into FIG. 11, wiper 126 to contact 122; and then one branch of that circuit extends through diode 486 and electromagnet 523 and junction 663 and conductor 746 to junction 661 in FIG. 10. A second branch extends through diode 251 and contact 120 and diode 488 and electromagnet 525 and junction 665 and conductor 746 to junction 661 in FIG. 10; and a third branch extends through diode 251 and contact 120 and diode 253 and contact 118 and diode 490 and electromagnet 529 and junction 667 and conductor 746 to junction 661 in FIG. 10. A fourth branch extends through diode 251 and contact 120 and diode 253 and contact 118 and diode 255 and contact 116 and diode 492 and electromagnet 531 and conductor 746 to junction 661 in FIG. 10; and the fifth branch extends through diode 251 and contact 120 and diode 253 and contact 118 and diode 255 and contact 116 and diode 257 and contact 114 and diode 494 and conductor 775 which extends into FIG. 10 and relay coil 774 to junction 661. Those branches re-combine at junction 661 and then extend to conductor 746 and thence to conductor 32 as described hereinbefore. This circuit will energize the four penny electromagnets 523, 525, 529 and 531 and will thereby free the penny-ejectors. Also, that circuit energized the coil 774 in FIG. 10; but the energization of that coil is not desirable at this time because that coil normally controls the nickel electromagnet 764. Any adverse results that might otherwise obtain from the energization of the coil 774 are obviated by the energizations of the relay coils 766, 768, 770 and 772.

These latter coils are energized by a circuit which extends from conductor 30 via junctions 96 and 311 in FIG. 6, contacts 315B, conductor 1450 which extends through FIG. 7 into FIG. 8, junctions 1452 and 1453, the right-hand and movable contacts 309B, conductor 326 which extends through FIG. 9 into FIG. 10, wiper 143 to contact 162; and then one branch of that circuit extends through diode 368 and coil 766 and junction 640 to junction 639. A second branch of that circuit extends through diode 269 and contact 160 and diode 370 and coil 768 and junction 643 to junction 639; and a third branch of that circuit extends through diode 269 and contact 160 and diode 271 and contact 158 and diode 372 and coil 770 and junction 647 to junction 639. A fourth branch of that circuit extends through diode 269 and contact 160 and diode 271 and contact 158 and diode 273 and contact 156 and diode 374 and coil 772 and junction 657 to junction 639; and the last branch of that circuit extends through diode 269 and contact 160 and diode 271 and contact 158 and diode 273 and contact 156 and diode 275 and contact 154 and diode 376 and electromagnet 756 to junction 639. Those branches re-combine at junction 639 and then extend to conductor 746 and thence to conductor 32 as described hereinbefore. This circuit will energize the fifty cent electromagnet 756 and will also energize the four relay coils 766, 768, 770, and 772. Thereupon the contacts 766A, 768A, 768D, 770A and 772A will close, the contacts 768B and 770C will close, and the movable contacts 768C and 770B will shift to the left.

The opening of the contacts 770C will keep the nickel electromagnet from being energized by the energization of the coil 774, and this is desirable because a nickel is not to be paid out at this time. The dime electromagnet 762 will be energized by a circuit which extends from conductor 30 via junction 726 in FIG. 10, contacts 772A, the movable and left-hand contacts 768C, the left-hand and movable contacts 774A, electromagnet 762 and junction 656 to junction 639. The dime electromagnet 760 will be energized by a circuit which extends from conductor 30 via junction 726 in FIG. 10, contacts 772A, contacts 766A, electromagnet 760, and junction 645 to junction 639. The quarter electromagnet will be energized by a circuit which extends from conductor 30 via junction 722 in FIG. 10, contacts 768A, the electromagnet 758 and junction 641 to junction 639. Those branches re-combine at junction 639 and then extend to conductor 746 and thence to conductor 32 as described hereinbefore.

In these ways, the fifty cent electromagnet 756, the quarter electromagnet 758, the two dime electromagnets 760 and 762, and the four penny electromagnets 523, 525, 529 and 531 are caused to release the coin ejectors adjacent to them. During the cycling of the motor 882, the cams adjacent those ejectors will free them and permit them to dispense a total of ninety cents in coins. During the cycling of the motor 880, the cranks adjacent the currency storage tubes for two dollars and five dollars will permit the ejectors adjacent those tubes to dispense a total of seven dollars. The bills and coins will aggregate the required seven dollars and ninety-nine cents.

As the money-actuated device approaches the end of its cycle of operation the solenoid 76 and the motor 948 will be energized to cause the inserted money to pass to the cash boxes. Subsequently, the homing relay coils 648 and 654 in FIG. 3 will pulse the wipers 202, 143 and 126 to their zero positions and the memory relay 501 will be restored. At such time, the money-actuated device of the present invention will, once again, be in its standby condition.

*Conclusion*

In the interests of brevity, the circuits through all of the payout electromagnets and payout coils have not been traced. However, those circuits can be readily traced. Those payout electromagnets and payout coils will be suitably energized whenever the differences between the registered credits and the selling prices require such energization. For example, when four dollars are to be paid out as change, the relay coils 750, 752 and 754 and the electromagnet 662 will be energized. When three dollars are to be paid out as change, the relay coils 752 and 754 and the electromagnet 664 will be energized. These relay coils and the other relay coils associated with the payout electromagnets are used to enable the money-actuated device of the present invention to use the minimum number of bills and coins in dispensing the required change.

Whenever one dollar in change is required, the electromagnet 668 will be energized, whenever two dollars in change are required, the electromagnet 666 will be energized, whenever three dollars in change are required, the electromagnet 664 will be energized, whenever four dollars in change are required, the electromagnet 662 will be energized, and whenever five dollars in change are required, the electromagnet 660 will be energized. Whenever six dollars in change are required, the electromagnets 668 and 660 will be energized, whenever seven dollars in change are required, the electromagnets 666 and 660 will be energized, whenever eight dollars in change are required, the electromagnets 662 and 660 will be energized, whenever nine dollars in change are required, the electromagnets 662 and 660 will be energized.

As long as the money-actuated device of the present invention has bills and coins available for change-making purposes, the patrons will be enabled to select and obtain any products which are not exhausted. Even when the supply of bills for change-making purposes has become exhausted, the money-actuated device of the present invention will still permit patrons to obtain products and change, where that change can be aggregated by coins. This is made possible by the exact bill stepper 594.

That exact bill stepper has the contacts thereof offset relative to the contacts of the stepping switch 137, so that the stepping switch contacts are connected to dollar-higher contacts on the exact bill stepper 594. This is important in permitting products to be vended when the differences between the registered credits and the selling prices do not exceed one dollar. For example, if the registered credit is five dollars, current will be able to flow directly to the credit sensing relays from the price setting pin 782 via the fifth lowermost horizontal bar 312, contact 189, conductor 846, contact 611, wiper 630, conductor 840 and diode 628. However, if the registered credit is six dollars, current will not be able to flow to the credit sensing relays from the price setting pin 782 via the fifth lowermost horizontal bar 312, contact 189, diode 295, contact 191, conductor 847, contact 613, wiper 630, conductor 840 and diode 628, because the polarity of the diode 628 will be opposite to the polarity of the diode 295. This means that the exact bill stepper will permit the vending of a product having a selling price of from four dollars and one cent to five dollars when a credit of five dollars has been registered but will not permit the vending of a product having a selling price of from four dollars and one cent to five dollars when a credit of six or more dollars has been registered.

If the selling price were to be exactly four dollars and if the registered credit were to be exactly five dollars, the exact bill stepper would permit current to flow from the price setting pin 782 via the fifth lowermost horizontal bar 312, contact 191, diode 295, contact 189, wiper 630, conductor 840 and diode 628, because the polarity of the diode 628 will be the same as the polarity of the diode 295. However, the credit sensing relays will not energize the preliminary vend relay coil 565, because the registered credit is a full dollar greater than the selling price, all as described hereinbefore. If desired, the contacts of the exact bill stepper could be mounted on the stepping switch 137, and the wiper 630 could be mechanically linked to, and driven by, the wiper 202. Where that is done, the coils 598 and 600 in FIG. 7 could be deleted.

The price setting pin 786 and all of the other price setting pins are parts of the credit-sensing circuits which can be completed by contacts on the selection relays. It would be undesirable for those circuits to be completed during a time when money inserted by a patron was registering credits. The money-actuated device of the present invention keeps the credit-sensing circuits from being completed during a time when money inserted by a patron is registering credits; and it does so by connecting the money-actuated switches 34, 36, 38, 40 and 42 plus contacts controlled by the coils 476, 1476, 215 and 145 in series with those contacts of the selection relays which normally are actuatable to complete the credit-sensing circuits.

Whereas the drawing and accompanying description have shown and described one preferred embodiment of the present invention, it should be apparent to those skilled in the art that various changes may be made in the form of the invention without affecting the scope thereof.

What I claim is:

1. In a money-actuated device, a plurality of stepping switches that are adapted to register credits, a money registering circuit that responds to the insertion of money to register credits on said stepping switches by advancing the wipers relative to the contacts of those stepping switches, diodes connected between the contacts of said stepping switches, price-setting members that can be connected to the contacts of said stepping switches to determine selling prices, credit sensing relays, and further diodes that are connected intermediate said stepping switches and some of said credit sensing relays, said wipers responding to the insertion of differing amounts of money to register different values of credit on said stepping switches, said wipers coacting with said price-setting members to shift the polarities of some of said diodes connected between the contacts of said stepping switches, said wipers coacting with said price-setting members to apply A.C. voltage to said further diodes whenever the registered credits equal the selling price of the desired product, said wipers coacting with said price-setting members to apply D.C. voltage of one polarity to said further diodes whenever the registered credits exceed the selling price of the desired product, and said wipers coacting with said price-setting members to apply D.C. voltage of the opposite polarity to said further diodes whenever the registered credits fall short of the selling price of the desired product, said further diodes being oriented to pass current whenever A.C. voltage is applied to them and being oriented to pass current whenever D.C. voltage of said one polarity is applied to them, said further diodes being oriented to block current whenever D.C. voltage of said opposite polarity is applied to them.

2. In a money-actuated device, a plurality of stepping switches that are adapted to register credits, a money registering circuit that responds to the insertion of money to register credits on said stepping switches, diodes connected between the contacts of said stepping switches, and credit sensing relays, said stepping switches and said diodes coacting to apply A.C. voltage to at least one of said credit sensing relays whenever the registered credits equal the selling price of the desired product, to apply D.C. voltage of a predetermined polarity to at least one of said credit sensing relays whenever the registered credits exceed the selling price of the desired product, and to apply D.C. voltage of another polarity to at least one of said credit sensing relays whenever the registered credits fall short of the selling price of the desired product.

3. In a money-actuated device, a plurality of spaced contacts that can be used in the registering of credits, a money registering circuit that can respond to the insertion of money to register credits by means of those spaced contacts, diodes that are connected intermediate said spaced contacts, and credit sensing relays, said diodes being adapted to respond to the registering of credits equaling the selling price of the desired product to apply A.C. voltage to at least one of said credit sensing relays, and to respond to the registering of credits in excess of the selling price of the desired product to apply D.C. voltage of a predetermined polarity to at least one of said credit sensing relays, and to respond to the registering of credits which fall short of the selling price of the desired product to apply D.C. voltage of a different polarity to at least one of said credit sensing relays.

4. In a money-actuated device, a plurality of stepping switches that are adapted to register credits, a money registering circuit that responds to the insertion of money to register credits on said stepping switches, diodes connected between the contacts of said stepping switches, credit sensing relays, and further diodes that are connected intermediate said stepping switches and some of said credit sensing relays, said stepping switches and said diodes and said further diodes coacting to apply A.C. voltage to at least one of said credit sensing relays whenever the registered credits equal the selling price of the desired product, to apply D.C. voltage of a predetermined polarity to at least one of said credit sensing relays whenever the registered credits exceed the selling price of the desired product, and to apply D.C. voltage of another polarity to at least one of said credit sensing relays whenever the registered credits fall short of the selling price of the desired product.

5. In a money-actuated device, a plurality of stepping switches that are adapted to register credits, a money registering circuit that responds to the insertion of money to register credits on said stepping switches, diodes connected between the contacts of said stepping switches, credit sensing relays, change-dispensing elements, and vend-controlling members, said stepping switches and said diodes coacting to apply A.C. voltage to at least one of said credit sensing relays whenever the registered credits equal the selling price of the desired product, and thereby actuate said vend-controlling members to apply D.C. voltage of a predetermined polarity to at least one of said credit sensing relays whenever the registered credits exceed the selling price of the desired product and thereby actuate said change-dispensing elements and said vend-controlling members, and to apply D.C. voltage of another polarity to at least one of said credit sensing relays whenever the registered credits fall short of the selling price of the desired product and thereby not actuate either said change dispensing elements or said vend-controlling members.

6. In a money-actuated device, a stepping switch that has a plurality of spaced contacts and a wiper, said wiper being movable relative to said contacts to register credits, a selection switch that is adapted to apply power to one of said contacts, diodes connected between said contacts, said diodes being oriented so current can flow through said contacts from the lowest value to the highest value contacts of said switch, said diodes and said wiper coacting whenever said selection switch is actuated and said wiper is in engagement with said one contact to provide an A.C. voltage, said diodes and said wiper coacting whenever said selection switch is actuated and said wiper is in engagement with a contact above said one contact to provide a D.C. voltage of a predetermined polarity.

7. In a money-actuated device, a plurality of spaced contatcs and a contact that is movable relative to said spaced contacts to register credits, a money registering circuit that can respond to the insertion of money to move said movable contact relative to said spaced contacts to register credits on said spaced contacts, diodes connected intermediate said spaced contacts, electrically-operated change-dispensing elements, and further diodes intermediate said spaced contacts and said electrically-operated change-dispensing elements, said diodes intermediate said spaced contacts and said diodes intermediate said contacts and said electrically-operated change dispensing devices coacting to help constitute a static determinant which can pay out change corresponding to the credits registered on said contacts.

8. In a money-actuated device, a plurality of spaced contacts that can be used to register credits, a money registering circuit that can respond to the insertion of money to register credits on said spaced contacts, diodes connected intermediate said spaced contacts, electrically-operated change-dispensing elements, and further diodes intermediate said spaced contacts and said electrically-operated change-dispensing elements, said diodes intermediate said spaced contacts and said diodes intermediate said contacts and said electrically-operated change dispensing devices coacting to pay out change corresponding to the credits registered on said contacts.

9. In a money-actuated device, a credit registering circuit, a credit deducting circuit and a change-making circuit, a switch that can be set in one position to respond to actuation of said credit-deducting circuit to initiate a cycle of operation of said change-making circuit where a residual credit remains at the completion of the cycle of operation of the credit deducting circuit or that can be set in a second position to permit said money-actuated device to come to rest without an initiation of the change-making circuit.

10. In a money-actuated device, a credit registering circuit, a selection circuit, a change-dispensing circuit, a product vending circuit, a credit sensing circuit, and an Insert Exact Change lamp, said selection circuit and said credit sensing circuit coacting, whenever the credits registered by said credit registering circuit exceed the selling price of the product selected by said selection circuit and the change-dispensing circuit has an insufficient supply of change, to prevent actuation of said product vending circuit, said change-dispensing circuit energizing said Insert Exact Change lamp whenever said change-dispensing circuit has an insufficient supply of change.

11. In a money-actuated device, a credit registering circuit, a selection circuit, a change-dispensing circuit, a product vending circuit, a credit sensing circuit, said selection circuit and said credit sensing circuit coacting, whenever the credits registered by said credit registering circuit exceed the selling price of the product selected by said selection circuit and the change-dispensing circuit has an insufficient supply of change, to prevent actuation of said product vending circuit.

12. In a money-actuated device, a credit registering circuit, a selection circuit, a change-dispensing circuit, a product vending circuit, a credit sensing circuit, said selection circuit and said credit sensing circuit coacting, whenever the credits registered by said credit registering circuit equal the selling price of the product selected by said selection circuit and the change-dispensing circuit has an insufficient supply of change, to actuate said product vending circuit but said selection circuit and said credit sensing circuit coacting, whenever the credits registered by said credit registering circuit exceed the selling price of the product selected by said selection circuit and the change-dispensing circuit has an insufficient supply of change, to prevent actuation of said product vending circuit.

13. In a money-actuated device, a credit registering circuit, a selection circuit, a change-dispensing circuit, a product vending circuit, a credit sensing circuit, and an Insert Exact Change lamp, said selection circuit and said credit sensing circuit coacting, whenever the credits registered by said credit registering circuit equal the selling price of the product selected by said selection circuit and the change-dispensing circuit has an insufficient supply of change, to actuate said product vending circuit but said selection circuit and said credit sensing circuit coacting, whenever the credits registered by said credit registering circuit exceed the selling price of the product selected by said selection circuit and the change-dispensing circuit has an insufficient supply of change, to prevent actuation of said product vending circuit, said change-dispensing circuit energizing said Insert Exact Change lamp whenever said change-dispensing circuit has an insufficient supply of change.

14. In a money-actuated device, a product vending circuit, a credit registering circuit, a selection circuit, a coin-dispensing circuit, a bill-dispensing circuit, a credit sensing circuit, a Coin Empty lamp, a Bill Empty lamp, and an Insert Exact Change lamp, said Coin Empty lamp being illuminated whenever said coin-dispensing circuit has an insufficient supply of coins, said Bill Empty lamp being illuminated whenever said bill-dispensing circuit has an insufficient supply of bills, said Insert Exact Change lamp being illuminated whenever said coin-dispensing circuit has an insufficient supply of coins and said bill-dispensing circuit has an insufficient supply of bills.

15. In a money-actuated device, a product vending circuit, a credit registering circuit, a selection circuit, a coin-dispensing circuit, a bill-dispensing circuit, a Coin Empty lamp, a Bill Empty lamp, and an Insert Exact Change lamp, said selection circuit and said credit sensing circuit coacting, whenever the credits registered by said credit registering circuit exceed the selling price of the product selected by said selection circuit and said coin-dispensing circuit has an insufficient supply of coins and said bill-dispensing circuit has an insufficient supply of bills to prevent actuation of said product vending circuit, said Coin Empty lamp being illuminated whenever said coin-dispensing circuit has an insufficient supply of coins, said Bill Empty lamp being illuminated whenever said bill-dispensing circuit has an insufficient supply of bills, said Insert Exact Change lamp being illuminated whenever said coin-dispensing circuit has an insufficient supply of coins and said bill-dispensing circuit has an insufficient supply of bills.

16. In a money-actuated device, a product vending circuit, a credit registering circuit, a selection circuit, a coin-dispensing circuit, a credit sensing circuit, a Coin Empty lamp, said selection circuit and said credit sensing circuit coacting, whenever the credits registered by said credit registering circuit exceed the selling price of the product selected by said selection circuit by an amount requiring the dispensing of coins as change and said coin-dispensing circuit has an insufficient supply of coins to prevent actuation of said product vending circuit, said Coin Empty lamp being illuminated whenever said coin-dispensing circuit has an insufficient supply of coins.

17. In a money-actuated device, a product vending circuit, a credit registering circuit, a selection circuit, a coin-dispensing circuit, a credit sensing circuit, a Coin Empty lamp, said selection circuit and said credit sensing circuit coacting, whenever the credits registered by said credit registering circuit equal the selling price of the product selected by said selection circuit to actuate the product vending circuit but said selection circuit and said credit sensing circuit coacting, whenever the credits registered by said credit registering circuit exceed the selling price of the product selected by said selection circuit by an amount requiring the dispensing of coins as change and said coin-dispensing circuit has an insufficient supply of coins to prevent actuation of said product vending circuit, said Coin Empty lamp being illuminated whenever said coin-dispensing circuit has an insufficient supply of coins.

18. In a money-actuated device, a product vending circuit, a credit registering circuit, a selection circuit, a coin-dispensing circuit, and a credit sensing crcuit, said selection circuit and said credit sensing circuit coacting, whenever the credits registered by said credit registering circuit equal the selling price of the product selected by said selection circuit to actuate the product vending circuit but said selection circuit and said credit sensing circuit coacting, whenever the credits registered by said credit registering circuit exced the selling price of the product selected by said selection circuit by an amount requiring the dispensing of coins as change and said coin-dispensing circuit has an insufficient supply of coins to prevent actuation of said product vending circuit.

19. In a money-actuated device, a product vending circuit, a credit registering circuit, a selection circuit, a bill-dispensing circuit, a credit sensing circuit, and a Bill Empty lamp, said selection circuit and said credit sensing circuit coacting, whenever the credits registered by said credit registering circuit equal the selling price of the product selected by said selection circuit to actuate the product vending circuit but said selection circuit and said credit sensing circuit coacting, whenever the credits registered by said credit registering circuit exceed the selling price of the product selected by said selection circuit by an amount requiring the dispensing of bills as change and said bill-dispensing circuit has an insufficient supply of bills to prevent actuation of said product vending circuit.

20. In a money-actuated device, a product vending circuit, a credit registering circuit, a selection circuit, a bill-dispensing circuit, and a credit sensing circuit, said selection circuit and said credit sensing circuit coacting, whenever the credits registered by said credit registering circuit equal the selling price of the product selected by said selection circuit to actuate the product vending circuit but said selection circuit and said credit sensing circuit coacting, whenever the credits registered by said credit registering circuit exceed the selling price of the product selected by said selection circuit by an amount requiring the dispensing of bills as change and said bill-dispensing circuit has an insufficient supply of bills to prevent actuation of said product vending circuit.

21. In a credit-registering device, a plurality of stepping switches that are adapted to register credits, diodes connected between the contacts of said stepping switches, and a credit-deducting circuit that includes diodes which can during the deduction of credits supply power to cause stepping of said stepping switches, said diodes of said credit-deducting circuit coacting with said diodes connected between said contacts of said stepping switches to help sense the credits registered by said stepping switches.

22. In a credit-registering device, a stepping switch that is adapted to register credits and that has a wiper, spaced contacts engageable by said wiper and a coil to advance said wiper, diodes connected between said contacts of said stepping switch, and a credit-deducting circuit that includes a rotary selection switch and a diode, said credit-deducting circuit being adapted as said rotary selection switch is actuated during the deducting of credits to cause actuation of said advancing coil of said stepping switch, said diode and said rotary selection switch coacting with said diodes connected between said contacts of said stepping switch to provide the required actuations of said advancing coil during the deducting of credits.

23. In a credit-registering device, a plurality of stepping switches that are adapted to register credits, diodes connected between the contacts of said stepping switches, and a credit-deducting circuit that includes diodes which can during the deduction of credits supply power to cause stepping of said stepping switches, said diodes of said credit-deducting circuit coacting with said diodes connected between said contacts of said stepping switches to help sense the credits registered by said stepping switches, said diodes connected between said contacts of said stepping switches being connected and oriented to have the same polarities.

24. In a credit-registering device, a plurality of stepping switches that are adapted to register credits, diodes connected between the contacts of said stepping switches, and a credit-deducting circuit that includes diodes which can during the deduction of credit supply power to cause stepping of said stepping switches, said diodes of said credit-deducting circuit coacting with said diodes connected between said contacts of said stepping switches to help sense the credits registered by said stepping switches, said diodes of said credit-deducting circuit being selectively connectable to said diodes connected between said contacts of said stepping switches to have the same or opposite polarities.

25. In a credit-registering device, a stepping switch that is adapted to register credits and that has a wiper, spaced contacts engageable by said wiper and a coil to advance said wiper, diodes connected between said contacts of said stepping switch, and a credit-deducting circuit that includes a rotary selection switch and a diode, said credit-deducting circuit being adapted as said rotary selection switch is actuated during the deducting of credits to cause actuation of said advancing coil of said stepping switch, said diode and said rotary selection switch coacting with said diodes connected between said contacts of said stepping switch to provide the required actuations of said advancing coil during the deducting of credits, said diodes connected between said contacts of said stepping switch being connected to have the same polarities.

26. In a credit-registering device, a stepping switch that is adapted to register credits and that has a wiper, spaced contacts engageable by said wiper and a coil to advance said wiper, diodes connected between said contacts of said stepping switch, and a credit-deducting circuit that includes a rotary selection switch and a diode, said credit-deducting circuit being adapted as said rotary selection switch is actuated during the deducting of credits to cause actuation of said advancing coil of said stepping switch, said diode and said rotary selection switch coacting with said diodes connected between said contacts of said stepping switch to provide the required actuations of said advancing coil during the deducting of credits, said diode of said credit-deducting circuit being selectively connectable to said diodes connected between said contacts of said stepping switch to have the same or opposite polarity.

27. In a credit-registering device, a stepping switch that is adapted to register credits and that has a wiper, spaced contacts engageable by said wiper and a coil to advance said wiper, diodes connected between said contacts of said stepping switch, and a credit-deducting circuit that includes a multi-contact switch and a diode, said multi-contact switch having the contacts thereof connected to said contacts of said stepping switch, said diode of said credit-deducting circuit being connectable to various of said contacts of said stepping switch to pre-set a circuit through said stepping coil and said multi-contact switch, said multi-contact switch being adapted to complete said pre-set circuit and to actuate said stepping coil whenever the connection between said diode of said credit-deducting circuit and one of said contacts of said stepping switch renders the polarities of said diode of said credit-deducting circuit and diodes connected between said contacts of said stepping switch the same.

28. In a money-actuated device, a vending circuit, a credit registering circuit, a money registering circuit that can respond to the insertion of money to register credits on said credit registering circuit, a first credit sensing relay that corresponds to one digit of each credit registered on said credit registering circuit and that is connectable to said credit registering circuit, a second credit sensing relay that also corresponds to said one digit of each credit registered on said credit registering circuit and that is connectable to said credit registering circuit by contacts on the first said credit sensing relay, and a third credit sensing relay which also corresponds to said one digit of each credit registered on said credit registering circuit and which is responsive to the contacts of the first two credit sensing relays and which has contacts that can initiate a cycle of operation of said vending circuit.

29. In a money-actuated device, a vending circuit, a credit registering circuit, a first credit sensing relay connectable to said credit registering circuit, a second credit sensing relay that is connectable to said credit registering circuit by contacts on the first said credit sensing relay, and a third credit sensing relay which is responsive to the contacts of the first two credit sensing relays and which has contacts that can initiate a cycle of operation of said vending circuit.

30. In a money-actuated device, a vending circuit, a credit registering circuit which can register plural digit credits, a first credit sensing relay connectable to said credit registering circuit, a second credit sensing relay that is connectable to said credit registering circuit by contacts on the first said credit sensing relay, and a third credit sensing relay which is responsive to the contacts of the first two credit sensing relays and which has contacts that can initiate a cycle of operation of said vending circuit, said second credit sensing relay being energized whenever the value of one digit of each credit registered on said credit registering circuit equals the value of the corresponding digit of a selling price of a product to be vended by said money-actuated device.

31. In a money-actuated device, a vending circuit, a credit registering circuit which can register plural digit credits, a first credit sensing relay connectable to said credit registering circuit, a second credit sensing relay that is connectable to said credit registering circuit by contacts on the first said credit sensing relay, and a third credit sensing relay which is responsive to the contacts of the first two credit sensing relays and which has contacts that can initiate a cycle of operation of said vending circuit, all of said credit sensing relays being energized whenever the value of one digit of each credit registered on said credit registering circuit equals the value of the corresponding digit of a selling price of a product to be vended by said money-actuated device, one of said credit sensing relays being de-energized whenever the value of said one digit of each credit registered on said credit registering circuit exceeds the value of the corresponding digit of the selling price.

32. In a money-actuated device, a vending circuit, a credit registering circuit, a first credit sensing relay connectable to said credit registering circuit, a second credit sensing relay that is connectable to said credit registering circuit by contacts on the first said credit sensing relay, a third credit sensing relay which is responsive to the contacts of the first two credit sensing relays and which has contacts that can initiate a cycle of operation of said vending circuit, a change-making circuit, and a switch that is actuatable whenever the supply of change in said change-making circuit is exhausted, said switch and said relays coacting to permit actuation of said vending circuit whenever the registered credit equals the selling price or does not require change for the digit of said registered credit corresponding to said relays.

33. In a money-actuated device, a vending circuit, a credit registering circuit, a first credit sensing relay connectable to said credit registering circuit, a second credit sensing relay that is controlled by the first said credit sensing relay, and a third credit sensing relay that is controlled by the first two credit sensing relays.

34. In a money-actuated device, a vending circuit, a credit registering circuit, a first credit sensing relay connectable to said credit registering circuit, a second credit sensing relay that is controlled by the first said credit sensing relay, and a third credit sensing relay that is controlled by the first two credit sensing relays, all of said credit sensing relays being energized whenever the registered credit equals the selling price, at least one of said relays being de-energized whenever the registered credit exceeds said selling price.

35. In a money-actuated device, a credit registering circuit, a money registering circuit that can respond to the insertion of money to register credits on said credit registering circuit, a selection switch, a selection relay that has a setting coil and a re-setting coil and mechanically-latched armatures for said coils, a vending circuit that can vend a product selected by actuation of said setting coil of said selection relay if the credits registered on said credit registering circuit equal or exceed the price of said product, and a re-setting circuit that can, subsequent to the vending of the selected product, re-set said re-setting coil of said selection relay.

36. In a money-actuated device, a credit registering circuit, a money registering circuit that can respond to the insertion of money to register credits on said credit registering circuit, a selection switch, a selection relay that has a setting coil and a re-setting coil and mechanically-latched armatures for said coils, a vending circuit that can vend a product selected by actuation of said setting coil of said selection relay if the credits registered on said credit registering circuit equal or exceed the price of said product, and a re-setting circuit that can, subsequent to the vending of the selected product, re-set said re-setting coil of said selection relay, said setting coil shifting the armature thereof upon the energization thereof, said armature thereafter remaining in shifted position until the energization of said re-setting coil, said armature "remembering" the actuation of said setting coil despite power failures.

37. In a money-actuated device, a credit registering circuit, a money registering circuit that can respond to the insertion of money to register credits on said credit registering circuit, a selection switch and a selection relay that has a setting coil and a re-setting coil and mechanically-latched armatures, said selection switch being adapted to energize said setting coil of said selection relay if the credits registered on said credit registering circuit equal or exceed the price of said product whenever said selection switch is actuated by a patron, said setting coil responding to the energization thereof to shift said mechanically-latched armatures and thereby disconnect itself from said selection switch, whereby prolonged actuation of said selection switch by a patron cannot cause undue power consumption by the said setting coil and cannot cause a consequent breakdown of said setting coil.

38. In a money-actuated device, a credit registering circuit, a money registering circuit that can respond to the insertion of money to register credits on said credit registering circuit, a selection switch and a selection relay that has a setting coil and a re-setting coil, said setting coil being adapted to be energized upon actuation of said selection switch, said re-setting coil being re-settable only after said selection switch has returned to its normal position, whereby re-setting of said re-setting coil cannot occur in the event said selection switch remains stuck in its actuated position.

39. In a money-actuated device, a credit registering circuit, a money registering circuit that can respond to the insertion of money to register credits on said credit registering circuit, a selection switch, a selection relay, a vending circuit, said selection relay having a re-setting coil, said re-setting coil being adapted to be energized only after the completion of a cycle of operation of said vending circuit, whereby said re-setting coil will remain de-energized between the time a selection is made by actuation of said selection switch and the time the desired product has been vended.

40. In a money-actuated device, a switch which has a wiper movable relative to the contacts thereof, diodes connected intermediate said contacts, a stepping coil to advance said wiper, a deductor switch having the contacts thereof connected to said contacts of said switch, and a further diode in the circuit of said deductor switch, said further diode being adapted to cause energization of said stepping coil, said diodes connected intermediate the contacts of the first said switch coacting with said further diode to keep said further diode from causing energization of said stepping coil as the wiper of said deductor switch moves past contacts corresponding to the contacts of the first said switch intermediate the zero contact of said switch and the contact with which said wiper is in engagement and subsequently permitting said stepping coil to be energized as said deductor switch engages further contacts thereof.

41. In a money-actuated device, a credit registering circuit, a vending circuit, a change-making circuit, and a credit sensing circuit, said credit sensing circuit and said change-making circuit coacting to prevent initiation of said vending circuit in the event the supply of change available for change-making purposes is insufficient but permitting actuation of said vending circuit in the event the registered credits equal the selling price of the desired product.

42. In a money-actuated device, a switch which has a wiper movable relative to the contacts thereof, diodes connected intermediate said contacts, a stepping coil to advance said wiper, a deductor switch having the contacts thereof connected to said contacts of said switch, and a further diode in the circuit of said deductor switch, said deductor switch and said further diode being adapted during the deducting of credits to cause energization of said stepping coil, said further diode coacting with the diodes connected intermediate the contacts of the first said switch to selectively block energization of said stepping coil after said credits have been deducted.

43. In a money-actuated device, a currency detector, a bill registering circuit which can register the values of bills accepted by said currency detector, a coin-registering circuit, an escrow for coins, an escrow for bills that can receive and hold bills which have been accepted by said currency detector and which have had the values thereof registered by said bill registering circuit, a money-returning circuit which can be actuated to effect the return of coins and bills from said escrows to the patron, and an accept money circuit which can direct said bills or coins to the cash box.

44. In a money-actuated device, a currency detector, a bill registering circuit which can register the values of bills accepted by said currency detector, an escrow for bills that can receive and hold bills which have been accepted by said currency detector and which have had the values thereof registered by said bill registering circuit, a money-returning circuit which can be actuated to effect the return of bills from said escrow, and an accept money circuit which can direct said bills to the cash box.

45. In a money-actuated device, a currency detector, a bill validating circuit which can register the values of bills accepted by said currency detector, an escrow for bills that can receive and hold bills which have been accepted by said currency detector and which have had the values thereof registered by said bill registering circuit, a money-returning circuit, and a cash box circuit, said bill validating circuit being adapted to operate said escrow for short periods of time after a bill has been validated whereby said escrow can grasp said bill and move just far enough to accept and hold said validated bill, said money-return circuit being adapted to energize said bill escrow for a period long enough to enable said bill escrow to move the maximum number of bills held thereby toward the exterior of the money-actuated device, said cash box circuit being adapted to energize said bill escrow for a period long enough to enable all of the bills held thereby to be directed to the cash box.

46. In a money-actuated device, a change-dispensing circuit, a stepping switch that is adapted to establish credits, an exact money stepper, a money registering circuit that can respond to the insertion of money to establish credits, and means responsive to the amount of change available for said change-dispensing circuit, said means being adapted to connect said money registering circuit to said stepping switch to register credits on said stepping switch as long as said change-dispensing circuit has an adequate supply of change and that is adapted to connect said money registering circuit to said exact money stepper to establish credits on said exact money stepper whenever said change-dispensing circuit does not have an adequate supply of change.

47. In a money-actuated device, an electrically-operated money ejector, a plurality of contacts that are disposable in different relative positions to indicate whether or not said electrically-operated money ejector must be actuated, diodes intermediate some of said contacts, and a further diode intermediate said electrically-operated money ejector and at least one of said contacts, said further diode coacting with said one contact and with a diode connected to said one contact to permit current to flow to said electrically-operated money ejector and thereby actuate said electrically-operated money ejector whenever said contacts are in a predetermined relation, said further diode coacting with said one contact and with another said diode to block current flow to said electrically-operated money ejector and thereby prevent actuation of said electrically-operated money ejector whenever said contacts are in a further predetermined relation.

48. In a money-actuated device, a plurality of electrically-operated money ejectors, one combination of said electrically-operated money ejectors being energizable to provide a predetermined combination of change, a second and different combination of said electrically-operated money ejectors being energizable to provide a different predetermined combination of change, and relays with contacts that selectively interconnect said electrically-operated money ejectors to actuate said one combination of said electrically-operated money ejectors or to actuate said second and different combination of said electrically-operated money ejectors, said contacts of said relays preventing actuation of any of said electrically-operated money ejectors which are not part of a currently-actuated combination of electrically-operated money ejectors.

49. In a money-actuated device, a multi-contact switch with a wiper, electrically-operated money ejectors, diodes connected between the contacts of said multi-contact switch, further diodes connected between said electrically-operated money ejectors and said contacts of said multi-contact switch, said wiper being connectable to a source of power and being engageable with various of said contacts of said multi-contact switch to selectively energize or not energize one or more of said electrically-operated money ejectors.

50. In a money-actuated device, a multi-contact switch with a wiper, electrically-operated money ejectors, diodes connected between the contacts of said multi-contact switch, further diodes connected between said electrically-operated money ejectors and said contacts of said multi-contact switch, said wiper being connectable to a source of power and being engageable with various of said contacts of said multi-contact switch to selectively energize or not energize one or more of said electrically-operated money ejectors, the first said diodes have the same polarities whereby they can serially pass current, said wiper selectively connecting one or more of said first diodes in blocking relation with one of said further diodes.

51. In a money-actuated device, a multi-contact switch with a wiper, electrically-operated money ejectors, diodes connected between the contacts of said multi-contact switch, further diodes connected between said electrically-operated money ejectors and said contacts of said multi-contact switch by the contacts on relays, said wiper being connectable to a source of power and being engageable with various of said contacts of said multi-contact switch to selectively energize or not energize one or more of said electrically-operated money ejectors, said relays being actuatable through said wiper to pre-set combinations of said electrically-operated money ejectors.

52. In a money-actuated device, a multi-contact switch with a wiper, electrically-operated money ejectors, diodes connected between the contacts of said multi-contact switch, further diodes connected between said electrically-operated money ejectors and said contacts of said multi-contact switch, said wiper being connectable to a source of power and being engageable with various of said contacts of said multi-contact switch to selectively energize or not energize one or more of said electrically-operated money ejectors, the first said diodes being oriented so the engagement of said wiper with one of said contacts of said multi-contact switch can energize the electrically-operated money ejector connected to that contact and can also energize the electrically-operated money ejector connected to the contact above the said one contact.

53. In a money-actuated device, credit sensing circuits, a money-registering circuit, and a connection between said money-registering circuit and said credit-sensing circuits which will prevent completion of said credit sensing circuits during operation of said money-registering circuit.

54. In a money-actuated device, credit sensing circuits, a money-registering circuit, and money-actuated contacts that are part of said money-registering circuit and of said credit-sensing circuits, said money-actuated contacts being adapted to prevent completion of said credit sensing circuits during operation of said money-registering circuit.

55. In a money-actuated device, an escrow for money, a change-dispensing circuit, a vending circuit, a switch, a memory element that can connect said switch to said escrow to effect the return of money to a patron or that can connect said switch to said change-dispensing circuit, to initiate a change-dispensing cycle, said memory element responding to an initiation of said vending circuit to disconnect said switch from said escrow and to thereby prevent the return of money to said patron.

56. In a money-actuated device, an escrow for bills, a change-dispensing circuit, a vending circuit, a switch, a memory element that can connect said switch to said escrow to effect the return of money to a patron or that can connect said switch to said change-dispensing circuit, to initiate a bill-dispensing cycle, said memory element responding to an initiation of said vending circuit to prevent the return of money to said patron.

57. In a money-actuated device, an escrow for money, a vending circuit, a switch, a memory element that can connect said switch to said escrow to effect the return of money to a patron, said memory element responding to an initiation of said vending circuit to prevent the return of money to said patron.

58. In a money-actuated device, a change-dispensing circuit, a stepping switch that is adapted to establish credits, an exact money stepper, a money registering circuit that can respond to the insertion of money to establish credits, and means responsive to the amount of change available for said change-dispensing circuit, said means being adapted to connect said money registering circuit to said stepping switch to register credits on said stepping switch as long as said change-dispensing circuit has an adequate supply of change and that is adapted to connect said money registering circuit to said exact money stepper to establish credits on said exact money stepper whenever said change-dispensing circuit does not have an adequate supply of change, contacts on said stepping switch being connected to higher value contacts on said exact money stepper.

59. In a money-actuated device, a change-dispensing circuit, a stepping switch that is adapted to establish credits, an exact money stepper that has a wiper, a money registering circuit that can respond to the insertion of money to establish credits, and means responsive to the amount of change available for said change-dispensing circuit, said means being adapted to connect said money registering circuit to said stepping switch to register credits on said stepping switch as long as said change-dispensing circuit has an adequate supply of change and that is adapted to connect said money registering circuit to said exact money stepper to establish credits on said exact money stepper whenever said change-dispensing circuit does not have an adequate supply of change, and diodes connected between contacts of said stepping switch, and a further diode that is connected to the wiper of said exact money stepper.

60. In a money-actuated device, a change-dispensing circuit, a stepping switch that is adapted to establish credits, an exact money stepper that has a wiper, a money registering circuit that can respond to the insertion of money to establish credits, and means responsive to the amount of change available for said change-dispensing circuit, said means being adapted to connect said money registering circuit to said stepping switch to register credits on said stepping switch as long as said change-dispensing circuit has an adequate supply of change and that is adapted to connect said money registering circuit to said exact money stepper to establish credits on said exact money stepper whenever said change-dispensing circuit does not have an adequate supply of change, and diodes connected between contacts of said stepping switch, and a further diode that is connected to the wiper of said exact money stepper, said wiper of said stepping switch selectively coacting with said wiper of said exact money stepper to make the polarity of said further diode the same as or opposite to the polarities of one or more of the first said diodes.

References Cited in the file of this patent

UNITED STATES PATENTS

| | | | |
|---|---|---|---|
| 2,589,099 | Larkin | Mar. 11, | 1952 |
| 2,593,102 | Caruso | Apr. 15, | 1952 |
| 2,659,471 | Johnston | Nov. 17, | 1953 |
| 2,708,996 | Skillman | May 24, | 1955 |
| 2,719,622 | Rogier | Oct. 4, | 1955 |
| 2,876,883 | Baker | Mar. 10, | 1959 |
| 2,896,763 | Gisser | July 28, | 1959 |